US012278419B2

(12) United States Patent
Hughes et al.

(10) Patent No.: US 12,278,419 B2
(45) Date of Patent: Apr. 15, 2025

(54) WINDOW ANTENNAS

(71) Applicant: View, Inc., Milpitas, CA (US)

(72) Inventors: Harold Hughes, Los Altos Hills, CA (US); Stephen Clark Brown, San Mateo, CA (US); Dhairya Shrivastava, Los Altos, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

(21) Appl. No.: 18/138,846

(22) Filed: Apr. 25, 2023

(65) Prior Publication Data

US 2023/0261358 A1    Aug. 17, 2023

Related U.S. Application Data

(63) Continuation of application No. 16/949,978, filed on Nov. 23, 2020, now Pat. No. 11,670,833, which is a
(Continued)

(51) Int. Cl.
*H01Q 1/12* (2006.01)
*E06B 3/67* (2006.01)
(Continued)

(52) U.S. Cl.
CPC .......... *H01Q 1/1271* (2013.01); *E06B 3/6722* (2013.01); *E06B 7/28* (2013.01);
(Continued)

(58) Field of Classification Search
CPC .......... H01Q 1/1271; H01Q 1/12; H01Q 1/44; H01Q 1/246; H01Q 9/0407; H01Q 1/38;
(Continued)

(56) References Cited

U.S. PATENT DOCUMENTS

| 4,864,314 A | 9/1989 | Bond |
|---|---|---|
| 4,874,903 A | 10/1989 | Clarke |

(Continued)

FOREIGN PATENT DOCUMENTS

| AU | 2012209352 A1 | 8/2013 |
|---|---|---|
| CN | 1267416 A | 9/2000 |

(Continued)

OTHER PUBLICATIONS

AGC, Inc., "AGC completes development of 5G-compatible 'Glass Antenna that adds cellular base station capabilities to windows,'" Press Release, Jun. 3, 2020, 2 pp.
(Continued)

*Primary Examiner* — Hai V Tran
(74) *Attorney, Agent, or Firm* — Weaver Austin Villeneuve & Sampson LLP; Brian D. Griedel

(57) ABSTRACT

In one aspect, an apparatus is described that includes a transparent pane having a first surface and a second surface. An electrochromic device (ECD) is arranged over the second surface that includes a first conductive layer adjacent the second surface, a second conductive layer, and an electrochromic layer between the first and the second conductive layers. The apparatus further includes at least one conductive antenna structure arranged over the second surface.

12 Claims, 43 Drawing Sheets

Related U.S. Application Data continuation of application No. 16/849,540, filed on Apr. 15, 2020, now Pat. No. 11,462,814, which is a continuation of application No. 15/529,677, filed as application No. PCT/US2015/062387 on Nov. 24, 2015, now Pat. No. 10,673,121.

(60) Provisional application No. 62/084,502, filed on Nov. 25, 2014.

(51) Int. Cl.

| | | |
|---|---|---|
| E06B 7/28 | (2006.01) | |
| G02F 1/153 | (2006.01) | |
| G02F 1/163 | (2006.01) | |
| H01Q 1/24 | (2006.01) | |
| H01Q 1/38 | (2006.01) | |
| H01Q 1/44 | (2006.01) | |
| H01Q 9/04 | (2006.01) | |
| H01Q 9/40 | (2006.01) | |
| E06B 9/24 | (2006.01) | |

(52) U.S. Cl.
CPC ............ *G02F 1/1533* (2013.01); *G02F 1/163* (2013.01); *H01Q 1/12* (2013.01); *H01Q 1/246* (2013.01); *H01Q 1/38* (2013.01); *H01Q 1/44* (2013.01); *H01Q 9/0407* (2013.01); *H01Q 9/40* (2013.01); *E06B 2009/2464* (2013.01)

(58) Field of Classification Search
CPC ......... H01Q 9/40; G02F 1/163; G02F 1/1533; E06B 3/6722; E06B 7/28
See application file for complete search history.

(56) References Cited

U.S. PATENT DOCUMENTS

| | | |
|---|---|---|
| 4,932,755 A | 6/1990 | Holdridge et al. |
| 5,139,850 A | 8/1992 | Clarke et al. |
| 5,147,694 A | 9/1992 | Clarke |
| 5,202,788 A | 4/1993 | Weppner |
| 5,625,369 A | 4/1997 | Newman |
| 5,959,586 A | 9/1999 | Benham et al. |
| 6,032,020 A | 2/2000 | Cook et al. |
| 6,089,721 A | 7/2000 | Schierbeek |
| 6,104,513 A | 8/2000 | Bloom |
| 6,128,471 A | 10/2000 | Quelch et al. |
| 6,294,111 B1 | 9/2001 | Shacklett, III et al. |
| 6,407,847 B1 | 6/2002 | Poll et al. |
| 6,456,239 B1 | 9/2002 | Werb et al. |
| 6,620,342 B1 | 9/2003 | Burchill et al. |
| 6,703,981 B2 | 3/2004 | Meitzler et al. |
| 6,795,226 B2 | 9/2004 | Agrawal et al. |
| 6,809,692 B2 | 10/2004 | Puente Baliarda et al. |
| 7,722,948 B2 | 5/2010 | Dixon et al. |
| 8,085,460 B2 | 12/2011 | Finley et al. |
| 8,099,140 B2 | 1/2012 | Arai |
| 8,213,074 B1 | 7/2012 | Shrivastava et al. |
| 8,614,848 B2 | 12/2013 | Ueda et al. |
| 8,634,764 B2 | 1/2014 | Cruz et al. |
| 8,780,432 B1 | 7/2014 | Nguyen |
| 8,924,076 B2 | 12/2014 | Boote et al. |
| 8,927,069 B1 | 1/2015 | Estinto et al. |
| 8,975,789 B2 | 3/2015 | Snyker et al. |
| 9,454,055 B2 | 9/2016 | Brown et al. |
| 9,664,976 B2 | 5/2017 | Rozbicki |
| 9,898,912 B1 | 2/2018 | Jordan, II et al. |
| 10,153,845 B2 | 12/2018 | Ashrafi |
| 10,254,618 B2 | 4/2019 | Parker |
| 10,299,101 B1 | 5/2019 | Lim et al. |
| 10,505,751 B2 | 12/2019 | Casilli |
| 10,673,121 B2 | 6/2020 | Hughes et al. |
| 10,797,373 B2 | 10/2020 | Hughes et al. |
| 10,867,266 B1 | 12/2020 | Carlin et al. |
| 10,969,645 B2 | 4/2021 | Rozbicki et al. |
| 11,054,711 B2 | 7/2021 | Shrivastava et al. |
| 11,114,742 B2 | 9/2021 | Shrivastava et al. |
| 11,205,926 B2 | 12/2021 | Shrivastava et al. |
| 11,322,818 B2 | 5/2022 | Kum et al. |
| 11,342,791 B2 | 5/2022 | Rozbicki et al. |
| 11,462,814 B2 | 10/2022 | Hughes et al. |
| 11,630,366 B2 | 4/2023 | Shrivastava et al. |
| 11,670,833 B2 | 6/2023 | Hughes et al. |
| 11,732,527 B2 | 8/2023 | Rozbicki et al. |
| 11,799,187 B2 | 10/2023 | Shrivastava et al. |
| 12,087,997 B2 | 9/2024 | Brown et al. |
| 2002/0024424 A1 | 2/2002 | Burns et al. |
| 2002/0072868 A1 | 6/2002 | Bartone et al. |
| 2002/0109634 A1 | 8/2002 | Aisenbrey |
| 2002/0140611 A1 | 10/2002 | Ligander et al. |
| 2003/0007462 A1 | 1/2003 | Makinen et al. |
| 2003/0034926 A1 | 2/2003 | Veerasamy |
| 2003/0098791 A1 | 5/2003 | Carlson et al. |
| 2003/0112187 A1 | 6/2003 | Whitehouse |
| 2003/0227663 A1 | 12/2003 | Agrawal et al. |
| 2003/0232181 A1 | 12/2003 | Simpson et al. |
| 2004/0053576 A1 | 3/2004 | Vasseur et al. |
| 2004/0148057 A1 | 7/2004 | Breed et al. |
| 2004/0150867 A1 | 8/2004 | Lee et al. |
| 2004/0160324 A1 | 8/2004 | Stilp |
| 2004/0160657 A1 | 8/2004 | Tonar et al. |
| 2004/0196179 A1 | 10/2004 | Turnbull |
| 2005/0082639 A1 | 4/2005 | Kikuta et al. |
| 2005/0117193 A1* | 6/2005 | Poll ...................... G02F 1/1533 359/265 |
| 2005/0157675 A1 | 7/2005 | Feder et al. |
| 2005/0254442 A1 | 11/2005 | Proctor, Jr. et al. |
| 2005/0260983 A1 | 11/2005 | DiPiazza |
| 2006/0033663 A1 | 2/2006 | Saint Clair et al. |
| 2006/0145833 A1 | 7/2006 | Brandt et al. |
| 2007/0042819 A1 | 2/2007 | Li et al. |
| 2007/0097481 A1 | 5/2007 | Burdis et al. |
| 2007/0115979 A1 | 5/2007 | Balay et al. |
| 2007/0126637 A1 | 6/2007 | Habib et al. |
| 2007/0182705 A1 | 8/2007 | Leyland et al. |
| 2007/0292606 A1 | 12/2007 | Demiryont |
| 2008/0018979 A1 | 1/2008 | Mahe et al. |
| 2008/0177919 A1 | 7/2008 | Miyazawa |
| 2008/0190759 A1 | 8/2008 | Valentin et al. |
| 2009/0014693 A1 | 1/2009 | Zahn |
| 2009/0047900 A1 | 2/2009 | Cruz et al. |
| 2009/0054054 A1 | 2/2009 | Shao et al. |
| 2009/0139052 A1 | 6/2009 | Boenisch |
| 2009/0140219 A1 | 6/2009 | Zahn |
| 2009/0163170 A1 | 6/2009 | Norp et al. |
| 2009/0189458 A1 | 7/2009 | Kawasaki |
| 2009/0224980 A1 | 9/2009 | Cruz et al. |
| 2009/0284220 A1 | 11/2009 | Toncich et al. |
| 2009/0308933 A1 | 12/2009 | Osada |
| 2009/0323161 A1 | 12/2009 | Fuss et al. |
| 2010/0027694 A1 | 2/2010 | Touboul et al. |
| 2010/0052718 A1 | 3/2010 | Baker et al. |
| 2010/0052844 A1 | 3/2010 | Wesby |
| 2010/0060971 A1 | 3/2010 | Schwendeman et al. |
| 2010/0076615 A1 | 3/2010 | Daniel et al. |
| 2010/0165436 A1 | 7/2010 | Voss et al. |
| 2010/0171667 A1 | 7/2010 | Knudsen |
| 2010/0210233 A1 | 8/2010 | Cook et al. |
| 2010/0302624 A1 | 12/2010 | Moskowitz |
| 2011/0031821 A1 | 2/2011 | Greene et al. |
| 2011/0074342 A1 | 3/2011 | MacLaughlin |
| 2011/0080630 A1 | 4/2011 | Valentin et al. |
| 2011/0083152 A1 | 4/2011 | Centore, III et al. |
| 2011/0124313 A1 | 5/2011 | Jones |
| 2011/0148218 A1* | 6/2011 | Rozbicki .................. G02F 1/163 359/275 |
| 2011/0159821 A1 | 6/2011 | Park |
| 2011/0170170 A1 | 7/2011 | Boote |
| 2011/0248901 A1 | 10/2011 | Alexopoulos et al. |
| 2011/0260856 A1 | 10/2011 | Rossmann et al. |
| 2012/0133213 A1 | 5/2012 | Borke et al. |
| 2012/0133315 A1 | 5/2012 | Berman et al. |
| 2012/0154241 A1 | 6/2012 | Tatarnikov et al. |

(56) References Cited

U.S. PATENT DOCUMENTS

| | | |
|---|---|---|
| 2012/0188627 A1 | 7/2012 | Chen et al. |
| 2012/0194895 A1 | 8/2012 | Podbelski et al. |
| 2012/0212794 A1 | 8/2012 | Giron et al. |
| 2012/0217346 A1 | 8/2012 | Eberle et al. |
| 2012/0275008 A1 | 11/2012 | Pradhan et al. |
| 2012/0287017 A1 | 11/2012 | Parsche |
| 2012/0328849 A1 | 12/2012 | Neill et al. |
| 2013/0054033 A1 | 2/2013 | Casilli |
| 2013/0194141 A1* | 8/2013 | Okajima ............. H04B 1/385 343/718 |
| 2013/0226353 A1 | 8/2013 | Park |
| 2013/0243120 A1 | 9/2013 | Tsai et al. |
| 2013/0271814 A1 | 10/2013 | Brown |
| 2014/0008992 A1 | 1/2014 | Leabman |
| 2014/0022621 A1 | 1/2014 | Kailasam et al. |
| 2014/0149416 A1 | 5/2014 | Wallace |
| 2014/0171016 A1 | 6/2014 | Sennett et al. |
| 2014/0217967 A1 | 8/2014 | Zeine et al. |
| 2014/0240474 A1* | 8/2014 | Kondo .................. H04B 1/385 348/56 |
| 2014/0243033 A1 | 8/2014 | Wala et al. |
| 2014/0249825 A1 | 9/2014 | Proud |
| 2014/0273911 A1 | 9/2014 | Dunn et al. |
| 2014/0319116 A1 | 10/2014 | Fischer et al. |
| 2014/0333485 A1 | 11/2014 | Stone et al. |
| 2014/0368048 A1 | 12/2014 | Leabman et al. |
| 2014/0368899 A1 | 12/2014 | Greer |
| 2015/0155737 A1 | 6/2015 | Mayo |
| 2015/0198640 A1 | 7/2015 | Lee |
| 2015/0222126 A1 | 8/2015 | Leabman et al. |
| 2015/0323287 A1 | 11/2015 | Durand |
| 2016/0020647 A1 | 1/2016 | Leabman et al. |
| 2016/0028162 A1 | 1/2016 | Ou et al. |
| 2016/0091769 A1 | 3/2016 | Rozbicki |
| 2016/0099757 A1 | 4/2016 | Leabman et al. |
| 2016/0124283 A1 | 5/2016 | Brown et al. |
| 2016/0135175 A1 | 5/2016 | Tarlazzi |
| 2016/0149635 A1 | 5/2016 | Hinman et al. |
| 2016/0154290 A1 | 6/2016 | Brown et al. |
| 2016/0181873 A1 | 6/2016 | Mitcheson et al. |
| 2016/0183056 A1 | 6/2016 | Leabman |
| 2016/0248270 A1 | 8/2016 | Zeine et al. |
| 2017/0052753 A1 | 2/2017 | Paolini, Jr. et al. |
| 2017/0104374 A1 | 4/2017 | Zeine et al. |
| 2017/0117754 A1 | 4/2017 | Noori et al. |
| 2017/0272145 A1 | 9/2017 | Lilja |
| 2017/0272317 A1 | 9/2017 | Singla et al. |
| 2017/0365908 A1 | 12/2017 | Hughes et al. |
| 2018/0088432 A1 | 3/2018 | Shrivastava et al. |
| 2018/0090992 A1 | 3/2018 | Shrivastava et al. |
| 2018/0095337 A1 | 4/2018 | Rozbicki et al. |
| 2018/0138576 A1 | 5/2018 | Cohen |
| 2018/0176799 A1 | 6/2018 | Lange et al. |
| 2018/0187478 A1 | 7/2018 | Vigano et al. |
| 2018/0301783 A1 | 10/2018 | Bulja et al. |
| 2019/0036209 A1 | 1/2019 | Au |
| 2019/0044606 A1 | 2/2019 | Mansikkamaki |
| 2019/0067826 A1 | 2/2019 | Achour et al. |
| 2019/0097827 A1 | 3/2019 | Angle et al. |
| 2019/0155122 A1 | 5/2019 | Brown et al. |
| 2019/0219881 A1 | 7/2019 | Shrivastava et al. |
| 2019/0267840 A1 | 8/2019 | Rozbicki et al. |
| 2019/0294018 A1 | 9/2019 | Shrivastava et al. |
| 2019/0319335 A1 | 10/2019 | Hughes et al. |
| 2019/0324341 A1 | 10/2019 | Tonar et al. |
| 2019/0354071 A1 | 11/2019 | Turney et al. |
| 2019/0356508 A1 | 11/2019 | Trikha et al. |
| 2020/0193155 A1 | 6/2020 | Keohane et al. |
| 2020/0259237 A1 | 8/2020 | Shrivastava et al. |
| 2020/0321682 A1 | 10/2020 | Hughes et al. |
| 2021/0040789 A1 | 2/2021 | Rozbicki et al. |
| 2021/0119318 A1 | 4/2021 | Hughes et al. |
| 2021/0191214 A1 | 6/2021 | Rozbicki et al. |
| 2021/0376445 A1 | 12/2021 | Shrivastava et al. |
| 2021/0384764 A1 | 12/2021 | Shrivastava et al. |
| 2022/0019117 A1 | 1/2022 | Shrivastava et al. |
| 2022/0021099 A1 | 1/2022 | Shrivastava et al. |
| 2022/0231396 A1 | 7/2022 | Rozbicki et al. |
| 2022/0231399 A1 | 7/2022 | Brown et al. |
| 2022/0252952 A1 | 8/2022 | Rozbicki et al. |
| 2022/0255351 A1 | 8/2022 | Rozbicki et al. |
| 2023/0074720 A1 | 3/2023 | Brown et al. |
| 2024/0192563 A1 | 6/2024 | Hur et al. |
| 2024/0276204 A1 | 8/2024 | Lee et al. |
| 2024/0284155 A1 | 8/2024 | Lee et al. |

FOREIGN PATENT DOCUMENTS

| | | |
|---|---|---|
| CN | 1276574 A | 12/2000 |
| CN | 1599280 A | 3/2005 |
| CN | 101032052 A | 9/2007 |
| CN | 101401312 A | 4/2009 |
| CN | 101868346 A | 10/2010 |
| CN | 102237906 A | 11/2011 |
| CN | 102255119 A | 11/2011 |
| CN | 102325326 A | 1/2012 |
| CN | 102326164 A | 1/2012 |
| CN | 103168269 A | 6/2013 |
| CN | 103270646 A | 8/2013 |
| CN | 103793730 A | 5/2014 |
| CN | 104102060 A | 10/2014 |
| CN | 104321497 A | 1/2015 |
| CN | 104884248 A | 9/2015 |
| CN | 104730795 B | 5/2018 |
| CN | 107112620 B | 12/2019 |
| EP | 0413580 A1 | 2/1991 |
| EP | 0588514 A1 | 3/1994 |
| EP | 1297380 B1 | 11/2008 |
| EP | 2645474 A1 | 10/2013 |
| EP | 2733998 A1 | 5/2014 |
| EP | 2851993 A1 | 3/2015 |
| JP | S63271320 A | 11/1988 |
| JP | H10233612 A | 9/1998 |
| JP | 2000165970 A | 6/2000 |
| JP | 2001196826 A | 7/2001 |
| JP | 2004001765 A | 1/2004 |
| JP | 2005303348 A | 10/2005 |
| JP | 2006252886 A | 9/2006 |
| JP | 2009005116 A | 1/2009 |
| JP | 2013515457 A | 5/2013 |
| JP | 2014121122 A | 6/2014 |
| JP | 5556044 B2 | 7/2014 |
| JP | 5564620 B2 | 7/2014 |
| JP | 2014204550 A | 10/2014 |
| JP | 2015128349 A | 7/2015 |
| JP | 2015521459 A | 7/2015 |
| JP | 2016512677 A | 4/2016 |
| JP | 2019508946 A | 3/2019 |
| KR | 20080068165 A | 7/2008 |
| KR | 20110128213 A | 11/2011 |
| KR | 101346862 B1 | 1/2014 |
| KR | 20150001549 A | 1/2015 |
| KR | 20190142032 A | 12/2019 |
| KR | 20210032133 A | 3/2021 |
| KR | 20210039721 A | 4/2021 |
| SG | 141352 A1 | 4/2008 |
| TW | 201135545 A | 10/2011 |
| TW | 201243470 A | 11/2012 |
| TW | 201344874 A | 11/2013 |
| TW | 201423773 A | 6/2014 |
| TW | M519749 U | 4/2016 |
| WO | WO-9823116 A2 | 5/1998 |
| WO | WO-0182410 A1 | 11/2001 |
| WO | WO-03037056 A1 | 5/2003 |
| WO | WO-2008073372 A2 | 6/2008 |
| WO | WO-2010014648 A1 | 2/2010 |
| WO | WO-2010079388 A1 | 7/2010 |
| WO | WO-2010106648 A1 | 9/2010 |
| WO | WO-2011082208 A2 | 7/2011 |
| WO | WO-2011087726 A2 | 7/2011 |
| WO | WO-2012130262 A1 | 10/2012 |
| WO | WO-2013054367 A1 | 4/2013 |
| WO | WO-2013121103 A1 | 8/2013 |
| WO | WO-2013155467 A1 | 10/2013 |

(56) References Cited

FOREIGN PATENT DOCUMENTS

| | | | |
|---|---|---|---|
| WO | WO-2013158365 A1 | 10/2013 | |
| WO | WO-2013158464 A1 | 10/2013 | |
| WO | WO-2013159778 A1 | 10/2013 | |
| WO | WO-2014007487 A1 | 1/2014 | |
| WO | WO-2015013578 A1 | 1/2015 | |
| WO | WO-2015075007 A1 | 5/2015 | |
| WO | WO-2015077829 A1 | 6/2015 | |
| WO | WO-2016044187 A1 | 3/2016 | |
| WO | WO-2016072620 A1 | 5/2016 | |
| WO | WO-2016085964 A1 | 6/2016 | |
| WO | WO-2016174228 A1 | 11/2016 | |
| WO | WO-2017062915 A1 | 4/2017 | |
| WO | WO-2017129855 A1 | 8/2017 | |
| WO | WO-2017192881 A1 | 11/2017 | |
| WO | WO-2018039080 A1 | 3/2018 | |
| WO | WO-2018063919 A1 | 4/2018 | |
| WO | WO-2018094203 A1 | 5/2018 | |
| WO | WO-2018098089 A1 | 5/2018 | |
| WO | WO-2018200702 A1 | 11/2018 | |
| WO | WO-2019022129 A1 | 1/2019 | |
| WO | WO-2019204205 A1 | 10/2019 | |
| WO | WO-2019213441 A1 | 11/2019 | |
| WO | WO-2020227702 A2 | 11/2020 | |
| WO | WO-2020243690 A1 | 12/2020 | |
| WO | WO-2020227702 A3 | 1/2021 | |

OTHER PUBLICATIONS

AU examination report dated Oct. 1, 2021, in application No. AU2020220165.
AU Office action dated Apr. 4, 2023, in AU Application No. AU2022202275.
AU Office Action dated Aug. 30, 2022, in Application No. AU20210250838.
Australian Office Action dated Apr. 8, 2020 in AU Application No. 2015353606.
Australian Office Action dated Aug. 20, 2019 in AU Application No. 2015353606.
Australian Office Action dated Feb. 19, 2021 in AU Application No. 2017260101.
Australian Office Action dated Jun. 3, 2021 in AU Application No. AU 2020220165.
Australian Office Action dated Mar. 4, 2020 in AU Application No. 2015353606.
Australian Office Action dated May 10, 2019 in AU Application No. 2015353606.
Azini, A.S. et al., "Transparent Antenna Design for Wireless Access Point Application," PIERS Proceedings, Taipei, Mar. 25-28, 2013, pp. 910-913.
Balzano Q., et al., "RF Energy in Cars From Window-mounted Antennas", 36th IEEE Vehicular Technology Conference, 2006, pp. 32-39.
CA Office Action dated Dec. 22, 2021, in Application No. 2968665.
CA Office Action dated Jun. 1, 2023, in Application No. CA3023072.
CA Office Action dated Nov. 15, 2022 in Application No. CA2968665.
CN Office Action dated Apr. 15, 2022 in CN Application No. 201780063202.2 with English translation.
CN Office Action dated Apr. 27, 2022, in Application No. CN201780057293.9 with English translation.
CN Office Action dated Apr. 29, 2020 in CN Application No. 201780038353.2.
CN Office Action dated Apr. 6, 2021 in CN Application No. 201780038353.2.
CN Office Action dated Apr. 6, 2021 in CN Application No. 201911227990.1.
CN Office Action dated Aug. 2, 2021 in CN Application No. 201780038353.2 with English translation.
CN Office Action dated Aug. 3, 2021 in CN Application No. 201780063202.2.
CN Office Action dated Aug. 6, 2019 in CN Application No. 201580070207.9.
CN Office Action dated Jul. 28, 2021, in CN Application No. 201780057293.9.
CN Office Action dated Mar. 5, 2019 in CN Application No. 201580070207.9.
CN Office Action dated Nov. 6, 2020 in CN Application No. 201780038353.2.
CN Office Action dated Oct. 10, 2022, in Application No. CN201780057293.9, with EnglishTranslation.
CN Office Action dated Oct. 22, 2020 in CN Application No. 201911227990.1.
CN Office Action dated Sep. 15, 2021, in application No. CN201911227990.1 with English translation.
EP Extended Search Report dated Dec. 4, 2019 in EP Application No. 17793364.5.
EP Extended Search Report dated Feb. 25, 2020 in EP Application No. 17844188.7.
EP Extended Search Report dated Mar. 31, 2020 in EP Application No. 17857230.1.
EP Extended Search Report dated Sep. 6, 2018 in EP Application No. 15863433.7.
EP Office Action dated Dec. 16, 2021, in Application No. EP17793364.5.
EP Office Action dated Jun. 3, 2022, in Application No. EP19713970.2.
EP office action dated Jun. 21, 2023, in application No. EP20200757159.
EP Office Action dated Oct. 1, 2021, in application No. EP17857230.1.
EP Partial Supplementary Search Report dated May 23, 2018 in EP Application No. 15863433.7.
European Office Action dated Jul. 8, 2020 in EP Application No. 15863433.7.
European Office Action dated May 7, 2021 in EP Application No. 15863433.7.
European Office Action dated Oct. 17, 2019 in EP Application No. 15863433.7.
IN Office Action dated Dec. 5, 2022 in Application No. IN202238032780.
IN Office Action dated Dec. 24, 2021, in Application No. IN202138004005.
IN Office Action dated May 10, 2022, in Application No. IN202037043494.
Indian Office Action dated Mar. 24, 2021 in IN Application No. 201817042545.
Indian Office Action dated Sep. 25, 2020 in IN Application No. 201737018864.
International Preliminary Report on Patentability dated Apr. 11, 2019 in PCT/US2017/052798.
International Preliminary Report on Patentability dated Dec. 9, 2021, in PCT Application No. PCT/US2020/035485.
International Preliminary Report on Patentability dated Feb. 10, 2022 issued in Application No. PCT/US2020/044337.
International Preliminary Report on Patentability dated Jun. 8, 2017 in PCT Application No. PCT/US2015/062387.
International Preliminary Report on Patentability dated Mar. 7, 2019 in PCT/US2017/047664.
International Preliminary Report on Patentability dated Nov. 15, 2018 in PCT Application No. PCT/US2017/031106.
International Preliminary Report on Patentability dated Oct. 27, 2022, in PCT Application No. PCT/US2021/027418.
International Preliminary Report on Patentability dated Sep. 24, 2020 in PCT/US2019/022129.
International Preliminary Reporton Patentability dated Nov. 18, 2021, issued in PCT/US2020/032269.
International Search Report and Written Opinion dated Aug. 8, 2022, in Application No. PCT/US2022/023605.
International Search Report and Written Opinion dated Aug. 5, 2021 in PCT Application No. PCT/US2021/027418.
International Search Report and Written Opinion dated Sep. 1, 2022 in Application No. PCT/US2022/028850.
International Search Report and Written Opinion (ISA/EP) dated Dec. 7, 2020 in PCT Application No. PCT/US2020/032269.

(56) References Cited

OTHER PUBLICATIONS

International Search Report and Written Opinion (ISA/EP) dated May 9, 2019 in PCT/US2019/022129.
International Search Report and Written Opinion (ISA/EP) dated Sep. 30, 2020 in PCT Application No. PCT/US2020/035485.
International Search Report and Written Opinion (ISA/KR) dated Aug. 22, 2017 in PCT Application No. PCT/US2017/031106.
International Search Report and Written Opinion (ISA/KR) dated Dec. 13, 2017 in PCT/US2017/047664.
International Search Report and Written Opinion (ISA/KR) dated Feb. 6, 2018 in PCT/US2017/052798.
International Search Report and Written Opinion (ISA/KR) dated Mar. 8, 2016 in PCT Application No. PCT/US2015/062387.
JP Office Action dated Jul. 5, 2022, in Application No. JP2021-119155 with English translation.
JP Office Action dated Mar. 2, 2021 in JP Application No. 2018-557808.
JP Office Action dated Nov. 8, 2022 for JP Application No. 2021-119155 with English translation.
KR Office Action dated Apr. 16, 2021 in KR Application No. 10-2018-7035235.
KR Office Action dated Dec. 7, 2022, in Application No. KR10-2022-7005495 WithEnglish translation.
KR Office Action dated Feb. 22, 2022, in Application No. KR1020177017285 with English translation.
KR Office Action dated May 25, 2022, in Application No. KR1020227005495 With English Translation.
Pasternack Enterprises, Inc. Technical Data Sheet for MCX Jack Connector Solder Attachment Surface Mount PCB (PE4889), 2013, 2 pp.
Restriction requirement dated Oct. 18, 2021, for U.S. Appl. No. 16/849,540.
Rolith Inc., "NanoWeb: sub-micron transparent metal mesh conductors," [http://www.rolith.com/applications/transparent-conductive-electrodes] retrieved Jan. 29, 2016, 3 pp.
Saad, A. "Printed millimeter-wave MIMO-based slot antenna arrays for 5G networks," AEU—International Journal of Electronics and Communications, vol. 99, Feb. 2019, pp. 59-69.
Saberin, J. R., "Optically Transparent Antennas for Small Satellites," University of Utah, Dept. of Electrical and Computer Engineering, Masters Thesis, Aug. 2010, 55 pp.
SunPartner Technologies web page, "Li-Fi", [http://sunpartnertechnologies.com/li-fi/]; 3 pages; retrieved Jan. 24, 2018.
SunPartner Technologies web page, "Smart Building—Cameleon", [http://sunpartnertechnologies.com/vitrage-intelligent/]; 3 pages; retrieved Jan. 24, 2018.
SunPartner Technologies web page, "Smart Building—Design Glass", [http://sunpartnertechnologies.com/vitrage-intelligent/]; 3 pages; retrieved Jan. 24, 2018.
SunPartner Technologies web page, "Smart Building—Vision Glass", [http://sunpartnertechnologies.com/vitrage-intelligent/]; 3 pages; retrieved Jan. 24, 2018.
SunPartner Technologies White Paper, "Wysips Connect, the first solution for the indoor/outdoor VLC lighting saturation problematics," Feb. 26, 2015, 6 pages, [http://sunpartnertechnologies.com/wp-content/uploads/2012/08/White_Paper_LiFi_26_02_2015.pdf].
Taiwan Office Action dated Dec. 31, 2020 issued in TW Application No. 106133563.
Taiwan Office Action dated Jan. 25, 2021 issued in TW Application No. 106128249.
Taiwanese First Office Action dated May 21, 2021 in TW 109134283.
Taiwanese Office Action dated Mar. 16, 2020 in TW Application No. 104139297.
Taiwanese Office Action dated Oct. 1, 2019 in TW Application No. 104139297.
"That's right, 5G could depend on Corning glass in your antenna," by Robert Triggs, Android Authority, Mar. 2, 2018, 5 pp.. [https://www.androidauthority.com/corning-glass-5g-antenna-842341/] downloaded Nov. 13, 2018.
TW Office Action dated Apr. 26, 2022 in Application No. TW110144841 with English translation.
TW Office Action dated Mar. 13, 2022, in Application No. TW106114947 with English translation.
TW Office Action dated May 31, 2021 in TW Application No. TW 106114947.
TW Office Action dated Nov. 29, 2021, in Application No. TW109134283 with English translation.
U.S. Corrected Notice of Allowability dated Jan. 10, 2022, in U.S. Appl. No. 16/334,716.
U.S. Corrected Notice of Allowability for U.S. Appl. No. 16/327,789 dated Mar. 1, 2021.
U.S Corrected Notice of Allowance dated Apr. 26, 2022 in U.S. Appl. No. 16/334,716.
U.S. Corrected Notice of Allowance dated Feb. 15, 2023 in U.S. Appl. No. 16/949,978.
U.S. Corrected Notice of Allowance dated Jul. 17, 2023, in U.S. Appl. No. 16/980,305.
U.S. Corrected Notice of Allowance dated Jun. 3, 2022 In U.S. Appl. No. 16/849,540.
U.S. Corrected Notice of Allowance dated Sep. 6, 2022 in U.S. Appl. No. 16/849,540.
US Final Office Action dated Feb. 6, 2020 in U.S. Appl. No. 16/451,784.
US Final Office Action dated May 11, 2021 in U.S. Appl. No. 16/334,716.
U.S. Non Final Office Action dated Jan. 31, 2022 in U.S. Appl. No. 16/849,540.
U.S. Non-Final Office Action dated Apr. 18, 2023 in U.S. Appl. No. 17/609,671.
U.S. Non-Final Office Action dated Dec. 2, 2022 in U.S. Appl. No. 16/980,305.
U.S. Non-Final Office Action dated Jul. 3, 2023, in U.S. Appl. No. 17/385,810.
U.S. Non-Final Office Action dated Mar. 1, 2023 in U.S. Appl. No. 17/380,785.
U.S. Non-Final Office Action dated May 9, 2023 in U.S. Appl. No. 17/307,848.
U.S. Non-Final Office Action dated Nov. 18, 2022, in U.S. Appl. No. 17/307,848.
U.S. Non-Final office Action dated Sep. 8, 2022 in U.S. Appl. No. 17/406,301.
U.S. Non-Final office Action dated Sep. 29, 2022 in U.S. Appl. No. 16/949,978.
US Notice of Allowance dated Apr. 19, 2021 in U.S. Appl. No. 16/099,424.
U.S Notice of Allowance dated Dec. 22, 2021 in U.S. Appl. No. 16/334,716.
U.S. Notice of Allowance dated Feb. 1, 2023 in U.S. Appl. No. 16/949,978.
U.S. Notice of Allowance dated Jan. 17, 2023 in U.S. Appl. No. 17/406,301.
U.S. Notice of Allowance dated Jan. 25, 2023 in U.S. Appl. No. 17/406,301.
U.S. Notice of Allowance dated May 11, 2023 in U.S. Appl. No. 16/949,978.
U.S. Notice of Allowance dated May 24, 2023 in U.S. Appl. No. 16/980,305.
US Notice of Allowance dated May 25, 2021 in U.S. Appl. No. 15/709,339.
US Notice of Allowance dated May 26, 2020 in U.S. Appl. No. 16/451,784.
U.S. Notice of Allowance dated May 26, 2022, in U.S. Appl. No. 16/849,540.
US Notice of Allowance dated Sep. 10, 2021, in the U.S. Appl. No. 15/709,339.
U.S. Notice of Allowance for U.S. Appl. No. 16/327,789 dated Feb. 4, 2021.
US Office Action dated Jan. 16, 2020 in U.S. Appl. No. 15/529,677.
US Office Action dated Jan. 21, 2021 in U.S. Appl. No. 15/709,339.
US Office Action dated Jul. 25, 2019 in U.S. Appl. No. 15/529,677.
US Office Action dated Nov. 12, 2020 in U.S. Appl. No. 16/334,716.
US Office Action dated Sep. 23, 2019 in U.S. Appl. No. 16/451,784.

(56) References Cited

OTHER PUBLICATIONS

U.S. Office Action for U.S. Appl. No. 16/327,789 dated Sep. 28, 2020.
U.S. Appl. No. 62/102,515, inventors Nagar et al., filed Jan. 12, 2015.
U.S. Appl. No. 62/102,516, inventors Nagar et al., filed Jan. 12, 2015.
U.S. Appl. No. 63/146,365, inventors Brown et al., filed Feb. 5, 2021.
U.S. Appl. No. 63/171,871, inventors Gomez-Martinez et al., filed Apr. 7, 2021.
U.S. Appl. No. 63/187,632, inventors Hur et al., filed May 12, 2021.
U.S. Appl. No. 63/226,127, inventors Lee et al., filed Jul. 21, 2021.
U.S. Pat. Appl. No. PCT/US2021/017946, filed on Feb. 12, 2021.
U.S. Pat. Appl. No. PCT/US2021/027418, inventors Makker et al., filed on Apr. 15, 2021.
U.S. Appl. No. 17/916,986, inventors Makker et al., filed Oct. 4, 2022.
U.S. Appl. No. 63/080,899, inventor Makker et al., filed Sep. 21, 2020.
U.S. Restriction requirement dated Mar. 15, 2023 in U.S. Appl. No. 17/385,810.
WeBoost Connect 3G Cell Phone Booster 472205 [https://store.weboost.com/products/connect-3g-directional] retrieved Apr. 1, 2016, 12 pp.
Yasin, T. et al., "A study on the efficiency of transparent patch antennas designed from conductive oxide films," IEEE International Symposium on Antennas and Propagation (APSURSI), Spokane, WA, Jul. 3-8, 2011, pp. 3085-3087.
Yasin, T., "Transparent antennas for solar cell integration," Utah State University, Dept. of Electrical Engineering, Doctoral Thesis, 2013, 98 pp.
CA Office Action dated Aug. 15, 2023, in Application No. CA2968665.
CA Office Action dated Dec. 27, 2023 in CA Application No. 3172227.
CA Office Action dated Jan. 11, 2024 in CA Application No. 3038974.
CA Office Action dated Jan. 26, 2024 in CA Application No. CA3167832.
CA Office Action dated Nov. 9, 2023, in CA Application No. 3139813.
CA Office Action dated Sep. 1, 2023, in Application No. CA3034630.
CN Office Action dated Aug. 17, 2023, in Application No. CN202111203764.7 with English translation.
CN Office Action dated Jan. 15, 2024 in CN Application No. CN202011606768.5, withEnglish Translation.
CN Office Action dated Jun. 7, 2024 in CN Application No. 202011606768.5 with English translation.
CN Office Action dated Sep. 26, 2023, in CN Application No. 202080060919.3 with English Translation.
EP Extended European Search report dated Apr. 2, 2024 in EP Application No. 21752901.5.
EP Extended European Search report dated Jun. 10, 2024 in EP Application No. 24161362.9.
EP Extended European Search report dated May 26, 2023, in Application No. EP23153638.4.
EP Office Action dated Feb. 21, 2024 in EP Application No. 20729442.2.
IN Office Action dated May 29, 2023, in Application No. IN202118042940.
International Preliminary Report on Patentability and Written Opinion dated Feb. 8, 2024 in PCT Application No. PCT/US2022/074162.
International Preliminary Report on Patentability and Written Opinion dated Nov. 23, 2023 in PCT Application No. PCT/US2022/024999.
International Preliminary Report on Patentability and Written Opinion dated Nov. 23, 2023 in PCT Application No. PCT/US2022/028850.
International Preliminary Report on Patentability dated Oct. 19, 2023, in PCT Application No. PCT/US2022/023605.
International Search Report and Written Opinion dated Jul. 26, 2022 in Application No. PCT/US2022/024999.
International Search Report and Written Opinion dated Nov. 16, 2022 in PCT Application No. PCT/US2022/074162.
JP Office Action dated Jun. 11, 2024 in JP Application No. 2021-564914, with English Translation.
KR Office Action dated Aug. 2, 2023, in Application No. KR10-2022-7042723 with English translation.
KR Office Action dated Aug. 28, 2024 in KR Application No. 10-2021-7040307, with English Translation.
TW Office Action dated Jul. 11, 2022 In Application No. TW110146990 with English translation.
TW Office Action dated May 31, 2023 in Application No. TW111144104 with English translation.
U.S. Advisory Action dated Mar. 13, 2024 in U.S. Appl. No. 17/385,810.
U.S. Final Office Action dated Dec. 28, 2023 in U.S. Appl. No. 17/385,810.
U.S. Final Office Action dated Nov. 15, 2023 in U.S. Appl. No. 17/609,671.
U.S. Non-Final Office Action dated Aug. 24, 2023 in U.S. Appl. No. 17/656,612.
U.S. Non-Final Office Action dated Jan. 24, 2024 in U.S. Appl. No. 17/609,671.
U.S. Non-Final Office Action dated Mar. 14, 2024 in U.S. Appl. No. 17/597,701.
U.S. Non-Final Office Action dated May 7, 2024 in U.S. Appl. No. 17/385,810.
U.S. Non-Final Office Action dated May 31, 2024 in U.S. Appl. No. 17/612,479.
U.S. Notice of Allowance dated Aug. 31, 2023, in U.S. Appl. No. 17/380,785.
U.S. Notice of Allowance dated May 10, 2024 in U.S. Appl. No. 17/609,671.
U.S. Notice of Allowance dated May 23, 2024 in U.S. Appl. No. 17/609,671.
U.S. Notice of Allowance dated Sep. 18, 2023, in U.S. Appl. No. 17/380,785.
U.S. Appl. No. 18/797,037, inventors Brown S.C, et al., filed Aug. 7, 2024.
U.S. Appl. No. 18/819,746, inventors Hughes H, et al., filed Aug. 29, 2024.
U.S. Restriction Requirement dated Jan. 24, 2024 in U.S. Appl. No. 17/612,479.
CN Office Action dated Dec. 11, 2024 in CN Application No. 202111353189.9, with English Translation.
U.S. Notice of Allowance dated Oct. 1, 2024 in U.S. Appl. No. 17/385,810.
U.S. Notice of Allowance dated Oct. 15, 2024 in U.S. Appl. No. 17/612,479.
U.S. Notice of Allowance dated Oct. 29, 2024 in U.S. Appl. No. 17/612,479.
U.S. Notice of Allowance dated Sep. 30, 2024 in U.S. Appl. No. 17/597,701.
U.S. Appl. No. 18/918,606, inventors Shrivastava D, et al., filed on Oct. 17, 2024.
U.S. Appl. No. 18/930,286, inventors Rozbicki R.T, et al., filed on Oct. 29, 2024.

* cited by examiner

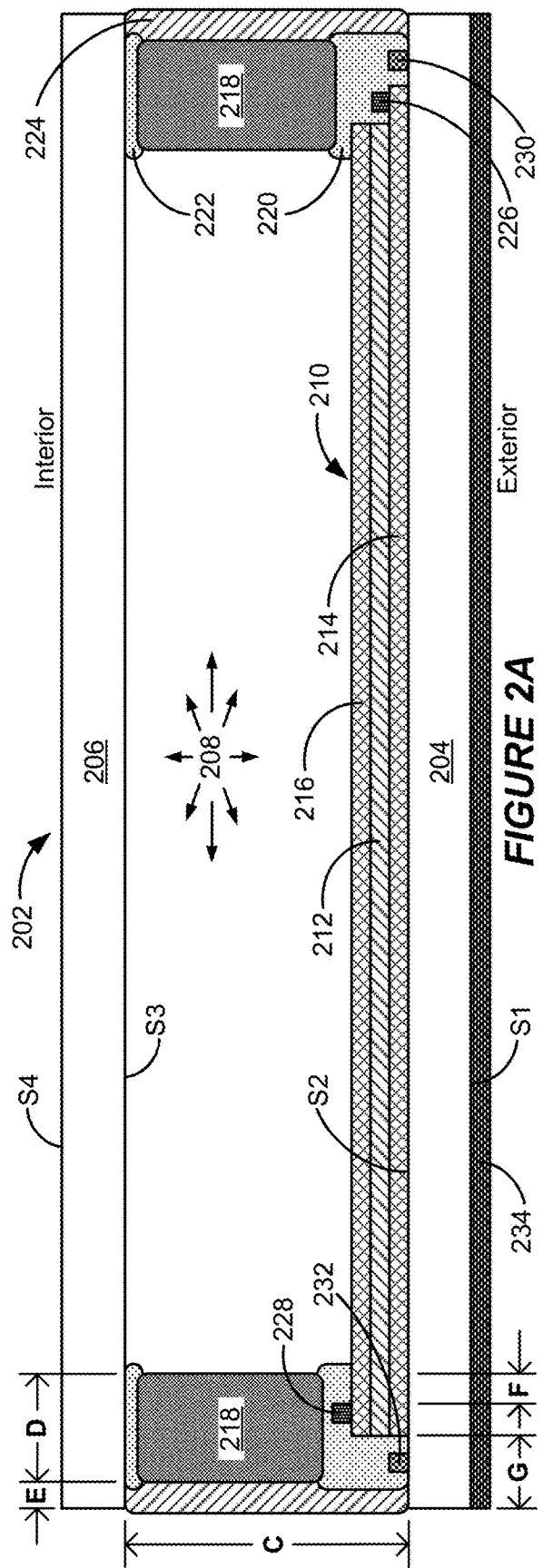
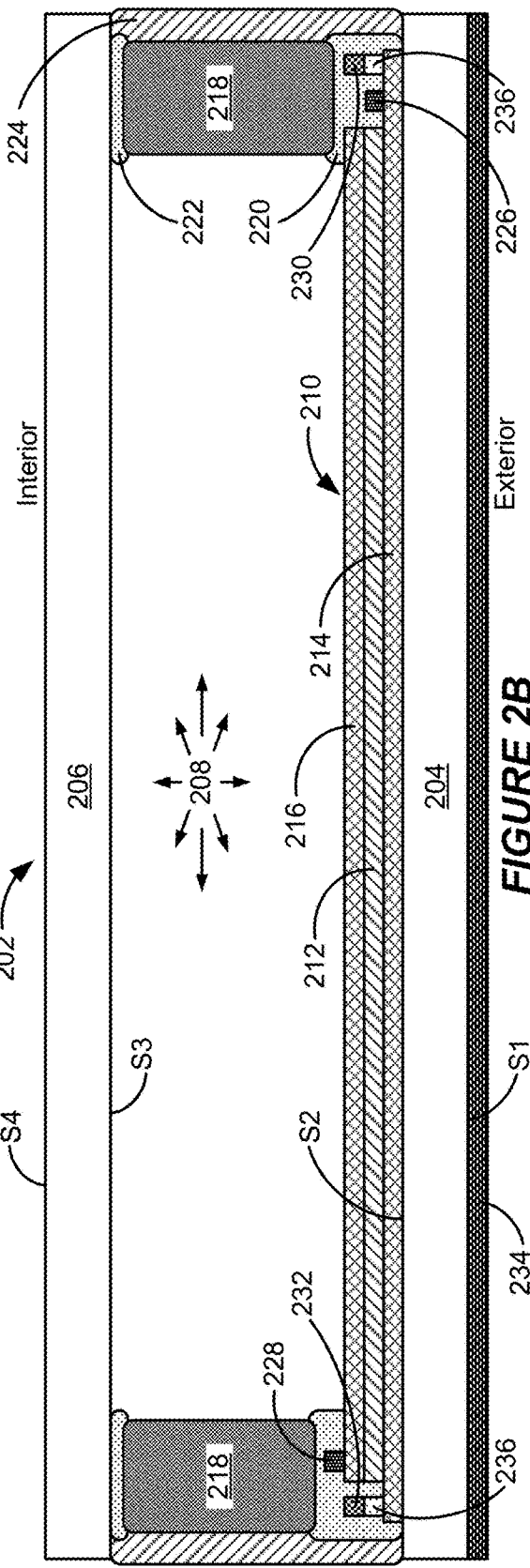

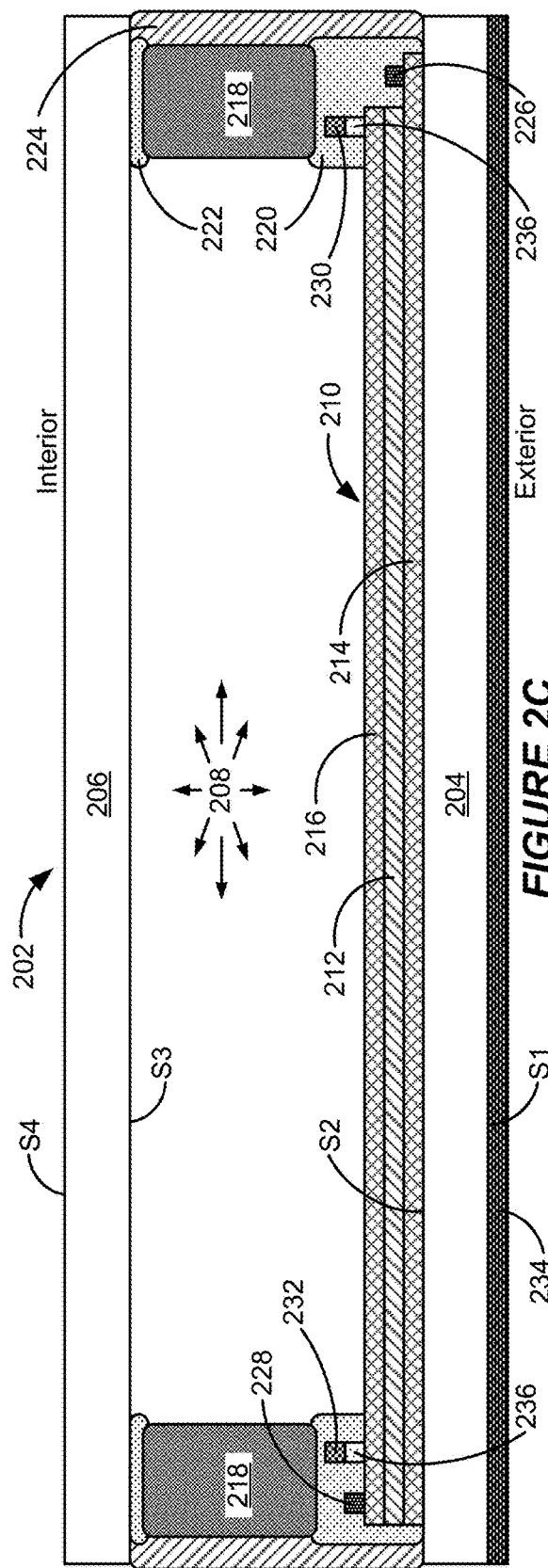
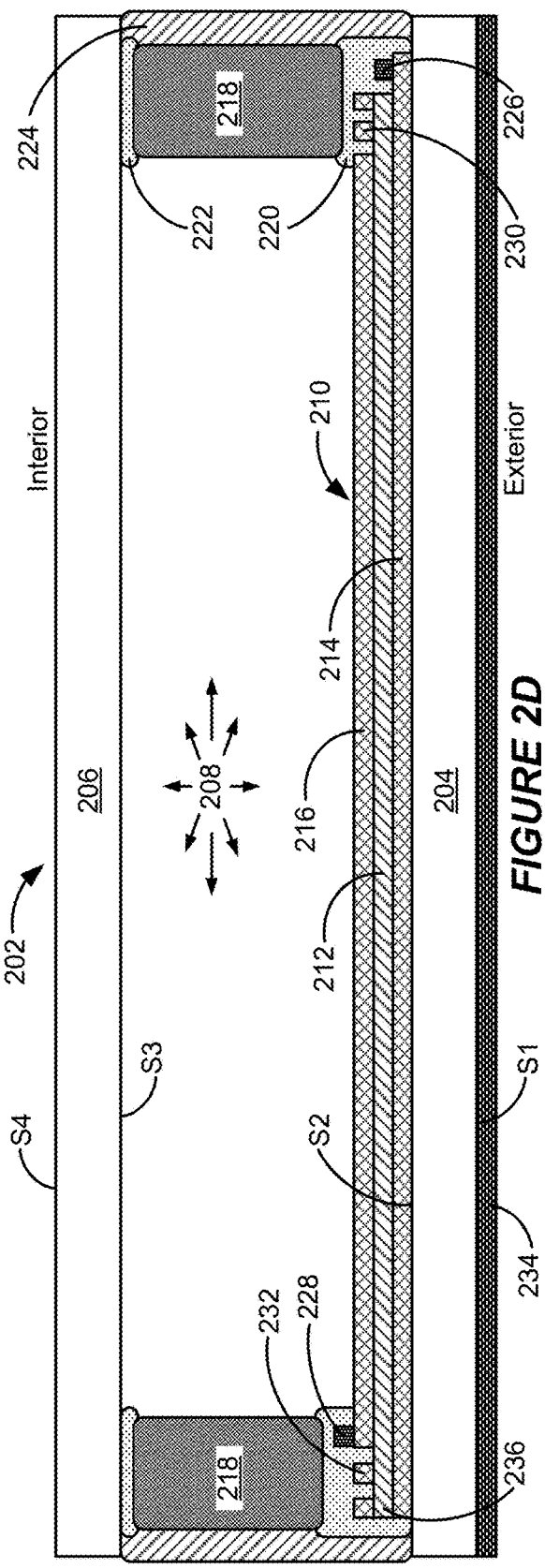
FIGURE 2C
FIGURE 2D

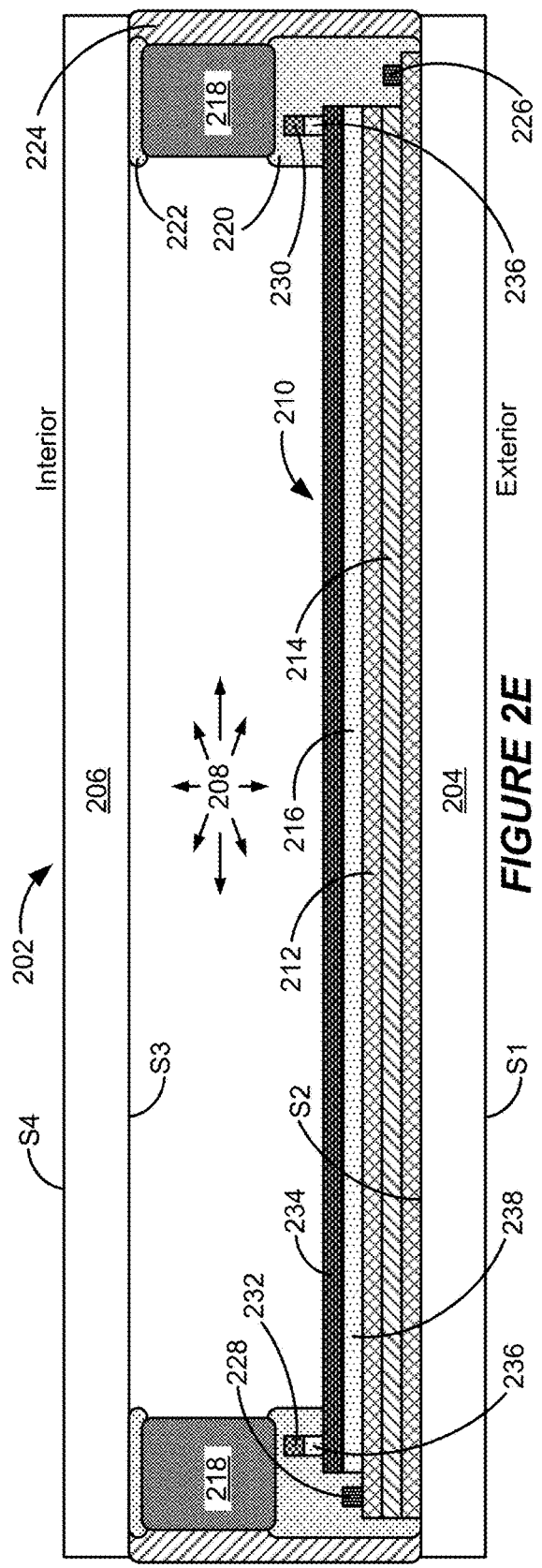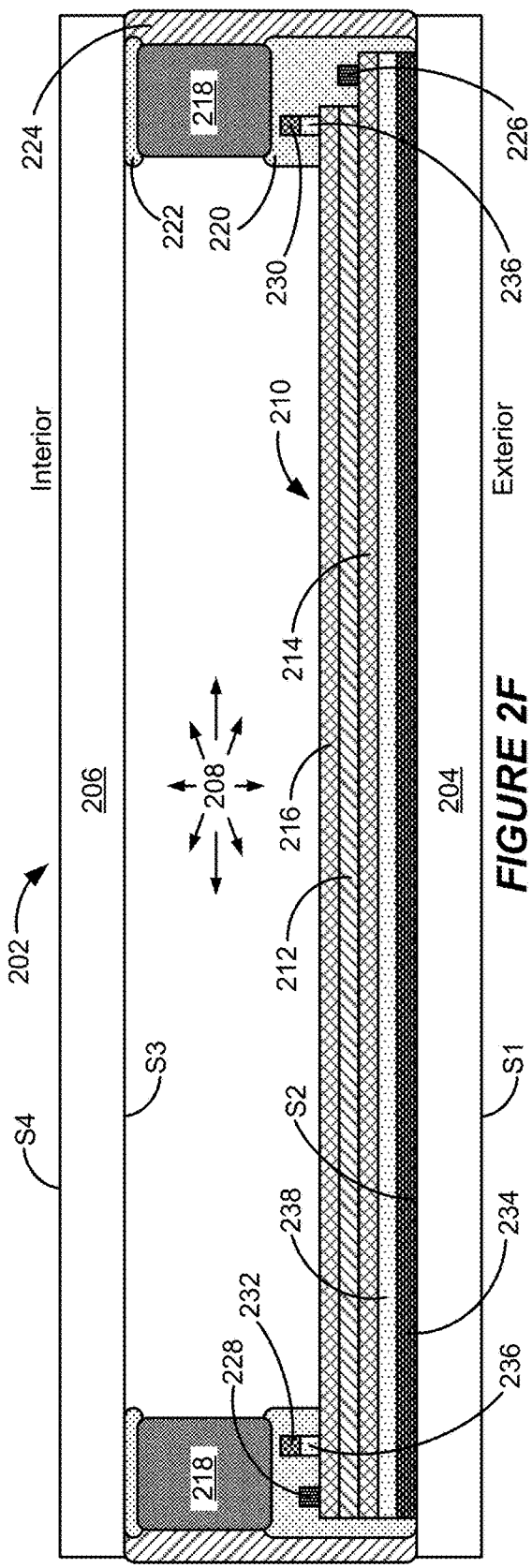

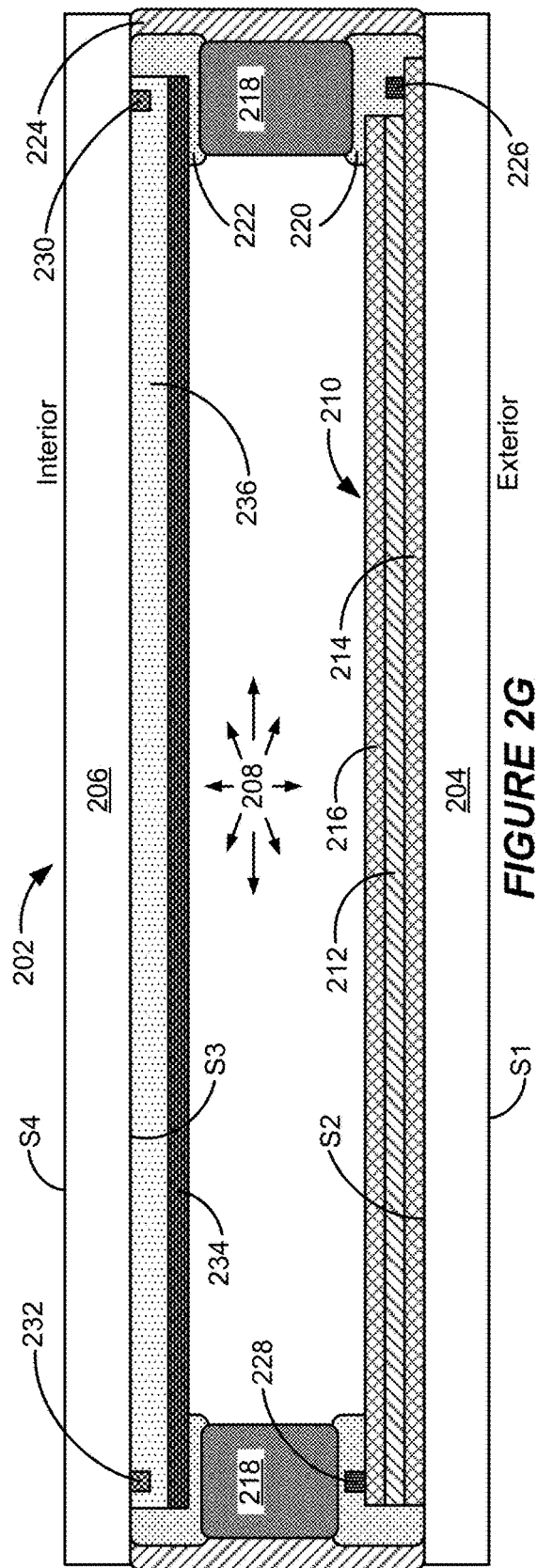
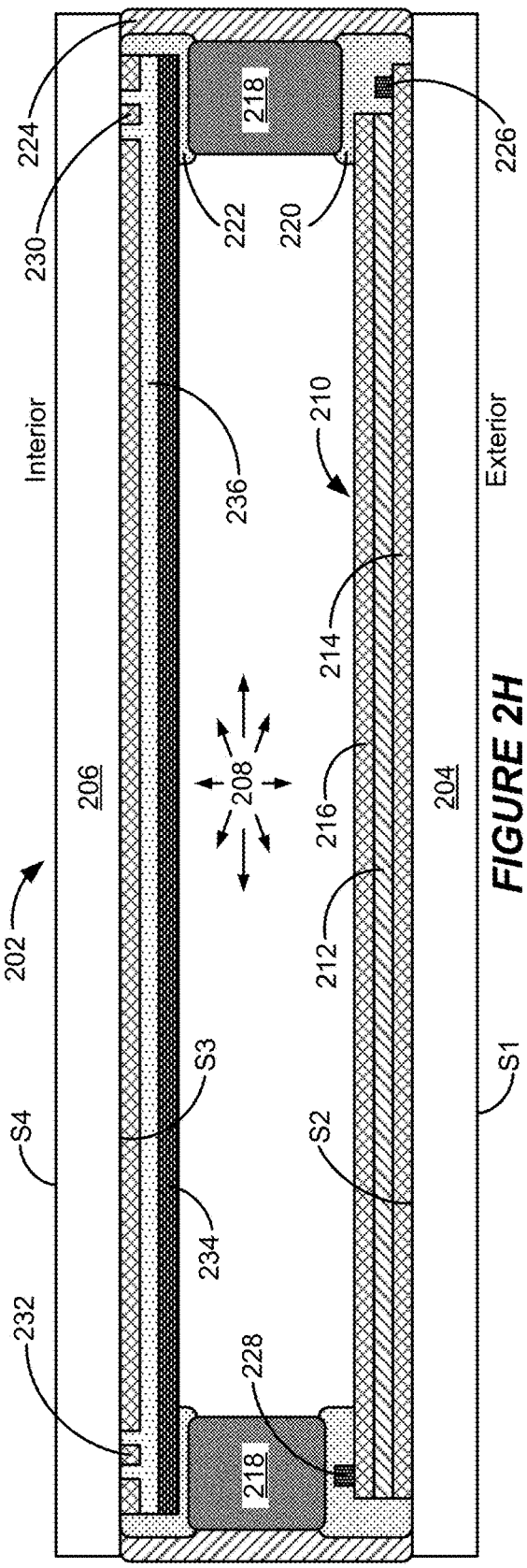

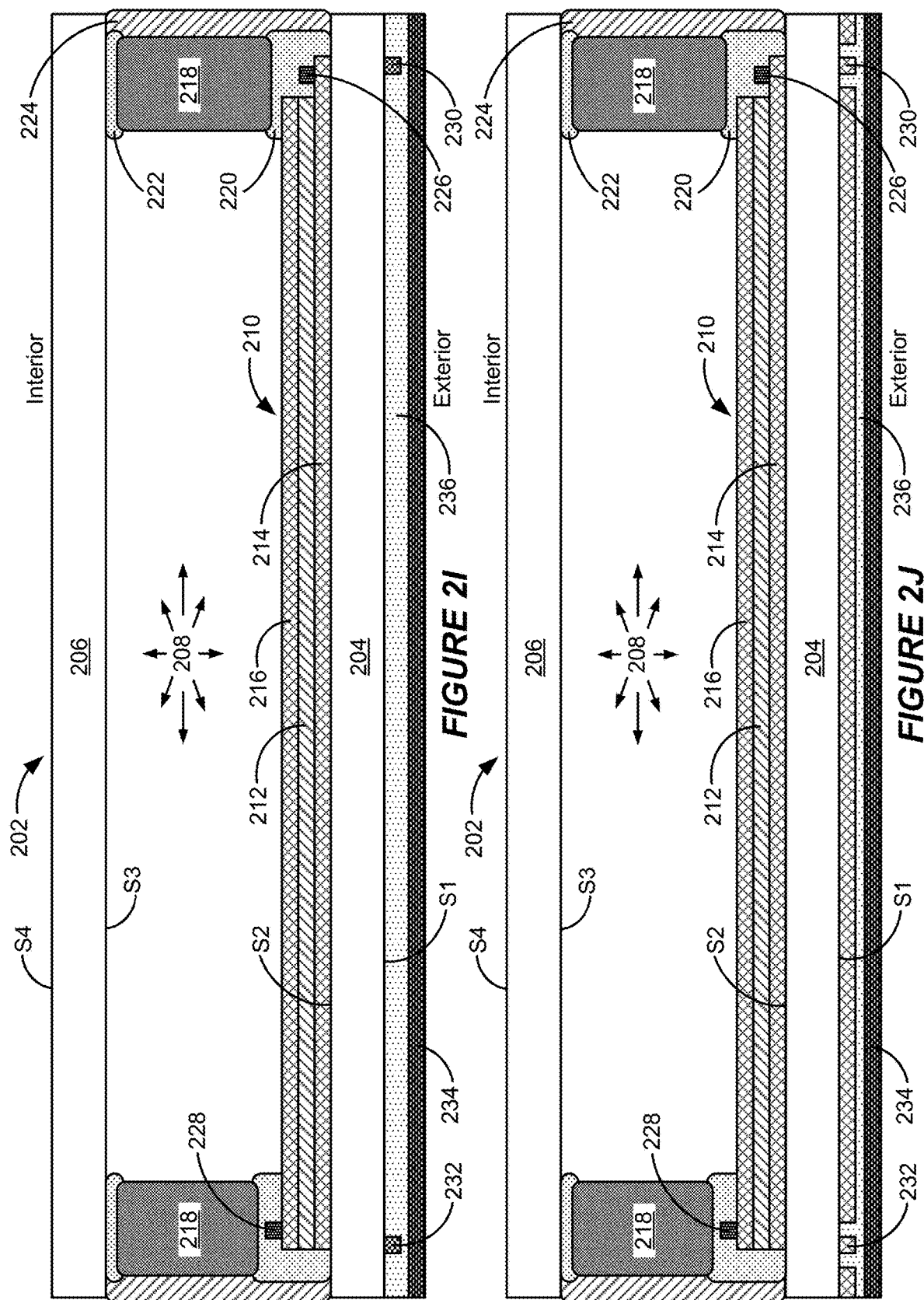

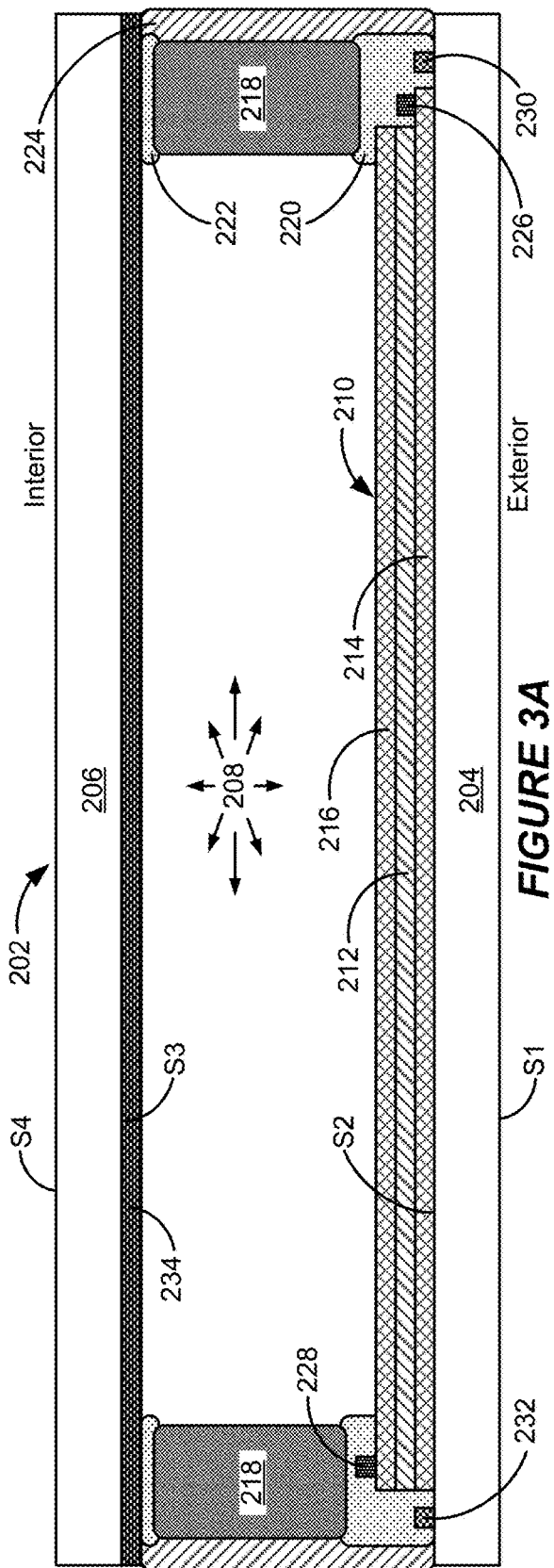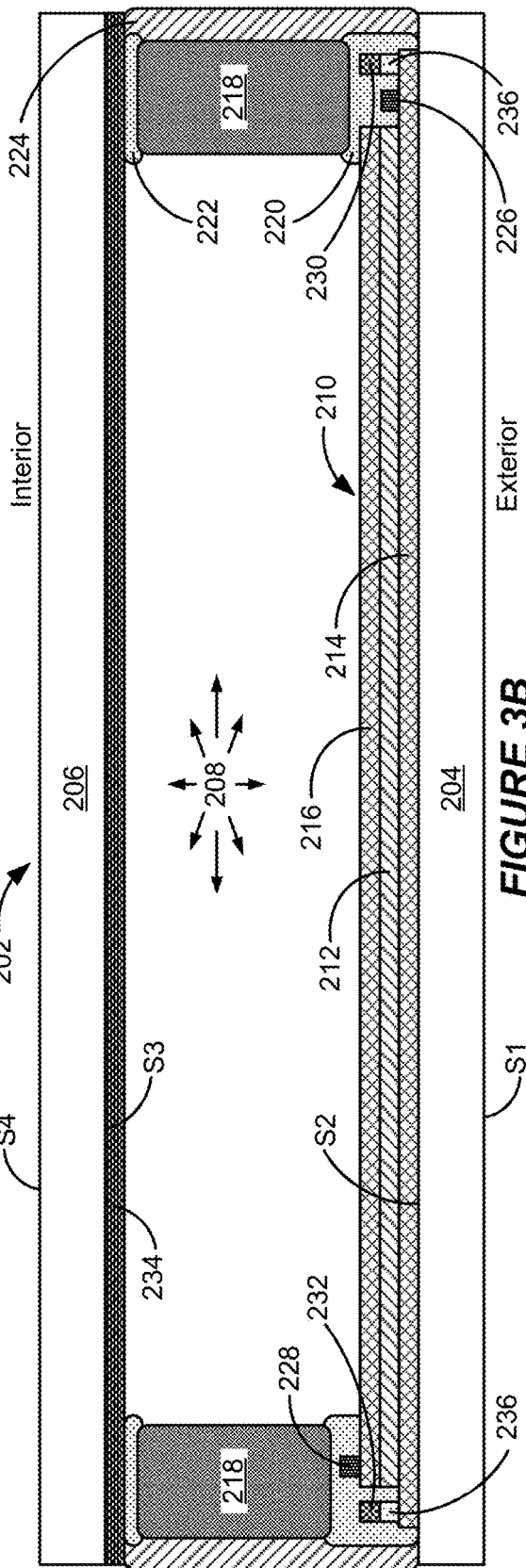

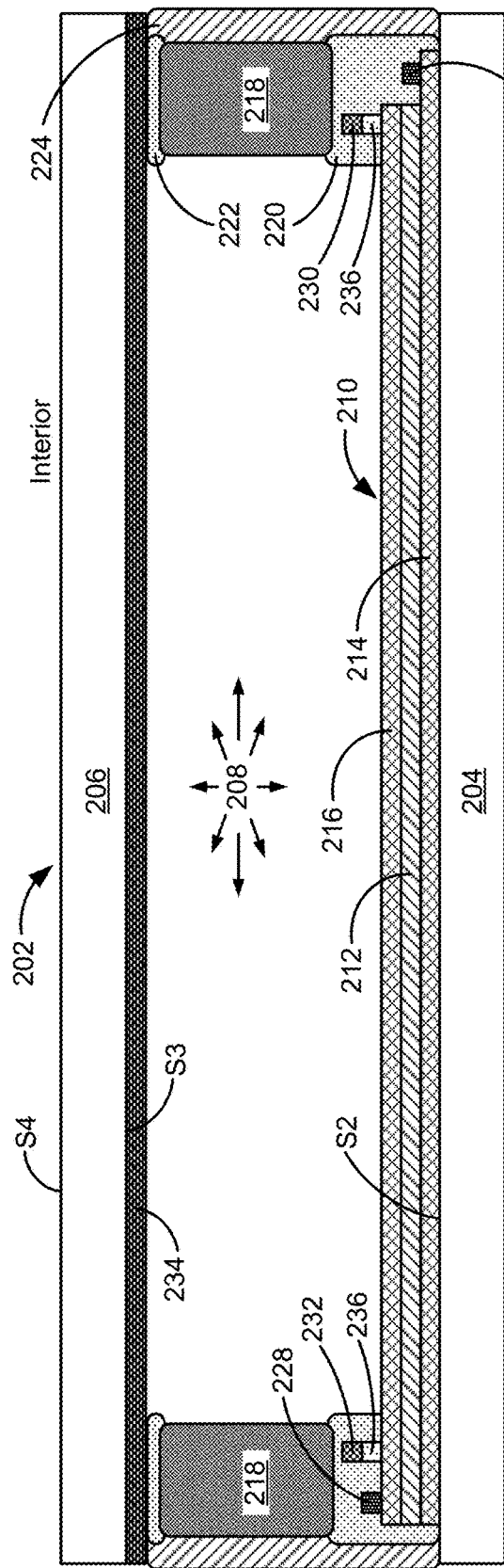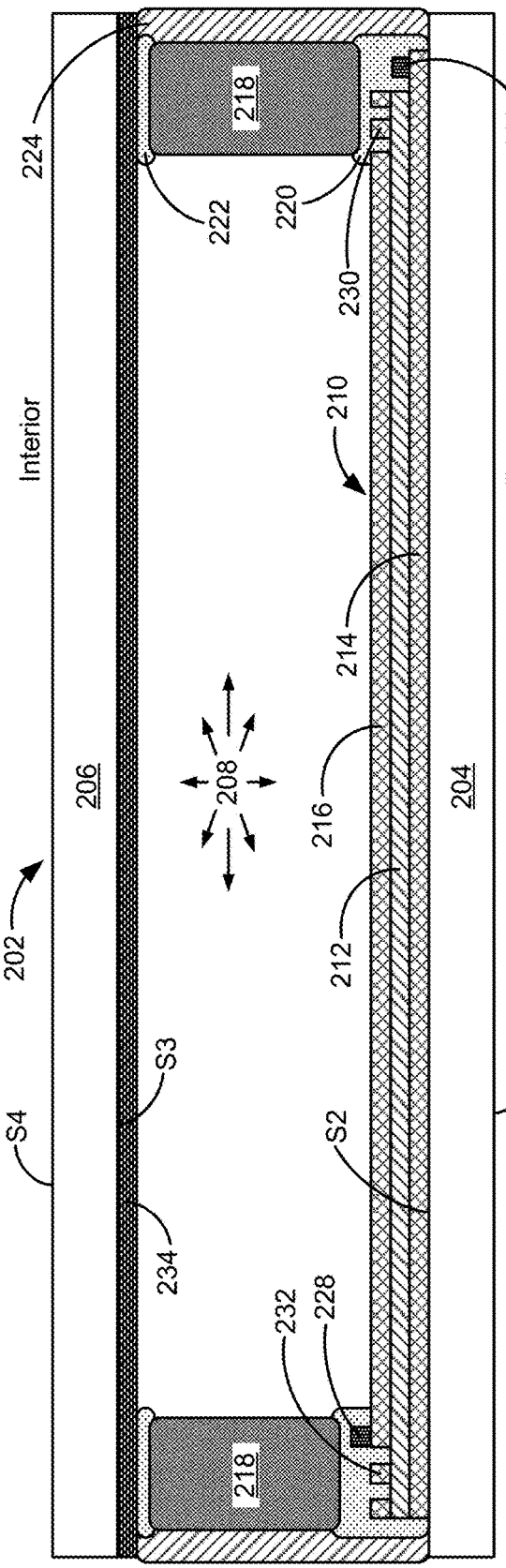

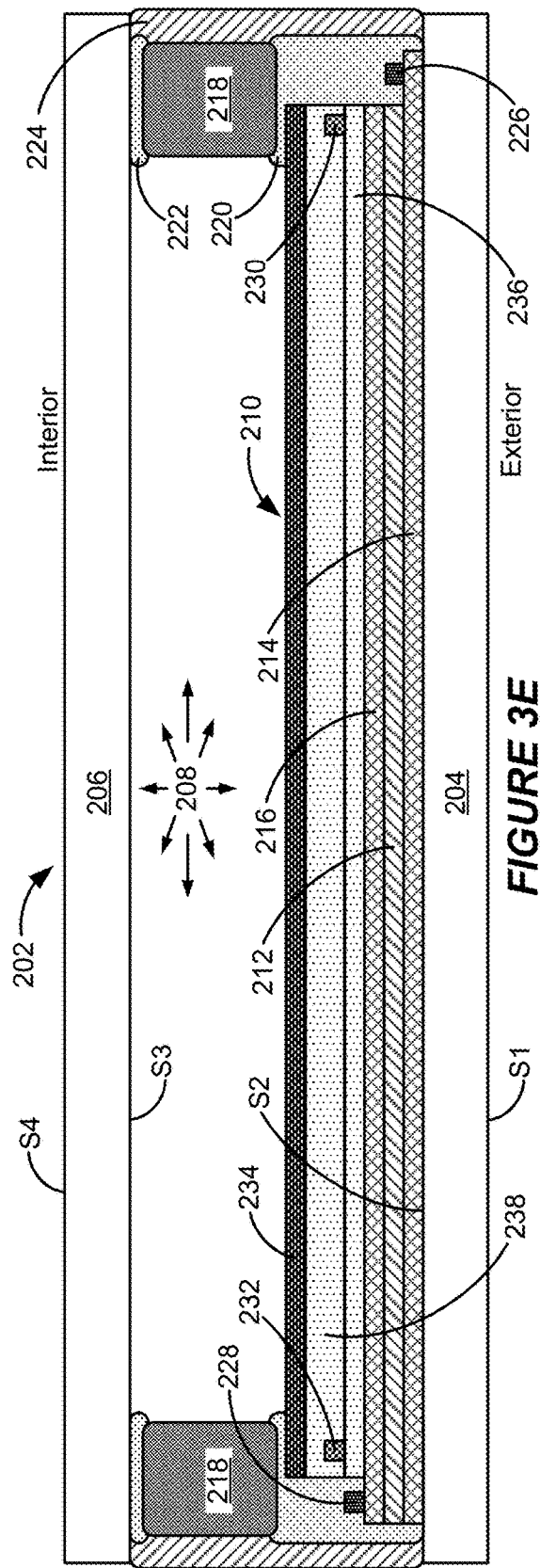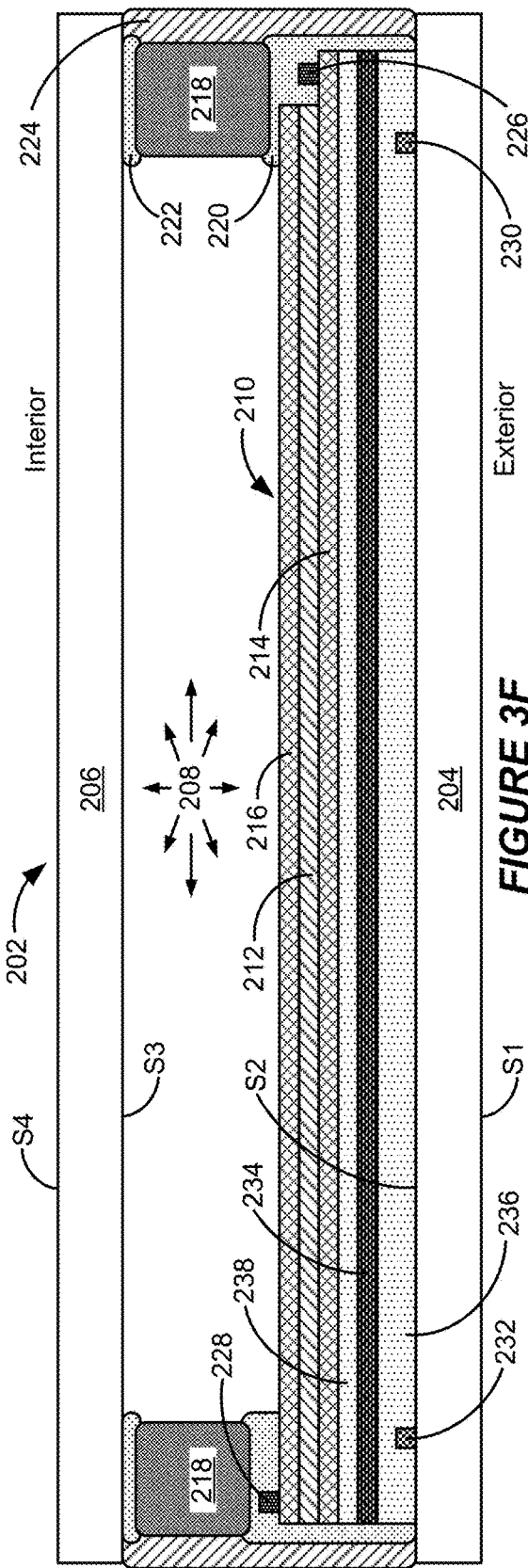

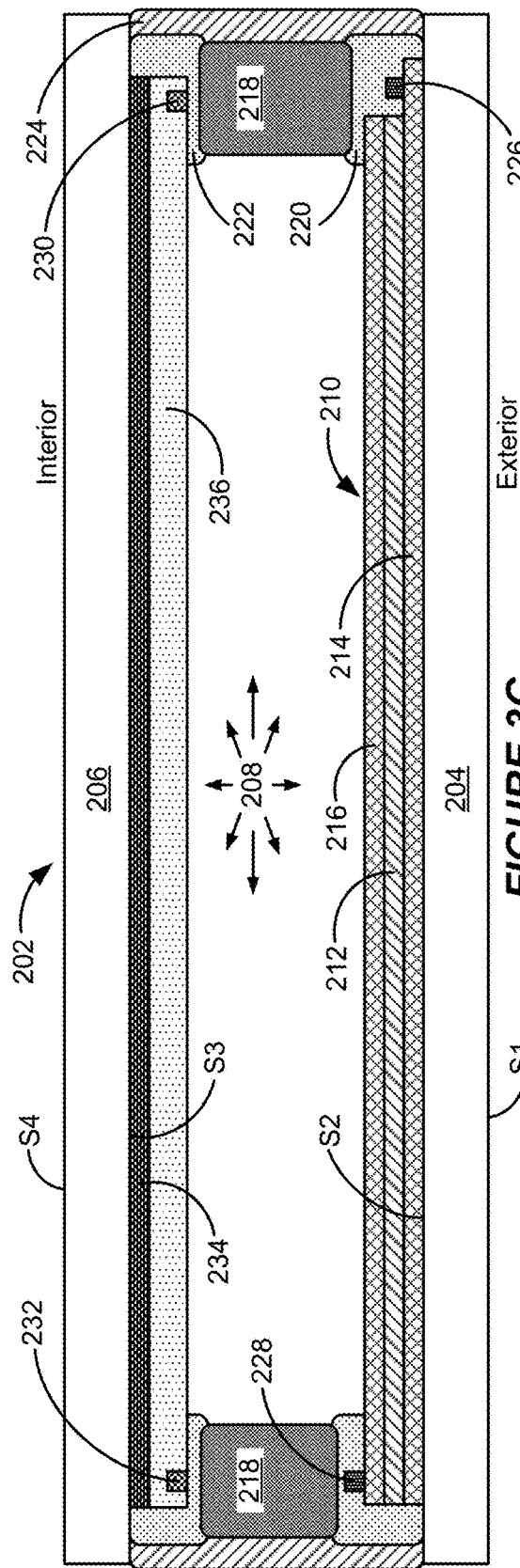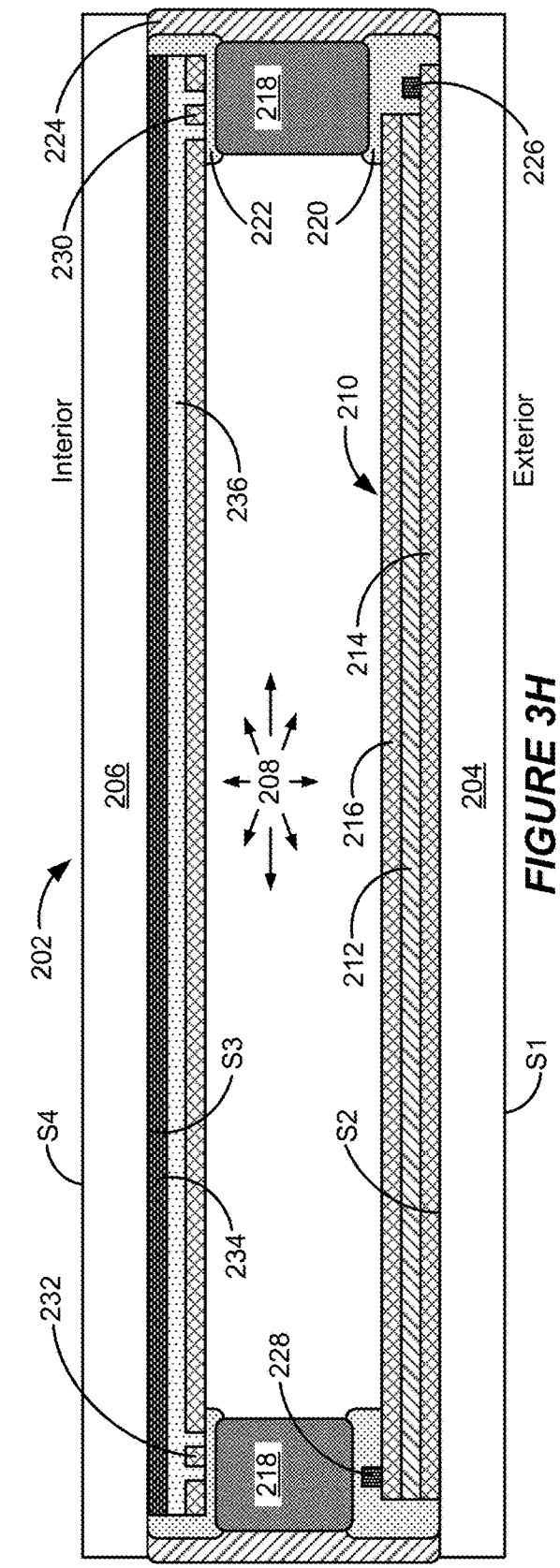
FIGURE 3G
FIGURE 3H

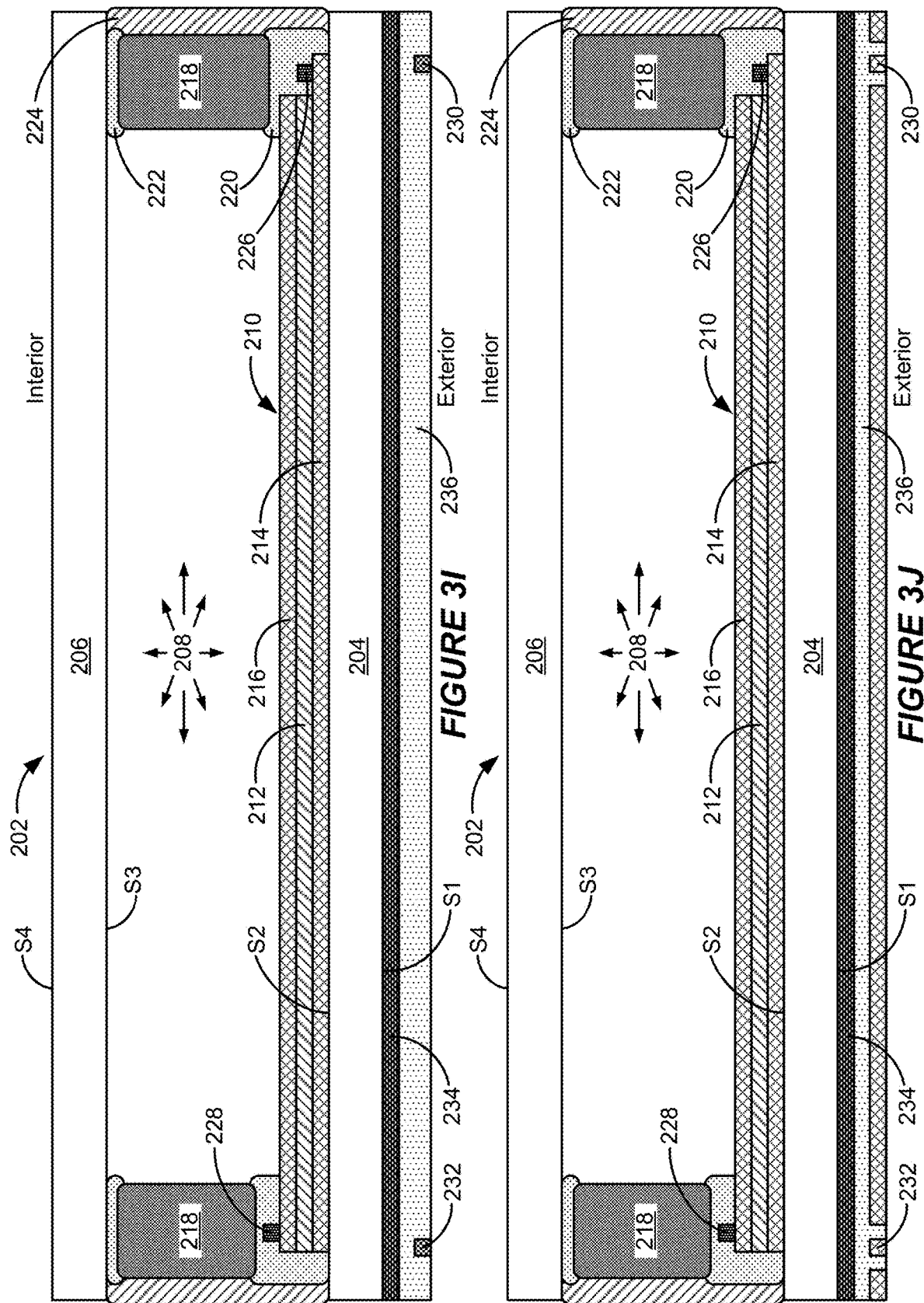

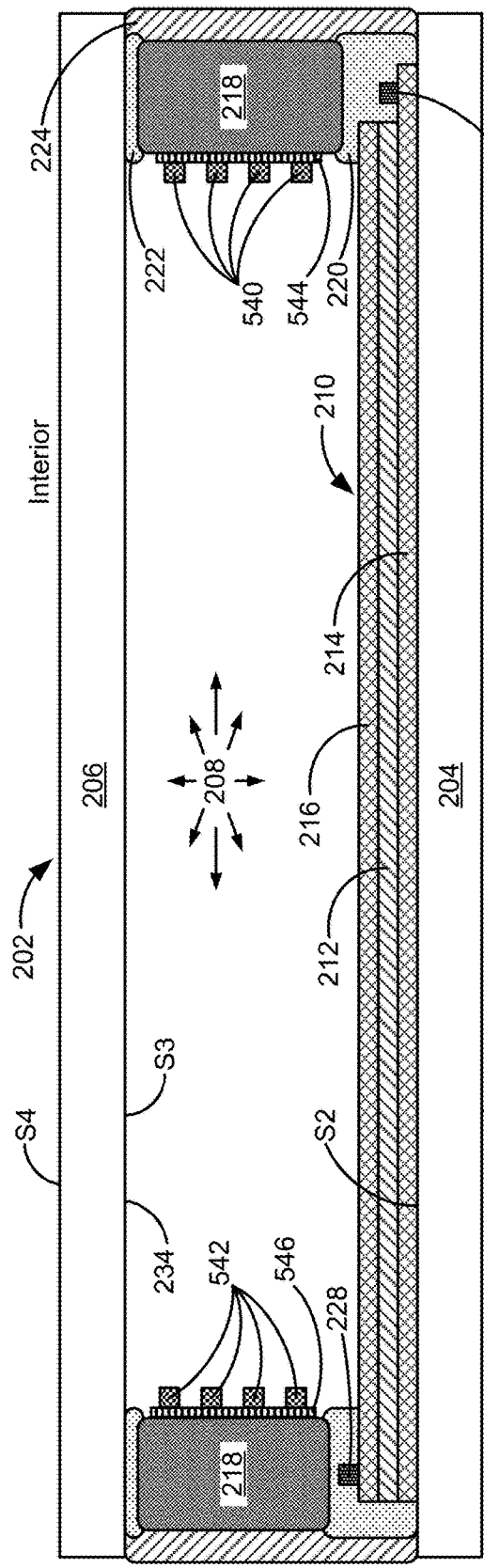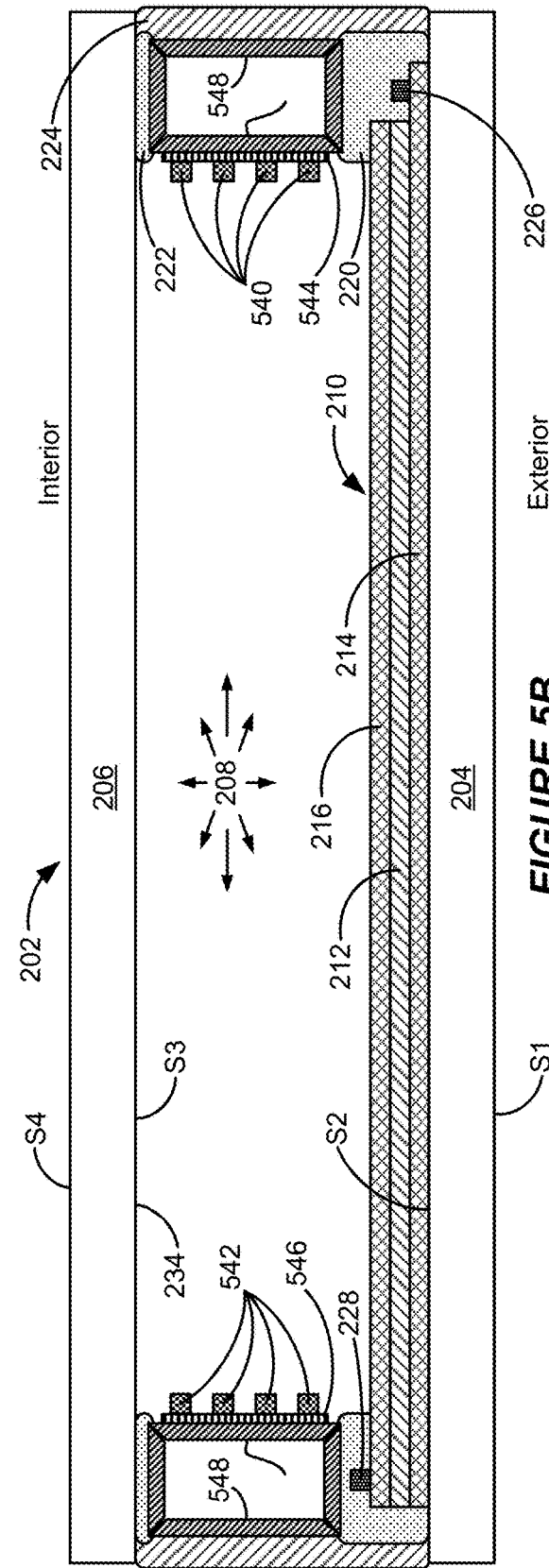
FIGURE 5A
FIGURE 5B

FOUR ANTENNAS, FOUR BANDS

ONE ANTENNA, FOUR BANDS

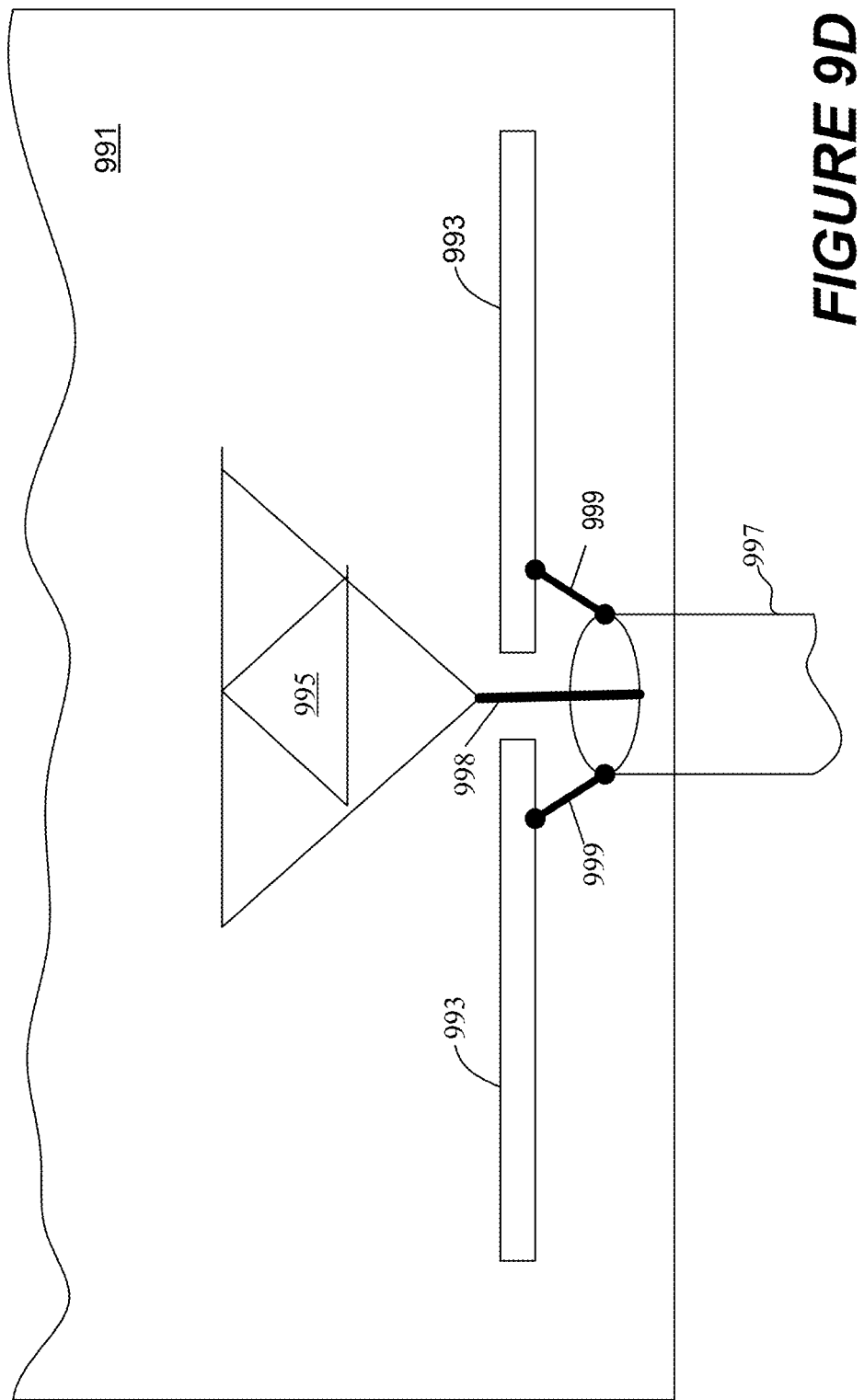

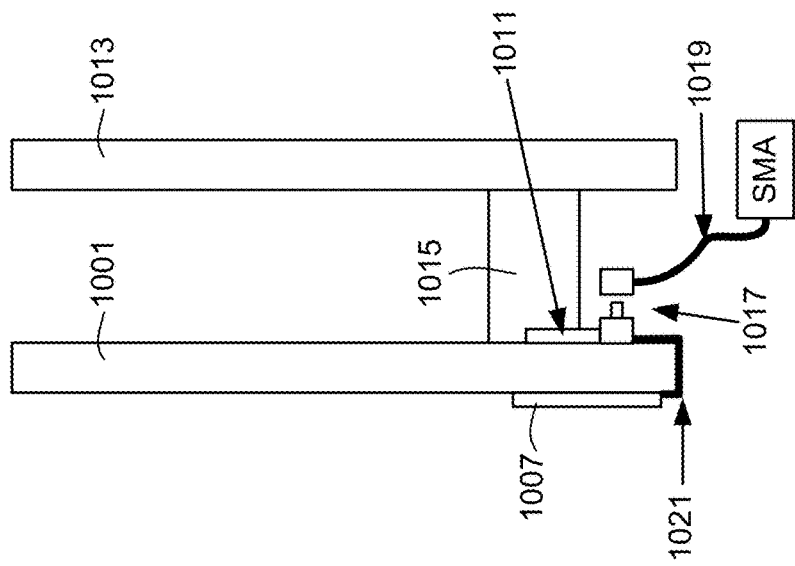
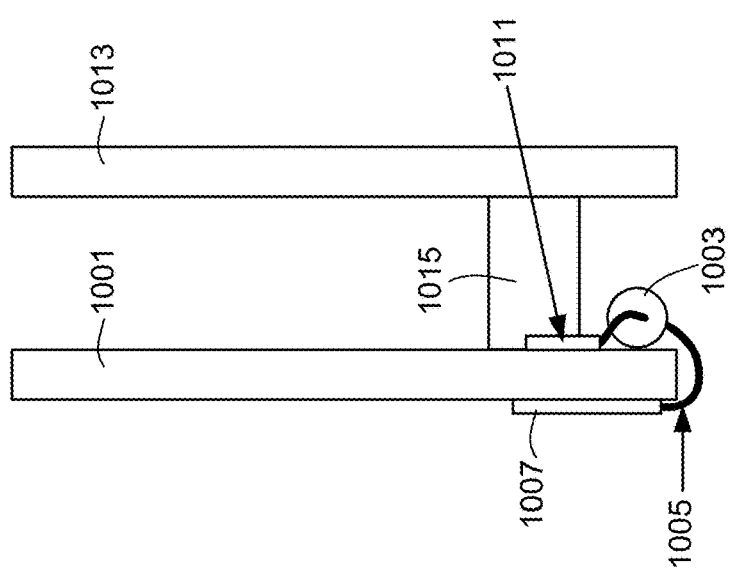
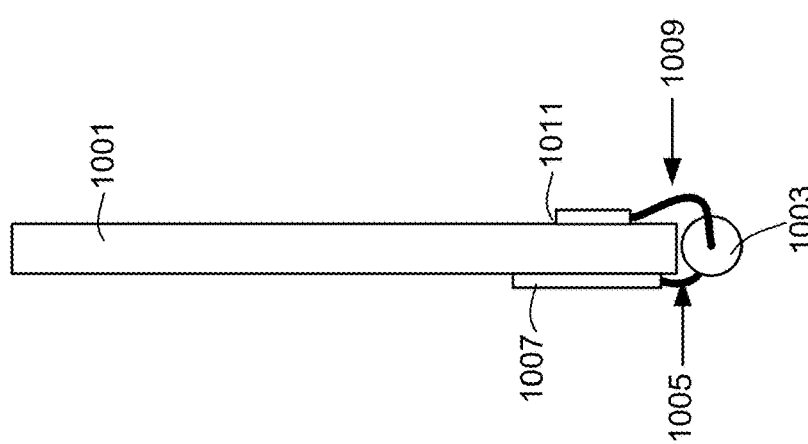

Fig. 11D
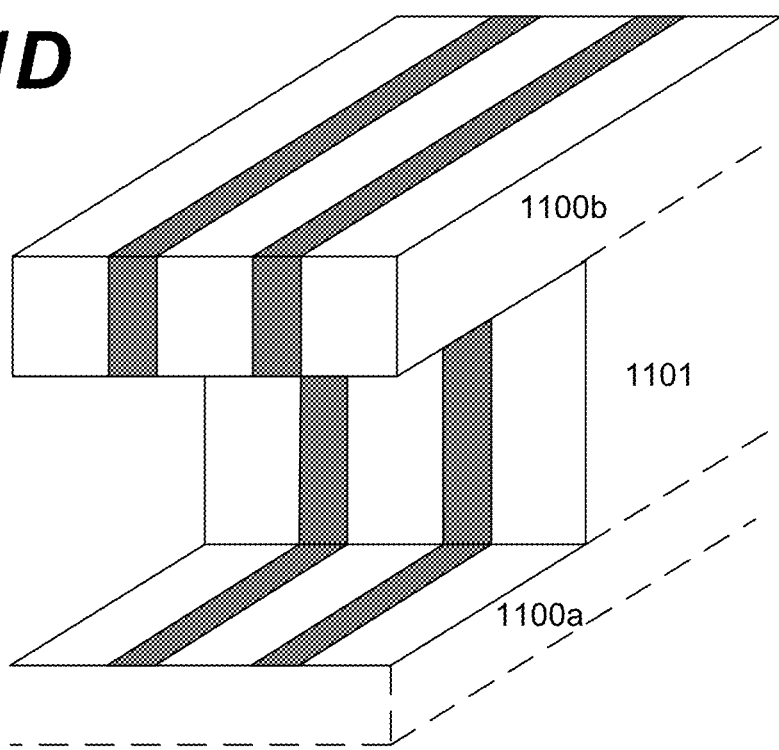
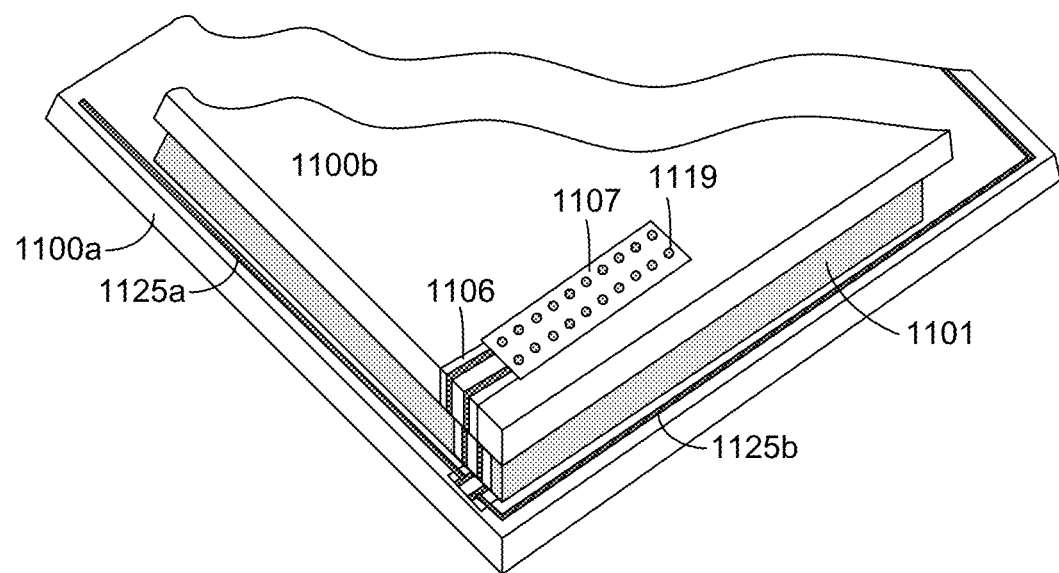
Fig. 11E

| | | | | |
|---|---|---|---|---|
| | | | | |

LOC ID:   East1      East2      East3      East4      East5
CAN ID:   _____    _____    _____    _____    _____
LITE ID:  _____    _____    _____    _____    _____

| NC$_1$ |
|---|
| CAN ID: XXXX1     LOC ID_____ |
| LITE ID: YYYY1 |
| ⋮ |
| CAN ID: XXXXm     LOC ID_____ |
| LITE ID: YYYYm |

*Fig. 14E*

| LOC ID: | East1 | East2 | East3 | East4 | East5 |
|---|---|---|---|---|---|
| CAN ID: | ___ | ___ | ___ | ___ | XXXX1 |
| LITE ID: | ___ | ___ | ___ | ___ | YYYY1 |

| NC$_1$ | |
|---|---|
| CAN ID: XXXX1<br>LITE ID: YYYY1 | LOC ID: East 5 |
| ⋮ | |
| CAN ID: XXXXm<br>LITE ID: YYYYm | LOC ID ___ |

*Fig. 14G*

WINDOW ANTENNAS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates generally to electrochromic devices, which may be used in electrochromic windows for buildings or other structures.

BACKGROUND

Electrochromism is a phenomenon in which a material exhibits a reversible electrochemically-mediated change in one or more optical properties when stimulated to a different electronic state. Electrochromic materials, and the devices made from them, may be incorporated into, for example, windows for home, commercial, or other uses. The color, transmittance, absorbance, or reflectance of such electrochromic windows can be changed by inducing a change in the electrochromic material, for example, by applying a voltage across the electrochromic material. Such capabilities can allow for control over the intensities of various wavelengths of light that may pass through the window. For example, a first voltage applied to an electrochromic device of the window may cause the window to darken while a second voltage may cause the window to lighten.

Electrochromic devices, like most controllable optically-switchable devices, contain electrical connections for controlling the application of electrical stimulus (for example, in the form of a controlled applied voltage and/or current) to drive optical transitions and/or to maintain optical states. Electrochromic devices are frequently implemented as very thin layers that cover the face of a surface such as a window surface. Such devices typically include transparent conductors, often in the form of one or more layers that cover electrochromic electrodes and distribute applied voltage over the face of the device to effect a complete and efficient optical transmission.

SUMMARY

One aspect of the disclosure pertains to a window antenna characterized by the following features: (a) a window having one or more lites, each comprising at least two surfaces having regions configured for viewing through the window; (b) an electrochromic device disposed on a first surface of the window; (c) an antenna structure disposed on the first surface or a second surface of the window; and (d) a ground plane disposed on the first surface of the window, the second surface of the window, a third surface of the window, or a structure connected to the window. In certain embodiments, the lite has a length or width that is at least about 60 inches. In certain embodiments, the electrochromic device does not have an ion conductor deposited between electrochromic and counter electrode layers.

The antenna structure may have various configurations such as a strip line or a patch. In certain embodiments, the strip line or patch structure may serve as part of a monopole antenna. In one such embodiment, a strip line has an axis along its length and the ground plane is substantially perpendicular to the axis of the strip line. Such ground plane is disposed on the same surface as the antenna structure or disposed on a structure connected to the window. In certain embodiments, a strip line has an axis along its length and the ground plane is substantially parallel to the axis of the strip line. The ground plane may be provided on a different plane than the strip line, e.g., on a different surface of a window lite. In certain embodiments, the antenna structure includes a two strip lines, where the strip lines are configured as a dipole antenna. In some embodiments, the two strip lines are substantially parallel. Unless otherwise stated herein, all references to a strip line can replaced with references to a patch.

In certain embodiments, the antenna structure comprises a fractal structure. In one example, the fractal structure is disposed on a plane and wherein the ground plane is substantially perpendicular to the plane of the fractal structure. In some such examples, the ground plane is disposed on the same surface as the antenna structure. In some such examples, the ground plane is disposed on a structure connected to the window. In certain embodiments, the fractal structure is disposed on a plane and the ground plane is substantially parallel to the plane of the fractal structure (e.g., located on a separate surface).

In certain embodiments, the antenna structure is configured as a dipole antenna such as a Yagi antenna or a log periodic antenna.

In some implementations, the window antenna additionally includes an antenna controller. In some cases, the antenna controller is disposed on the window. In certain embodiments, the antenna controller includes a transmitter and/or receiver for the antenna structure. In some implementations, the window antenna additionally includes a window controller configured to control optical transitions of the electrochromic device. In some cases, the window controller and the antenna controller are disposed in a single carrier and/or enclosure.

Another aspect of the disclosure pertains to a system including: (i) a plurality of window antennas as described in any of the embodiments presented herein; (ii) a plurality of controllers each configured to: (A) drive the electrochromic devices, and (B) drive the at least one antenna structure in each of the window antennas; and (iii) a network controller for providing instructions to the plurality of controllers.

Another aspect of the disclosure pertains to an insulated glass unit (IGU) that may be characterized by the following features: (a) two or more lites, each having at least two surfaces with a region configured for viewing through the IGU; (b) a spacer separating the lites from one another, where the spacer is provided proximate perimeter regions of the lites; (c) an antenna structure disposed on a surface of a lite, the spacer, or an electrical connector on the IGU; and (d) a ground plane disposed on the IGU or a frame structure in which the IGU is mounted. In certain embodiments, at least one lite of the IGU has a length or width that is at least about 60 inches.

In the IGU, the antenna structure may have various configurations such as a strip line or a patch. In certain embodiments, the strip line or patch structure may serve as part of a monopole antenna. In one such embodiment, a strip line has an axis along its length and the ground plane is substantially perpendicular to the axis of the strip line. Such ground plane is disposed on the same surface as the antenna structure or disposed on a structure connected to the window (e.g., on the spacer or on a frame structure, a mullion, or a transom). In certain embodiments, a strip line has an axis along its length and the ground plane is substantially parallel to the axis of the strip line. The ground plane may be provided on a different plane than the strip line, e.g., on a different surface of a window lite. In certain embodiments, the antenna structure includes a two strip lines, where the strip lines are configured as a dipole antenna. In some embodiments, the two strip lines are substantially parallel.

In certain IGU embodiments, the antenna structure comprises a fractal structure. In one example, the fractal structure is disposed on a plane and wherein the ground plane is substantially perpendicular to the plane of the fractal structure. In some such examples, the ground plane is disposed on the same surface as the antenna structure. In some such examples, the ground plane is disposed on a structure connected to the window (e.g., on the spacer or on a frame structure, a mullion, or a transom). In certain embodiments, the fractal structure is disposed on a plane and the ground plane is substantially parallel to the plane of the fractal structure (e.g., located on a separate surface).

In certain embodiments, the antenna structure is configured as a dipole antenna such as a Yagi antenna or a log periodic antenna.

In some implementations, the window antenna additionally includes an antenna controller. In some cases, the antenna controller is disposed on the window. In certain embodiments, the antenna controller includes a transmitter and/or receiver for the antenna structure. In some implementations, the window antenna additionally includes a window controller configured to control optical transitions of the electrochromic device. In some cases, the window controller and the antenna controller are disposed in a single carrier and/or enclosure.

In certain embodiments, a lite of the IGU includes an electrochromic device disposed on a first surface. In certain embodiments, the electrochromic device does not have an ion conductor deposited between electrochromic and counter electrode layers.

Another aspect of the disclosure pertains to a system including: (i) a plurality of IGUs as described in any of the embodiments presented herein; (ii) a plurality of controllers each configured to: (A) drive electrochromic devices disposed in the IGUs, and (B) drive the at least one antenna structure in each of the IGUs; and (iii) a network controller for providing instructions to the plurality of controllers.

Another aspect of the disclosure pertains a building that may be characterized by the following features: (a) a plurality of windows, each having one or more lites; (b) a plurality of antennas disposed on the plurality of windows; and (c) control logic configured to operate the building's antennas as a cellular base station or a cellular repeater.

In some aspects, the building includes the following features: (a) a controller network including control logic to generate one or more control signals; (b) a plurality of transmitters each configured to generate a transmission signal based on one or more of the control signals; (c) a plurality of windows; and (d) a plurality of antennas in or on the windows, each antenna configured to radiate at least one transmission signal from at least one corresponding transmitter.

In certain embodiments, the transmitters include (i) a carrier signal generator to generate a carrier signal having a carrier amplitude and a carrier frequency; and (ii) a modulator to modulate the carrier signal to provide the transmission signal. In certain embodiments, the modulator is configured to perform one or more of amplitude modulation, frequency modulation and phase modulation of the carrier signal to provide the transmission signal. In certain embodiments, the modulator is configured to perform code division multiple access (CDMA) modulation of the carrier signal to provide the transmission signal.

In some implementations, the building additionally includes a plurality of receivers to demodulate signals received from the antennas. In some implementations, the controller network including a plurality of distributed antenna controllers and at least one master or network controller. In some examples, the at least one master or network controller includes control logic to communicate with a base station controller (BSC). The control logic may be distributed at least partially between the master controller and the distributed antenna controllers. In certain embodiments, the control logic including spatial filtering logic to generate the control signals based on spatial filtering, the radiated transmission signals collectively having a wavefront based on the spatial filtering. In certain embodiments, the controller network is further configured to control optical states of the windows.

In some implementations, the building additionally includes (i) a plurality of receivers to receive signals from the antennas; and (ii) a plurality of amplifiers to amplify the received signals, where the transmission signals are based on the amplified signals.

In some implementations, the building additionally includes (i) a plurality of receivers to receive signals from the antennas, the received signals associated with a first wireless communication protocol; and (ii) a plurality of protocol converters to convert the received signals from the first wireless communication protocol to a second wireless communication protocol, where the transmission signals are the converted signals.

Another aspect of the disclosure pertains to a window antenna that may be characterized by the following features: (a) a window having one or more lites, each comprising (i) two surfaces having regions configured for viewing through the window, and (ii) a perimeter edge separating the two surfaces; (b) an antenna disposed on the window; (c) a controller comprising an antenna transmitter and/or receiver; and (d) an electrical interconnect between the controller and the antenna, wherein the electrical interconnect passes over and contacts the perimeter edge of at least one of the lites. In certain embodiments, at least one lite of the window antenna has a length or width that is at least about 60 inches.

In certain embodiments, the antenna includes an antenna structure and a ground plane. The electrical interconnect may include a cable having a grounded conductor connected to the ground plane and a powered conductor connected to the antenna structure, where the grounded conductor the powered conductor split apart proximate the perimeter edge of the at least one lite.

In certain embodiments, the electrical interconnect includes a tape comprising an adhesive material and a conductor. In some examples, the tape includes three parallel conductors: a central wire for carrying signals between an antenna structure and the controller, and two outer wires that are grounded. In some examples, the window antenna further includes a connector disposed on or proximate the perimeter edge of the at least one lite, where the tape electrically connects the antenna to the connector and wherein a separate conductor electrically connects the controller to the connector.

In certain embodiments, the window includes at least two lites separated by a spacer separating the lites from one another, wherein the spacer is provided proximate perimeter regions of the lites, and wherein the electrical interconnect passes though the spacer.

In certain embodiments, the antenna of this aspect includes an antenna structure and a ground plane. As with aspects described above, the antenna structure may have various configurations such as a strip line or a patch. In certain embodiments, the strip line or patch structure may serve as part of a monopole antenna. In one such embodiment, a strip line has an axis along its length and the ground plane is substantially perpendicular to the axis of the strip line. Such ground plane is disposed on the same surface as the antenna structure or disposed on a structure connected to the window. In certain embodiments, a strip line has an axis along its length and the ground plane is substantially parallel to the axis of the strip line. The ground plane may be provided on a different plane than the strip line, e.g., on a different surface of a window lite. In certain embodiments, the antenna structure includes a two strip lines, where the strip lines are configured as a dipole antenna. In some embodiments, the two strip lines are substantially parallel.

In certain embodiments of this aspect of the disclosure, the antenna structure comprises a fractal structure. In one example, the fractal structure is disposed on a plane and wherein the ground plane is substantially perpendicular to the plane of the fractal structure. In some such examples, the ground plane is disposed on the same surface as the antenna structure. In some such examples, the ground plane is disposed on a structure connected to the window. In certain embodiments, the fractal structure is disposed on a plane and the ground plane is substantially parallel to the plane of the fractal structure (e.g., located on a separate surface).

In certain embodiments, the antenna structure is configured as a dipole antenna such as a Yagi antenna or a log periodic antenna.

In some implementations of this aspect of the disclosure, the controller of the window antenna is disposed on the window. In certain embodiments, the antenna controller includes a transmitter and/or receiver for the antenna structure. In some implementations, the window antenna additionally includes a window controller configured to control optical transitions of an electrochromic device. In some cases, the window controller and the antenna controller are disposed in a single carrier and/or enclosure.

In certain embodiments, a surface of a lite of the window antenna includes an electrochromic device disposed on a first surface. In certain embodiments, the electrochromic device does not have an ion conductor deposited between electrochromic and counter electrode layers.

Another embodiment of this aspect of the disclosure pertains to a system including: (i) a plurality of window antennas as described in any of the embodiments presented herein; (ii) a plurality of controllers each configured to: (A) drive the electrochromic devices, and (B) drive the at least one antenna structure in each of the window antennas; and (iii) a network controller for providing instructions to the plurality of controllers.

Certain aspects of the disclosure pertain to personalizing settings of a region of a building, where settings are defined for particular users. A method for personalizing settings may include the following operations: (a) establishing a communications link between a mobile device carried by a user and a window antenna in the region of the building, wherein said communications link can be established only when the mobile device is within or near the region; (b) receiving user identification information over the communications link; (c) determining one or more settings for the user identification in the region of the building; and (d) applying the determined setting(s) in the region of the building.

In certain embodiments, the personalization methods employ one or more settings selected from the group consisting of (i) tint level for one or more windows in the region of the building; (ii) permitting communications shielding in the region of the building; (iii) permitted notifications based on location of the mobile device in the region of the building; (iv) permitting communication of one or more settings to one or more non-window systems in the region of the building; (v) permitting wireless charging of one or more battery powered devices (e.g., a mobile device) in the region of the building; and (vi) combinations thereof. In certain embodiments, the one or more settings include a tint level for a window in the region of the building.

In certain embodiments, the one or more non-window systems are selected from the group consisting of temperature control systems for the region of the building, lighting systems for the region of the building, and lock systems for the region of the building.

These and other features of window antennas will be further described in the Detailed Description with reference to the associated drawings.

BRIEF DESCRIPTION OF THE DRAWINGS

FIGS. 2A-2J show cross-sectional views of example electrochromic window structures with integrated antennas capable of transmitting signals into, or receiving signals from, an interior environment according to some implementations.

FIGS. 3A-3J show cross-sectional views of example electrochromic window structures with integrated antennas capable of transmitting signals out to, or receiving signals from, an exterior environment according to some implementations.

FIGS. 5A and 5B show cross-sectional views of example electrochromic window structures with integrated antennas according to some implementations.

FIG. 9D shows an example of a patch antenna and a ground plane strip disposed on the same surface of a lite.

FIGS. 10A-10F illustrate various interconnect structures for providing separate connections to antenna structures and ground planes.

FIGS. 11A-11H illustrate designs in which an antenna controller (receiver and/or transmitter logic) is provided on a window, in some cases along with a window controller, and arranged to deliver signal to communicate with antenna elements on the window.

FIGS. 14A-14G depict aspects of certain embodiments for using window antennas to commission switchable windows in a building or other facility.

Like reference numbers and designations in the various drawings indicate like elements.

DETAILED DESCRIPTION

The following detailed description is directed to certain embodiments or implementations for the purposes of describing the disclosed aspects. However, the teachings herein can be applied and implemented in a multitude of different ways. In the following detailed description, references are made to the accompanying drawings. Although the disclosed implementations are described in sufficient detail to enable one skilled in the art to practice the implementations, it is to be understood that these examples are not limiting; other implementations may be used and changes may be made to the disclosed implementations without departing from their spirit and scope. Furthermore, while the disclosed embodiments focus on electrochromic windows (also referred to as smart windows), the concepts disclosed herein may apply to other types of switchable optical devices including, for example, liquid crystal devices and suspended particle devices, among others. For example, a liquid crystal device or a suspended particle device, rather than an electrochromic device, could be incorporated into some or all of the disclosed implementations. Additionally, the conjunction "or" is intended herein in the inclusive sense where appropriate unless otherwise indicated; for example, the phrase "A, B or C" is intended to include the possibilities of "A," "B," "C," "A and B," "B and C," "A and C" and "A, B and C."

Window Controller Networks

Figure 1A:
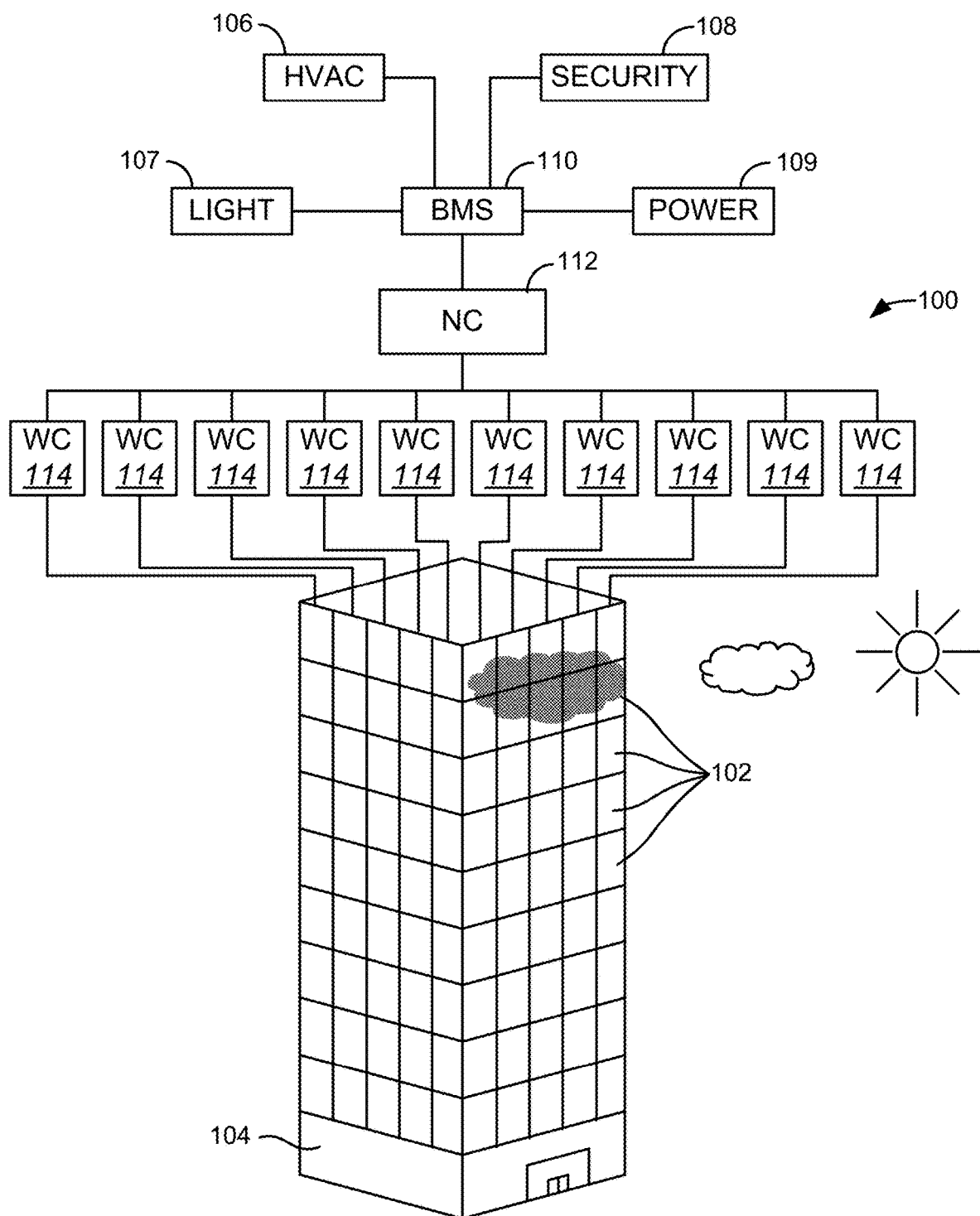
FIG. 1A shows a depiction of an example system for controlling and driving a plurality of electrochromic windows.

FIG. 1A shows a depiction of an example system 100 for controlling and driving a plurality of electrochromic windows 102. It may also be employed to control the operation of one or more window antennas as described elsewhere herein. The system 100 can be adapted for use with a building 104 such as a commercial office building or a residential building. In some implementations, the system 100 is designed to (hereinafter "designed to," "adapted to," "configured to," "programmed to", "operable to", and "capable of" may be used interchangeably where appropriate) to function in conjunction with modern heating, ventilation, and air conditioning (HVAC) systems 106, interior lighting systems 107, security systems 108 and power systems 109 as a single holistic and efficient energy control system for the entire building 104, or a campus of buildings 104. Some implementations of the system 100 are particularly well-suited for integration with a building management system (BMS) 110. The BMS 110 is a computer-based control system that can be installed in a building to monitor and control the building's mechanical and electrical equipment such as HVAC systems, lighting systems, power systems, elevators, fire systems, and security systems. The BMS 110 can include hardware and associated firmware or software for maintaining conditions in the building 104 according to preferences set by the occupants or by a building manager or other administrator. The software can be based on, for example, internet protocols or open standards.

A BMS can typically be used in large buildings where it functions to control the environment within the building. For example, the BMS 110 can control lighting, temperature, carbon dioxide levels, and humidity within the building 104. There can be numerous mechanical or electrical devices that are controlled by the BMS 110 including, for example, furnaces or other heaters, air conditioners, blowers, and vents. To control the building environment, the BMS 110 can turn on and off these various devices according to rules or in response to conditions. Such rules and conditions can be selected or specified by a building manager or administrator, for example. One primary function of the BMS 110 is to maintain a comfortable environment for the occupants of the building 104 while minimizing heating and cooling energy losses and costs. In some implementations, the BMS 110 can be configured not only to monitor and control, but also to optimize the synergy between various systems, for example, to conserve energy and lower building operation costs.

Some implementations are alternatively or additionally designed to function responsively or reactively based on feedback sensed through, for example, thermal, optical, or other sensors or through input from, for example, an HVAC or interior lighting system, or an input from a user control. Further information may be found in U.S. Pat. No. 8,705, 162, issued Apr. 22, 2014, which is incorporated herein by reference in its entirety. Some implementations also can be utilized in existing structures, including both commercial and residential structures, having traditional or conventional HVAC or interior lighting systems. Some implementations also can be retrofitted for use in older residential homes.

The system 100 includes a network controller 112 configured to control a plurality of window controllers 114. For example, the network controller 112 can control tens, hundreds, or even thousands of window controllers 114. Each window controller 114, in turn, can control and drive one or more electrochromic windows 102. In some implementations, the network controller 112 issues high level instructions such as the final tint state of an electrochromic window and the window controllers receive these commands and directly control their windows by applying electrical stimuli to appropriately drive tint state transitions and/or maintain tint states. The number and size of the electrochromic windows 102 that each window controller 114 can drive is generally limited by the voltage and current characteristics of the load on the window controller 114 controlling the respective electrochromic windows 102. In some implementations, the maximum window size that each window controller 114 can drive is limited by the voltage, current, or power requirements to cause the desired optical transitions in the electrochromic window 102 within a desired timeframe. Such requirements are, in turn, a function of the surface area of the window. In some implementations, this relationship is nonlinear. For example, the voltage, current, or power requirements can increase nonlinearly with the surface area of the electrochromic window 102. For example, in some cases the relationship is nonlinear at least in part because the sheet resistance of the first and second conductive layers 214 and 216 (see, for example, FIG. 2A) increases nonlinearly with distance across the length and width of the first or second conductive layers. In some implementations, the relationship between the voltage, current, or power requirements required to drive multiple electrochromic windows 102 of equal size and shape is, however, directly proportional to the number of the electrochromic windows 102 being driven.

Figure 1B:
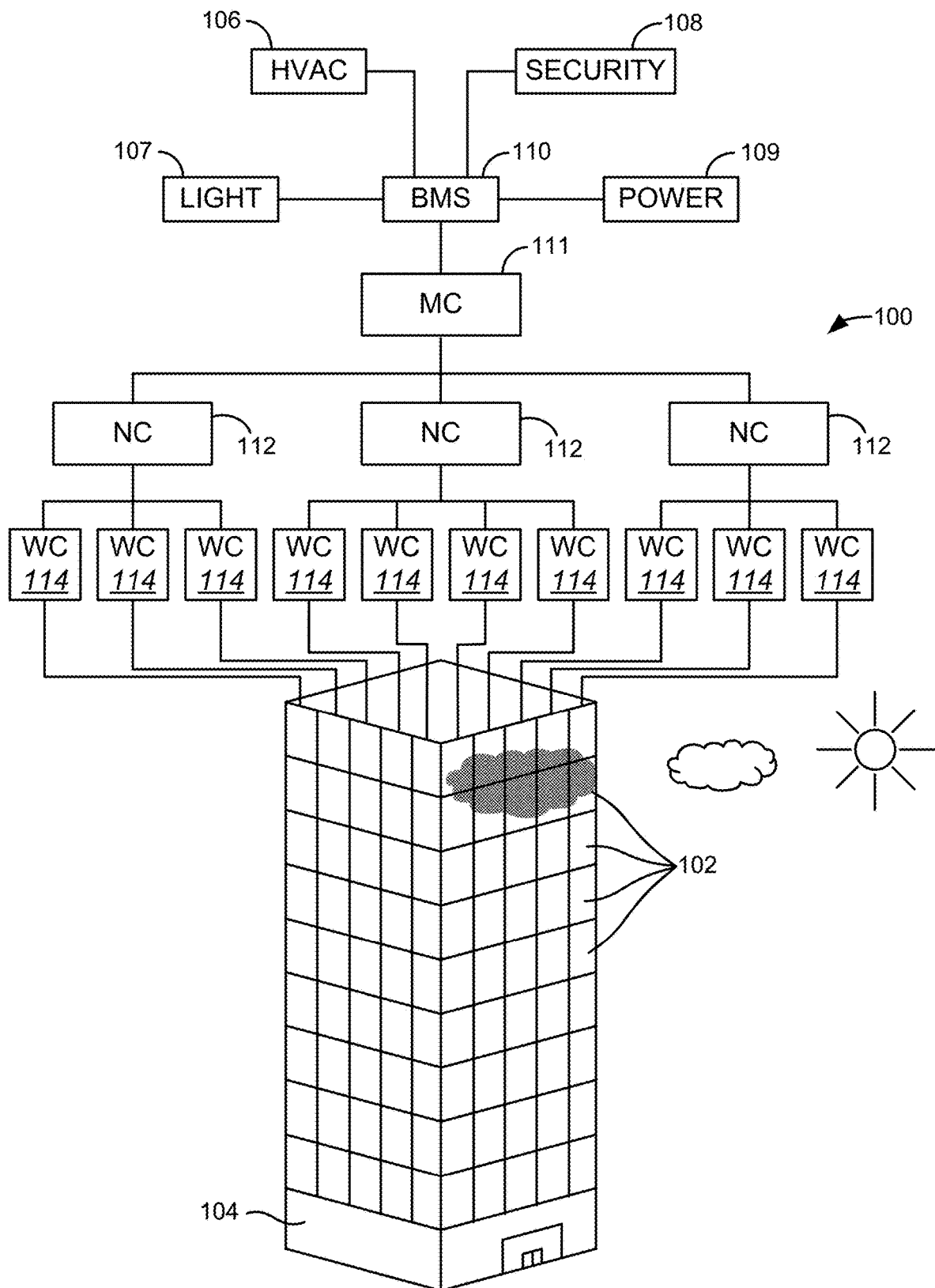
FIG. 1B shows a depiction of another example system for controlling and driving a plurality of electrochromic windows.

FIG. 1B shows a depiction of another example system 100 for controlling and driving a plurality of electrochromic windows 102. The system 100 shown in FIG. 1B is similar to the system 100 shown and described with reference to FIG. 1A. In contrast to the system of FIG. 1A, the system 100 shown in FIG. 1B includes a master controller 111. The master controller 111 communicates and functions in conjunction with multiple network controllers 112, each of which network controllers 112 is capable of addressing a plurality of window controllers 114 as described with reference to FIG. 1A. In some implementations, the master controller 111 issues the high level instructions (such as the final tint states of the electrochromic windows) to the network controllers 112, and the network controllers 112 then communicate the instructions to the corresponding window controllers 114.

In some implementations, the various electrochromic windows 102 and/or antennas of the building or other structure are advantageously grouped into zones or groups of zones, each of which includes a subset of the electrochromic windows 102. For example, each zone may correspond to a set of electrochromic windows 102 in a specific location or area of the building that should be tinted (or otherwise transitioned) to the same or similar optical states based on their location. As a more specific example, consider a building having four faces or sides: a North face, a South face, an East Face and a West Face. Consider also that the building has ten floors. In such a didactic example, each zone can corresponding to the set of electrochromic windows 102 on a particular floor and on a particular one of the four faces. In some such implementations, each network controller 112 can address one or more zones or groups of zones. For example, the master controller 111 can issue a final tint state command for a particular zone or group of zones to a respective one or more of the network controllers 112. For example, the final tint state command can include an abstract identification of each of the target zones. The designated network controllers 112 receiving the final tint state command can then map the abstract identification of the zone(s) to the specific network addresses of the respective window controllers 114 that control the voltage or current profiles to be applied to the electrochromic windows 102 in the zone(s).

In the added aspect that the electrochromic windows may have antennas, e.g. configured for one or more purposes, zones of windows for tinting purposes may or may not correspond to zones for antenna-related functions. For example, a master and/or network controller may identify two distinct zones of windows for tinting purposes, e.g. two floors of windows on a single side of a building, where each floor has different tinting algorithms based on customer preferences. At the same time, these two tinting zones may be a single zone for antenna transmitting and/or receiving purposes or the "antenna zone" may include other windows, whether singly or as zones. Antenna-EC glass enables a broad variety of functionality by providing distinct functions of a tintable coating and an antennae. The antennae may serve not only the tintable coating function but also other functions as described in more detail herein.

Aspects of network systems for optically switchable windows and associated antennas are further described in U.S. Provisional Patent Application No. 62/248,181, filed Oct. 29, 2015, which is incorporated herein by reference in its entirety.

Figure 1C:
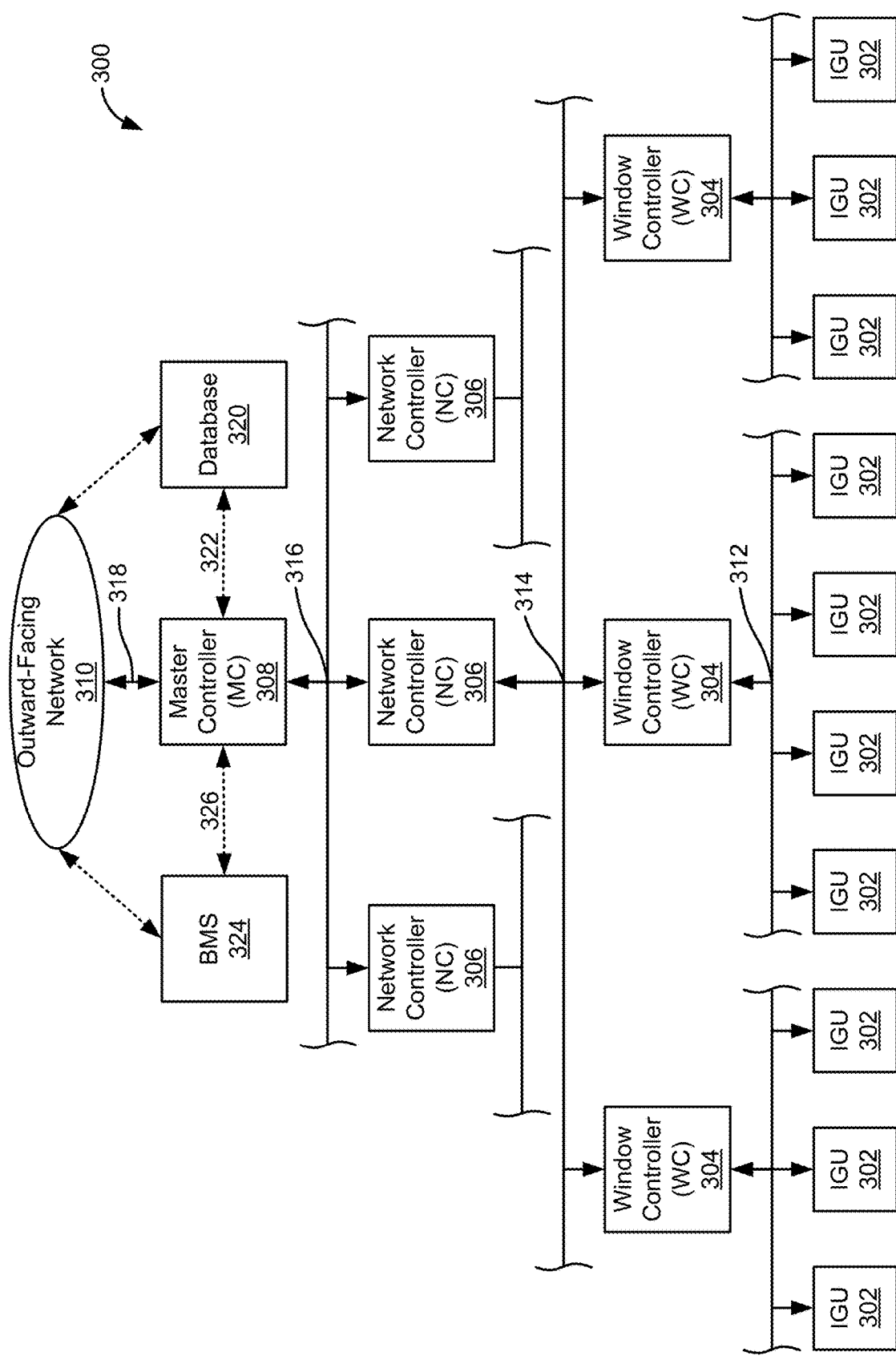
FIG. 1C shows a block diagram of an example network system, 120, operable to control a plurality of IGUs in accordance with some implementations.

In many instances, optically-switchable windows can form or occupy substantial portions of a building envelope. For example, the optically-switchable windows can form substantial portions of the walls, façades and even roofs of a corporate office building, other commercial building or a residential building. In various implementations, a distributed network of controllers can be used to control the optically-switchable windows. FIG. 1C shows a block diagram of an example network system, 300, operable to control a plurality of IGUs 302 with window antennas in accordance with some implementations. For example, each of the IGUs 302 can be the same or similar to the IGU 100 described above with reference to FIG. 1. One primary function of the network system 300 is controlling the optical states of the ECDs (or other optically-switchable devices) and/or the transmission and/or reception characteristics of window antennas within the IGUs 302. In some implementations, one or more of the windows 302 can be multi-zoned windows, for example, where each window includes two or more independently controllable ECDs or zones. In various implementations, the network system 300 is operable to control the electrical characteristics of the power signals provided to the IGUs 302. For example, the network system 300 can generate and communicate tinting instructions (also referred to herein as "tint commands") to control voltages applied to the ECDs within the IGUs 302.

In some implementations, another function of the network system 300 is to acquire status information from the IGUs 302 (hereinafter "information" is used interchangeably with "data"). For example, the status information for a given IGU can include an identification of, or information about, a current tint state of the ECD(s) within the IGU. The network system 300 also can be operable to acquire data from various sensors, such as temperature sensors, photosensors (also referred to herein as light sensors), humidity sensors, air flow sensors, or occupancy sensors, antennas, whether integrated on or within the IGUs 302 or located at various other positions in, on or around the building.

The network system 300 can include any suitable number of distributed controllers having various capabilities or functions. In some implementations, the functions and arrangements of the various controllers are defined hierarchically. For example, the network system 300 includes a plurality of distributed window controllers (WCs) 304, a plurality of network controllers (NCs) 306, and a master controller (MC) 308. In some implementations, the MC 308 can communicate with and control tens or hundreds of NCs 306. In various implementations, the MC 308 issues high level instructions to the NCs 306 over one or more wired or wireless links 316 (hereinafter collectively referred to as "link 316"). The instructions can include, for example, tint commands for causing transitions in the optical states of the IGUs 302 controlled by the respective NCs 306. Each NC 306 can, in turn, communicate with and control a number of WCs 304 over one or more wired or wireless links 314 (hereinafter collectively referred to as "link 314"). For example, each NC 306 can control tens or hundreds of the WCs 304. Each WC 304 can, in turn, communicate with, drive or otherwise control one or more respective IGUs 302 over one or more wired or wireless links 312 (hereinafter collectively referred to as "link 312").

The MC 308 can issue communications including tint commands, status request commands, data (for example, sensor data) request commands or other instructions. In some implementations, the MC 308 can issue such communications periodically, at certain predefined times of day (which may change based on the day of week or year), or based on the detection of particular events, conditions or combinations of events or conditions (for example, as determined by acquired sensor data or based on the receipt of a request initiated by a user or by an application or a combination of such sensor data and such a request). In some implementations, when the MC 308 determines to cause a tint state change in a set of one or more IGUs 302, the MC 308 generates or selects a tint value corresponding to the desired tint state. In some implementations, the set of IGUs 302 is associated with a first protocol identifier (ID) (for example, a BACnet ID). The MC 308 then generates and transmits a communication—referred to herein as a "primary tint command"—including the tint value and the first protocol ID over the link 316 via a first communication protocol (for example, a BACnet compatible protocol). In some implementations, the MC 308 addresses the primary tint command to the particular NC 306 that controls the particular one or more WCs 304 that, in turn, control the set of IGUs 302 to be transitioned. The NC 306 receives the primary tint command including the tint value and the first protocol ID and maps the first protocol ID to one or more second protocol IDs. In some implementations, each of the second protocol IDs identifies a corresponding one of the WCs 304. The NC 306 subsequently transmits a secondary tint command including the tint value to each of the identified WCs 304 over the link 314 via a second communication protocol. In some implementations, each of the WCs 304 that receives the secondary tint command then selects a voltage or current profile from an internal memory based on the tint value to drive its respectively connected IGUs 302 to a tint state consistent with the tint value. Each of the WCs 304 then generates and provides voltage or current signals over the link 312 to its respectively connected IGUs 302 to apply the voltage or current profile.

In some implementations, the various IGUs 302 can be advantageously grouped into zones of EC windows, each of which zones includes a subset of the IGUs 302. In some implementations, each zone of IGUs 302 is controlled by one or more respective NCs 306 and one or more respective WCs 304 controlled by these NCs 306. In some more specific implementations, each zone can be controlled by a single NC 306 and two or more WCs 304 controlled by the single NC 306. Said another way, a zone can represent a logical grouping of the IGUs 302. For example, each zone may correspond to a set of IGUs 302 in a specific location or area of the building that are driven together based on their location. As a more specific example, consider a building having four faces or sides: a North face, a South face, an East Face and a West Face. Consider also that the building has ten floors. In such a didactic example, each zone can correspond to the set of electrochromic windows 100 on a particular floor and on a particular one of the four faces. Additionally or alternatively, each zone may correspond to a set of IGUs 302 that share one or more physical characteristics (for example, device parameters such as size or age). In some other implementations, a zone of IGUs 302 can be grouped based on one or more non-physical characteristics such as, for example, a security designation or a business hierarchy (for example, IGUs 302 bounding managers' offices can be grouped in one or more zones while IGUs 302 bounding non-managers' offices can be grouped in one or more different zones).

In some such implementations, each NC 306 can address all of the IGUs 302 in each of one or more respective zones. For example, the MC 308 can issue a primary tint command to the NC 306 that controls a target zone. The primary tint command can include an abstract identification of the target zone (hereinafter also referred to as a "zone ID"). In some such implementations, the zone ID can be a first protocol ID such as that just described in the example above. In such cases, the NC 306 receives the primary tint command including the tint value and the zone ID and maps the zone ID to the second protocol IDs associated with the WCs 304 within the zone. In some other implementations, the zone ID can be a higher level abstraction than the first protocol IDs. In such cases, the NC 306 can first map the zone ID to one or more first protocol IDs, and subsequently map the first protocol IDs to the second protocol IDs. While the network examples presented herein pertain to tint commands for controlling optically tintable windows, the examples should be understood to also pertain to commands for controlling antenna operation in window antennas associated with the IGUs.

User or Third Party Interaction with Network

In some implementations, the MC 308 is coupled to one or more outward-facing networks, 310, (hereinafter collectively referred to as "the outward-facing network 310") via one or more wired or wireless links 318 (hereinafter "link 318"). In some such implementations, the MC 308 can communicate acquired status information or sensor data to remote computers, mobile devices, servers, databases in or accessible by the outward-facing network 310. In some implementations, various applications, including third party applications or cloud-based applications, executing within such remote devices can access data from or provide data to the MC 308. In some implementations, authorized users or applications can communicate requests to modify the tint states of various IGUs 302 to the MC 308 via the network 310. In some implementations, the MC 308 can first determine whether to grant the request (for example, based on power considerations or based on whether the user has the appropriate authorization) prior to issuing a tint or antenna control command. The MC 308 can then calculate, determine, select or otherwise generate a tint value and transmit the tint value in a primary tint or other command to cause the tint state transitions in the associated IGUs 302.

For example, a user can submit such a request from a computing device, such as a desktop computer, laptop computer, tablet computer or mobile device (for example, a smartphone). In some such implementations, the user's computing device can execute a client-side application that is capable of communicating with the MC 308, and in some instances, with a master controller application executing within the MC 308. In some other implementations, the client-side application can communicate with a separate application, in the same or a different physical device or system as the MC 308, which then communicates with the master controller application to effect the desired tint state modifications. In some implementations, the master controller application or other separate application can be used to authenticate the user to authorize requests submitted by the user. In some implementations, the user can select the IGUs 302 to be tinted or have their antennas controlled in a particular manner (e.g., to activate Wi-Fi services), and inform the MC 308 of the selections, by entering a room number via the client-side application.

Additionally or alternatively, in some implementations, a user's mobile device or other computing device can communicate wirelessly with various WCs 304. For example, a client-side application executing within a user's mobile device can transmit wireless communications including tint state control signals to a WC 304 to control the tint or other states of the respective IGUs 302 connected to the WC 304. For example, the user can use the client-side application to maintain or modify the tint or other states of the IGUs 302 adjoining a room occupied by the user (or to be occupied by the user or others at a future time). Such wireless communications can be generated, formatted or transmitted using various wireless network topologies and protocols (described in more detail below with reference to the WC 600 of FIG. 6).

In some such implementations, the control signals sent to the respective WC 304 from the user's mobile device (or other computing device) can override a tint or other value previously received by the WC 304 from the respective NC 306. In other words, the WC 304 can provide the applied voltages to the IGUs 302 based on the control signals from the user's computing device rather than based on the tint value. For example, a control algorithm or rule set stored in and executed by the WC 304 can dictate that one or more control signals from an authorized user's computing device take precedence over a tint value received from the NC 306. In some other instances, such as in high demand cases, control signals such as a tint value from the NC 306 may take precedence over any control signals received by the WC 304 from a user's computing device. In some other instances, a control algorithm or rule set may dictate that tint overrides from only certain users or groups or classes of users may take precedence based on permissions granted to such users, as well as in some instances, other factors including time of day or the location of the IGUs 302.

In some implementations, based on the receipt of a control signal from an authorized user's computing device, the MC 308 can use information about a combination of known parameters to calculate, determine, select or otherwise generate a tint value that provides lighting conditions desirable for a typical user, while in some instances also being mindful of power considerations. In some other implementations, the MC 308 can determine the tint or other value based on preset preferences defined by or for the particular user that requested the tint or other state change via the computing device. For example, the user may be required to enter a password or otherwise login or obtain authorization to request a tint or other state change. In such instances, the MC 308 can determine the identity of the user based on a password, a security token or based on an identifier of the particular mobile device or other computing device. After determining the user's identity, the MC 308 can then retrieve preset preferences for the user, and use the preset preferences alone or in combination with other parameters (such as power considerations or information from various sensors) to generate and transmit a tint value for use in tinting or otherwise controlling the respective IGUs 302.

Wall Devices

In some implementations, the network system 300 also can include wall switches, dimmers or other tint-state-controlling devices. Such devices also are hereinafter collectively referred to as "wall devices," although such devices need not be limited to wall-mounted implementations (for example, such devices also can be located on a ceiling or floor, or integrated on or within a desk or a conference table). For example, some or all of the offices, conference rooms or other rooms of the building can include such a wall device for use in controlling the tint states of the adjoining IGUs 302. For example, the IGUs 302 adjoining a particular room can be grouped into a zone. Each of the wall devices can be operated by an end user (for example, an occupant of the respective room) to control the tint state or other functions or parameters of the IGUs 302 that adjoin the room. For example, at certain times of the day, the adjoining IGUs 302 may be tinted to a dark state to reduce the amount of light energy entering the room from the outside (for example, to reduce AC cooling requirements). Now suppose that a user desires to use the room. In various implementations, the user can operate the wall device to communicate control signals to cause a tint state transition from the dark state to a lighter tint state.

In some implementations, each wall device can include one or more switches, buttons, dimmers, dials or other physical user interface controls enabling the user to select a particular tint state or to increase or decrease a current tinting level of the IGUs 302 adjoining the room. Additionally or alternatively, the wall device can include a display having a touchscreen interface enabling the user to select a particular tint state (for example, by selecting a virtual button, selecting from a dropdown menu or by entering a tint level or tinting percentage) or to modify the tint state (for example, by selecting a "darken" virtual button, a "lighten" virtual button, or by turning a virtual dial or sliding a virtual bar). In some other implementations, the wall device can include a docking interface enabling a user to physically and communicatively dock a portable device such as a smartphone, multimedia device, tablet computer or other portable computing device (for example, an IPHONE, IPOD or IPAD produced by Apple, Inc. of Cupertino, CA). In such implementations, the user can control the tinting levels via input to the portable device, which is then received by the wall device through the docking interface and subsequently communicated to the MC 308, NC 306 or WC 304. In such implementations, the portable device may include an application for communicating with an API presented by the wall device.

For example, the wall device can transmit a request for a tint state change to the MC 308. In some implementations, the MC 308 can first determine whether to grant the request (for example, based on power considerations or based on whether the user has the appropriate authorizations/permissions). The MC 308 can then calculate, determine, select or otherwise generate a tint value and transmit the tint value in a primary tint command to cause the tint state transitions in the adjoining IGUs 302. In some such implementations, each wall device can be connected with the MC 308 via one or more wired links (for example, over communication lines such as CAN or Ethernet compliant lines or over power lines using power line communication techniques). In some other implementations, each wall device can be connected with the MC 308 via one or more wireless links. In some other implementations, the wall device can be connected (via one or more wired or wireless connections) with an outward-facing network 310 such as a customer-facing network, which then communicates with the MC 308 via link 318. A wall device may serve as a cellular signal repeater, alone or with antenna-configured electrochromic windows.

In some implementations, the MC 308 can identify the IGUs 302 associated with the wall device based on previously programmed or discovered information associating the wall device with the IGUs 302. In some implementations, a control algorithm or rule set stored in and executed by the MC 308 can dictate that one or more control signals from a wall device take precedence over a tint value previously generated by the MC 308. In some other instances, such as in times of high demand (for example, high power demand), a control algorithm or rule set stored in and executed by the MC 308 can dictate that the tint value previously generated by the MC 308 takes precedence over any control signals received from a wall device.

In some other implementations or instances, based on the receipt of a tint-state-change request or control signal from a wall device, the MC 308 can use information about a combination of known parameters to generate a tint value that provides lighting conditions desirable for a typical user, while in some instances also being mindful of power considerations. In some other implementations, the MC 308 can generate the tint value based on preset preferences defined by or for the particular user that requested the tint state change via the wall device. For example, the user may be required to enter a password into the wall device or to use a security token or security fob such as the IBUTTON or other 1-Wire device to gain access to the wall device. In such instances, the MC 308 can determine the identity of the user, based on the password, security token or security fob, retrieve preset preferences for the user, and use the preset preferences alone or in combination with other parameters (such as power considerations or information from various sensors) to calculate, determine, select or otherwise generate a tint value for the respective IGUs 302.

In some other implementations, the wall device can transmit a tint state change request to the appropriate NC 306, which then communicates the request, or a communication based on the request, to the MC 308. For example, each wall device can be connected with a corresponding NC 306 via one or more wired links such as those just described for the MC 308 or via a wireless link (such as those described below). In some other implementations, the wall device can transmit a request to the appropriate NC 306, which then itself determines whether to override a primary tint command previously received from the MC 308 or a primary or secondary tint command previously generated by the NC 306 (as described below, the NC 306 can in some implementations generate tint commands without first receiving a tint command from an MC 308). In some other implementations, the wall device can communicate requests or control signals directly to the WC 304 that controls the adjoining IGUs 302. For example, each wall device can be connected with a corresponding WC 304 via one or more wired links such as those just described for the MC 308 or via a wireless link (such as those described below with reference to the WC 600 of FIG. 6).

In some specific implementations, it is the NC 306 that determines whether the control signals from the wall device should take priority over a tint value previously generated by the NC 306. As described above, in some implementations, the wall device can communicate directly with the NC 306. However, in some other implementations, the wall device can communicate requests directly to the MC 308 or directly to a WC 304, which then communicates the request to the NC 306. In still other implementations, the wall device can communicate requests to a customer-facing network (such as a network managed by the owners or operators of the building), which then passes the requests (or requests based therefrom) to the NC 306 either directly or indirectly by way of the MC 308. In some implementations, a control algorithm or rule set stored in and executed by the NC 306 can dictate that one or more control signals from a wall device take precedence over a tint value previously generated by the NC 306. In some other instances, such as in times of high demand (for example, high power demand), a control algorithm or rule set stored in and executed by the NC 306 can dictate that the tint value previously generated by the NC 306 takes precedence over any control signals received from a wall device.

As described above with reference to the MC 308, in some other implementations, based on the receipt of a tint-state-change request or control signal from a wall device, the NC 306 can use information about a combination of known parameters to generate a tint value that provides lighting conditions desirable for a typical user, while in some instances also being mindful of power considerations. In some other implementations, the NC 306 can generate the tint value based on preset preferences defined by or for the particular user that requested the tint state change via the wall device. As described above with reference to the MC 308, the user may be required to enter a password into the wall device or to use a security token or security fob such as the IBUTTON or other 1-Wire device to gain access to the wall device. In such instances, the NC 306 can communicate with the MC 308 to determine the identity of the user, based on the password, security token or security fob, retrieve preset preferences for the user, and use the preset preferences alone or in combination with other parameters (such as power considerations or information from various sensors) to calculate, determine, select or otherwise generate a tint value for the respective IGUs 302.

In some implementations, the MC 308 is coupled to an external database (or "data store" or "data warehouse") 320. In some implementations, the database 320 can be a local database coupled with the MC 308 via a wired hardware link 322. In some other implementations, the database 320 can be a remote database or a cloud-based database accessible by the MC 308 via an internal private network or over the outward-facing network 310. In some implementations, other computing devices, systems or servers also can have access to read the data stored in the database 320, for example, over the outward-facing network 310. Additionally, in some implementations, one or more control applications or third party applications also can have access to read the data stored in the database via the outward-facing network 310. In some cases, the MC 308 stores a record of all tint commands including tint values issued by the MC 308 in the database 320. The MC 308 also can collect status and sensor data and store it in the database 320. In such instances, the WCs 304 can collect the sensor data and status data from the IGUs 302 and communicate the sensor data and status data to the respective NCs 306 over link 314 for communication to the MC 308 over link 316. Additionally or alternatively, the NCs 306 or the MC 308 themselves also can be connected to various sensors such as light, temperature or occupancy sensors within the building as well as light or temperature sensors positioned on, around or otherwise external to the building (for example, on a roof of the building). In some implementations the NCs 306 or the WCs 304 also can transmit status or sensor data directly to the database 320 for storage.

Integration with Other Systems or Services

In some implementations, the network system 300 also can be designed to function in conjunction with modern heating, ventilation, and air conditioning (HVAC) systems, interior lighting systems, security systems or power systems as an integrated and efficient energy control system for an entire building or a campus of buildings. Some implementations of the network system 300 are suited for integration with a building management system (BMS), 324. A BMS is broadly a computer-based control system that can be installed in a building to monitor and control the building's mechanical and electrical equipment such as HVAC systems (including furnaces or other heaters, air conditioners, blowers and vents), lighting systems, power systems, elevators, fire systems, and security systems. The BMS can include hardware and associated firmware and software for maintaining conditions in the building according to preferences set by the occupants or by a building manager or other administrator. The software can be based on, for example, internet protocols or open standards. A BMS can typically be used in large buildings where it functions to control the environment within the building. For example, the BMS can control lighting, temperature, carbon dioxide levels, and humidity within the building. To control the building environment, the BMS can turn on and off various mechanical and electrical devices according to rules or in response to conditions. Such rules and conditions can be selected or specified by a building manager or administrator, for example. One function of a BMS can be to maintain a comfortable environment for the occupants of a building while minimizing heating and cooling energy losses and costs. In some implementations, the BMS can be configured not only to monitor and control, but also to optimize the synergy between various systems, for example, to conserve energy and lower building operation costs.

Additionally or alternatively, some implementations of the network system 300 are suited for integration with a smart thermostat service, alert service (for example, fire detection), security service or other appliance automation service. On example of a home automation service is NEST®, made by Nest Labs of Palo Alto, California, (NEST® is a registered trademark of Google, Inc. of Mountain View, California). As used herein, references to a BMS can in some implementations also encompass, or be replaced with, such other automation services.

In some implementations, the MC 308 and a separate automation service, such as a BMS 324, can communicate via an application programming interface (API). For example, the API can execute in conjunction with a master controller application (or platform) within the MC 308, or in conjunction with a building management application (or platform) within the BMS 324. The MC 308 and the BMS 324 can communicate over one or more wired links 326 or via the outward-facing network 310. In some instances, the BMS 324 can communicate instructions for controlling the IGUs 302 to the MC 308, which then generates and transmits primary tint commands to the appropriate NCs 306. In some implementations, the NCs 306 or the WCs 304 also can communicate directly with the BMS 324 (whether through a wired/hardware link or wirelessly through a wireless data link). In some implementations, the BMS 324 also can receive data, such as sensor data, status data and associated timestamp data, collected by one or more of the MC 308, the NCs 306 and the WCs 304. For example, the MC 308 can publish such data over the network 310. In some other implementations in which such data is stored in a database 320, the BMS 324 can have access to some or all of the data stored in the database 320.

Window Controllers

Controllers used to control windows are described in various patents and applications of View, Inc. Examples of such applications include U.S. Provisional Patent Application No. 62/248,181, filed Oct. 29, 2015, U.S. Provisional Patent Application No. 62/085,179, filed Nov. 24, 2014, U.S. patent application Ser. No. 13/449,248, filed Apr. 17, 2012, and U.S. patent application Ser. No. 13/449,251, filed Apr. 17, 2012, each of which is incorporated herein by reference in its entirety.

Figure 1D:
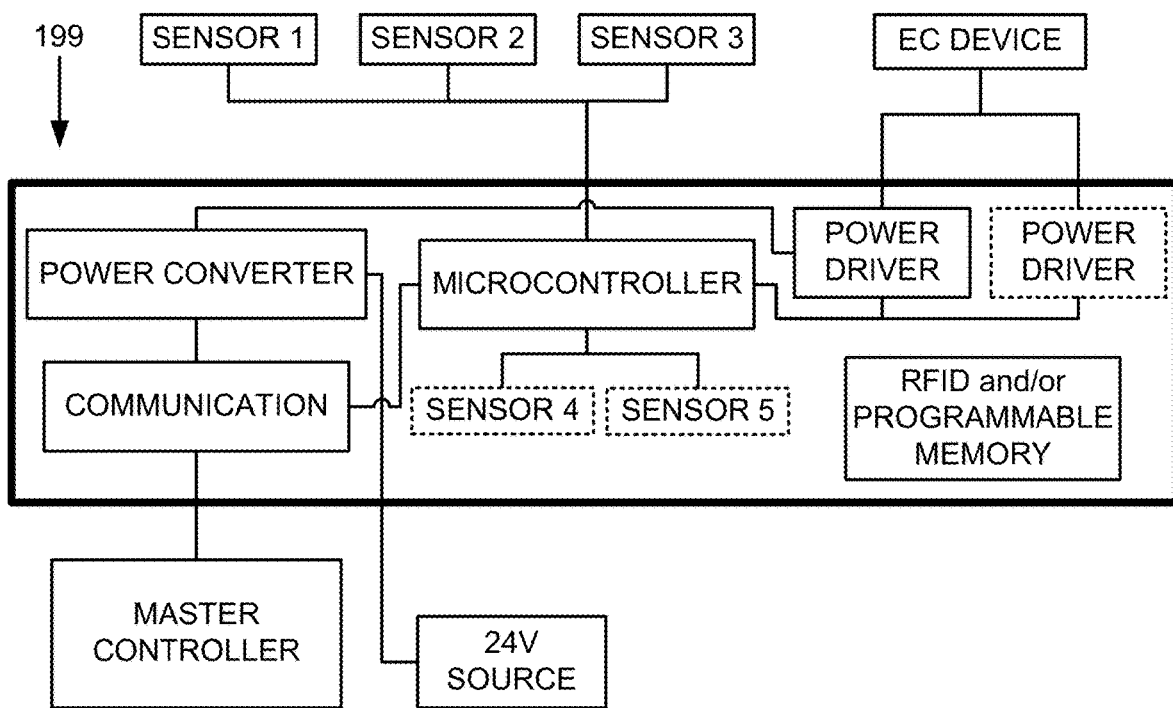
FIG. 1D is a schematic of an EC window controller.

FIG. 1D, depicts an example window controller 199 that may include logic and other features for controlling an antenna (e.g., transmitting and/or receiving electromagnetic radiation signals to from the antenna). Controller 199 includes a power converter configured to convert a low voltage to the power requirements of (1) an EC device of an EC lite of an IGU and/or (2) a window antenna. This power is typically fed to the EC device via a driver circuit (power driver). In one embodiment, controller 199 has a redundant power driver so that in the event one fails, there is a backup and the controller need not be replaced or repaired. Transceiver logic, which may include a power driver for a window antenna, may be included in controller 199. Although not explicitly shown, one of the depicted power drivers may be configured to drive a window antenna electrode to transmit designated signals.

Controller 199 also includes a communication circuit (labeled "communication" in FIG. 1D) for receiving and sending commands to and from a remote controller (depicted in FIG. 1D as "master controller"). The communication circuit also serves to receive and send input to and from a local logic device (e.g., a microcontroller). In one embodiment, the power lines are also used to send and receive communications, for example, via protocols such as Ethernet. The microcontroller includes a logic for controlling the at least one EC lite based on, e.g., input received from one or more sensors and/or users. In this example sensors 1-3 are, for example, external to controller 199, for example in the window frame or proximate the window frame. Alternatively, the sensors, if present, are located remotely, e.g., on the building's roof. In one embodiment, the controller has at least one or more internal sensors. For example, controller 199 may also, or in the alternative, have "onboard" sensors 4 and 5. In one embodiment, the controller uses the EC device as a sensor, for example, by using current-voltage (IN) data obtained from sending one or more electrical pulses through the EC device and analyzing the feedback. This type of sensing capability is described in U.S. patent application Ser. No. 13/049,756, naming Brown et al. as inventors, titled "Multipurpose Controller for Multistate Windows," which is incorporated by reference herein for all purposes. A window assembly may also include a PV cell, and the controller may use the PV cell not only to generate power, but also as a photosensor. The microcontroller may also have logic for controlling window antenna functions.

In one embodiment, the controller includes a chip, a card or a board which includes appropriate logic, programmed and/or hard coded, for performing one or more control functions. Power and communication functions of controller 199 may be combined in a single chip, for example, a programmable logic device (PLD) chip, field programmable gate array (FPGA) or similar device. Such integrated circuits can combine logic, control and power functions in a single programmable chip. In one embodiment, where the EC window (or IGU) has two EC panes, the logic is configured to independently control each of the two EC panes. The logic may also control transmission and/or reception of one or more antennas disposed on the IGU. In one embodiment, the function of each of the two EC panes, and optional window antenna(s) is controlled in a synergistic fashion, that is, so that each device is controlled in order to complement the other. For example, the desired level of light transmission, thermal insulative effect, antenna signal transmission, and/or other property are controlled via combination of states for each of the individual devices and/or antenna(s). For example, one EC device may have a colored state while the other is used for resistive heating, for example, via a transparent electrode of the device. In another example, the two EC device's colored states are controlled so that the combined transmissivity is a desired outcome.

Controller 199 may also have wireless capabilities, such as control and powering functions. For example, wireless controls, such as RF and/or IR can be used as well as wireless communication such as Bluetooth, WiFi, Zigbee, EnOcean and the like to send instructions to the microcontroller and for the microcontroller to send data out to, for example, other window controllers and/or a building management system (BMS). Window antennas may be employed to send and/or receive the control communications and/or power. Various wireless protocols may be used as appropriate. The optimal wireless protocol may depend on how the window is configured to receive power. For instance, if the window is self-powered through a means that produces relatively less power, a communication protocol that uses relatively less power may be used. Similarly, if the window is permanently wired, for example with 24V power, there is less concern about conserving power, and a wireless protocol that requires relatively more power may be used. Zigbee is an example of a protocol that uses relatively more power. WiFi and Bluetooth Low Energy are examples of protocols that use relatively less power. Protocols that use relatively less power may also be beneficial where the window is powered intermittently.

Wireless communication can be used in the window controller for at least one of programming and/or operating the EC window and optionally the window antenna(s), collecting data from the EC window from sensors as well as using the EC window as a relay point for wireless communication. Data collected from EC windows also may include count data such as number of times an EC device has been activated (cycled), efficiency of the EC device over time, and the like. Each of these wireless communication features is described in U.S. patent application Ser. No. 13/049,756, naming Brown et al. as inventors, titled "Multipurpose Controller for Multistate Windows," previously by reference above.

In certain embodiments, light is used to communicate with and/or power a window/antenna controller. That is, light generated at a distance by, for example, a diode laser transmits power and/or control signals to a window controller via an appropriate light transmission medium such as a fiber optic cable or free space. Examples of suitable photonic transmission methods for window controllers are described in PCT Application No. PCT/US13/56506, filed Aug. 23, 2013, and titled "PHOTONIC-POWERED EC DEVICES," which is herein incorporated by reference in its entirety. In a particular embodiment, power is provided through photonic methods, while communication is provided via one or more window antennas patterned onto a lite of an electrochromic window or an associated IGU component. In another embodiment, power is provided through photonic methods, while communication is provided via Wi-Fi or another wireless communication method using antennas.

Returning to the embodiment of FIG. 1D, controller 199 may also include an RFID tag and/or memory such as solid state serial memory (e.g. I2C or SPI) which may optionally be a programmable memory. Radio-frequency identification (RFID) involves interrogators (or readers), and tags (or labels). RFID tags use communication via electromagnetic waves to exchange data between a terminal and an object, for example, for the purpose of identification and tracking of the object. Some RFID tags can be read from several meters away and beyond the line of sight of the reader.

Most RFID tags contain at least two parts. One is an integrated circuit for storing and processing information, modulating and demodulating a radio-frequency (RF) signal, and other specialized functions. The other is an antenna for receiving and transmitting the signal.

There are three types of RFID tags: passive RFID tags, which have no power source and require an external electromagnetic field to initiate a signal transmission, active RFID tags, which contain a battery and can transmit signals once a reader has been successfully identified, and battery assisted passive (BAP) RFID tags, which require an external source to wake up but have significant higher forward link capability providing greater range.

In one embodiment, the RFID tag or other memory is programmed with at least one of the following types of data: warranty information, installation information (e.g., absolute and relative position and orientation of the window), vendor information, batch/inventory information, EC device/IGU characteristics, antenna characteristics (e.g., number of antennas on an IGU, antenna type (monopole, stripline, patch, dipole, fractal, etc.), frequency ranges, radiation pattern (omnidirectional, half-cylindrical beam, etc.), and antenna size), EC device cycling information and customer information. Examples of EC device characteristics and IGU characteristics include, for example, window voltage ($V_W$), window current ($I_W$), EC coating temperature ($T_{EC}$), glass visible transmission (% $T_{vis}$), % tint command (external analog input from BMS), digital input states, and controller status. Each of these represents upstream information that may be provided from the controller to a BMS or window management system or other building device. The window voltage, window current, window temperature, and/or visible transmission level may be detected directly from sensors on the windows. The % tint command may be provided to the BMS or other building device indicating that the controller has in fact taken action to implement a tint change, which change may have been requested by the building device. This can be important because other building systems such as HVAC systems might not recognize that a tint action is being taken, as a window may require a few minutes (e.g., 10 minutes) to change state after a tint action is initiated. Thus, an HVAC action may be deferred for an appropriate period of time to ensure that the tinting action has sufficient time to impact the building environment. The digital input states information may tell a BMS or other system that a manual action relevant to the smart window/antenna has been taken. Finally, the controller status may inform the BMS or other system that the controller in question is operational, or not, or has some other status relevant to its overall functioning.

Examples of downstream data from a BMS or other building system that may be provided to the controller include window drive configuration parameters, zone membership (e.g. what zone within the building is this controller part of), % tint value, digital output states, and digital control (tint, bleach, auto, reboot, etc.). The window drive parameters may define a control sequence (effectively an algorithm) for changing a window state. Examples of window drive configuration parameters include bleach to color transition ramp rate, bleach to color transition voltage, initial coloration ramp rate, initial coloration voltage, initial coloration current limit, coloration hold voltage, coloration hold current limit, color to bleach transition ramp rate, color to bleach transition voltage, initial bleach ramp rate, initial bleach voltage, initial bleach current limit, bleach hold voltage, bleach hold current limit. Examples of the application of such window drive parameters are presented in U.S. patent application Ser. No. 13/049,623, filed Mar. 16, 2011, and titled "Controlling Transitions In Optically Switchable Devices," and U.S. patent application Ser. No. 13/449,251, filed Apr. 17, 2012, and titled "Controller for Optically-Switchable Windows," both of which are incorporated herein by reference in their entireties.

As mentioned, a window controller may include logic (e.g., hardware and/or software) for controlling a window antenna. The logic may include one or more transceivers for controlling one or more window antennas, which may be located on one or more windows. For window antennas used in relatively low-power applications such as Bluetooth (or Bluetooth Low Energy), a transceiver may be co-located with a window controller, sometimes in the same enclosure such as a carrier depicted in FIGS. 11A-11C. For such applications, particularly where the antenna communications consume only low or moderate bandwidth, the antenna transceiver may communicate over a window network such as one of those described above. Of course, even for such low-power applications as Bluetooth, the antenna logic need not be disposed on the window controller. Further, a parallel network may be used for the communicating with the window antenna(s).

For other applications such as Wi-Fi services (e.g., a Wi-Fi hotspot), the antenna control logic also may be deployed in the window controller enclosure. If the antenna application consumes relatively little bandwidth, a window network may be employed for communications with the antenna controller. For example, a CAN bus of a window network may be used to interface with the antenna transceiver. In other cases, such as where the antenna application consumes more bandwidth than the window network can accommodate, a separate network may be deployed in the building for antenna applications. In such cases and where the antenna control logic is provide in the window controller, the controller may include a network adaptor such as an RJ45 jack (connector) to connect the antenna transceiver to the antenna network.

In antenna applications requiring relatively high-power, high bandwidth, and/or control by a telecom carrier (e.g., AT&T, Verizon, Sprint, and T-Mobile), the antenna control logic and network may be provided entirely independent of the window control system (the window network and controllers). Often, when the antenna is providing services for a telecom carrier, the carrier requires that the network and transceiver be its own. Such services include, for example, cellular repeating. For example, the window antenna may be deployed in a cellular repeater, e.g., a local base station. In such cases, the window antenna transceiver need not be co-located with a local window controller. However, it will generally be desirable to provide the antenna control logic proximate the window antenna, e.g., within about 30 feet.

IGU Structure, Generally

In the following description, each electrochromic window 202 will be referred to as an "integrated glass unit (IGU)" 202, also referred to as an "insulated glass unit (IGU)." This convention is assumed, for example, because it is common and can be desirable to have IGUs serve as the fundamental constructs for holding electrochromic panes or lites. Additionally, IGUs, especially those having double- or triple-pane window configurations, offer superior thermal insulation over single pane configurations. However, this convention is for convenience only and is not intended to be limiting. Indeed, as described below, in some implementations the basic unit of an electrochromic window can be considered to include a pane or substrate of transparent material, upon which an electrochromic coating, stack or device is formed, and to which associated electrical connections are coupled to drive the electrochromic device. Electrochromic IGUs are described in various references including U.S. patent application Ser. No. 14/196,895, filed Mar. 4, 2014; U.S. Provisional Patent Application No. 62/085,179, filed Nov. 26, 2014; and U.S. Provisional Patent Application No. 62/194,107, filed Jul. 17, 2015, each of which is incorporated herein by reference in its entirety. Of course, the antenna structures and functions disclosed herein are not limited to IGUs, and can be extended to any other window structure including, in some cases, single electrochromic lites that are not part of an IGU or similar structure. Unless otherwise noted, the descriptions of IGU embodiments can be extended to non-IGU contexts. Even some embodiments requiring two or more lites can be implemented in non-IGU contexts; e.g., embodiments employing two parallel lites that are not part of an IGU and embodiments employing an electrochromic lite and a parallel structure that does not obscure much or any viewable area of the electrochromic lite.

Antennas in IGUS

Various implementations relate generally to an electrochromic IGU that includes one or more antennas. Particular implementations of the subject matter described in this disclosure can be implemented to realize one or more of the following potential advantages. Some implementations relate to an IGU that includes both an electrochromic device (or other switchable optical device) and as one or more antennas. In some implementations, various antenna structures described herein can be formed on, formed under, formed in or otherwise integrated with the electrochromic device itself. In some other implementations, various antenna structures can be formed on the same pane as the electrochromic device, but on an opposite surface from that on which the electrochromic device is formed. In some other implementations, various antenna structures can be formed on a different pane as the electrochromic device, for example, in an IGU that includes two or more panes. In some cases, one or more antennas or antenna components (e.g., a ground plane) are formed on a structure or feature not itself part of a window lite. For example, an antenna or antenna component may be disposed on an IGU spacer, a window controller, a network controller, a master controller, an electrical connector such as connector between a window controller and an electrochromic device, a window frame element, a transom, a mullion, etc.

The following terms are used throughout the specification to present aspects of window antennas.

Antenna Components

An antenna has an associated transmitter and/or receiver, sometimes combined in a "transceiver," for providing electrical signals to or receiving them from the antenna. The transmitter and receiver are typically implemented as circuits on circuit board or integrated circuit. In some embodiments, the transmitter and/or receiver is deployed in a window controller or other control element of an optically switchable window network.

An antenna has at least two antenna electrodes, at least one of which is referred to herein as an antenna structure, which can serve either or both of two roles: transmission (it receives electrical signals from a transmission circuit and radiates electromagnetic signals into surrounding space), and reception (it receives electromagnetic signals from surrounding space and forwards an electrical representation of the signals to a reception circuit).

The second electrode is either grounded or powered. In some antennas where both electrodes are powered, they may receive complementary signals. This is often the case in a dipole antenna. When the second electrode is grounded it may be implemented as a ground plane.

A ground plane is typically located near the antenna structure electrode and blocks the antenna structure from transmitting radiation beyond the location of the ground plane and/or blocks the antenna structure from receiving radiation coming toward the antenna structure from the direction of the ground plane. Of course, the antenna structure and ground plane must not contact one another. In many designs, they are separated by a dielectric layer such as a window lite or other insulating structure that may be solid, liquid, or gas. In some embodiments, they are separated by free space, e.g., the interior of an IGU. In various embodiments, the ground plane is implemented as a layer or partial layer on a lite, such an electrochromic lite or another lite that is part of an IGU with the electrochromic lite. When implemented on a lite, the ground plane may be provided as a layer on the large area face of the lite or on one or more edges of the lite. In some cases, the ground plane is implemented on a non-lite structure associated with the electrochromic lite or IGU. Examples of such non-window structures include window controllers, IGU spacers, and framing or structural members such as mullions and transoms.

Each electrode is connected to a terminal of the transmitter or receiver. All connections are made by an interconnect or transmission line (the terms are used interchangeably herein).

Passive antenna elements are sometimes used in conjunction with a primary antenna structure and for the purpose of tuning the radiation distribution emitted by (or received by) the antenna structure. Passive antenna elements are not electrically connected to the antenna circuit. They are used in some well-known antenna structures as Yagi antennas, which may be disposed on window structures in like manner to active antenna elements (e.g., antenna structures and ground planes), except that they are not electrically connected to the antenna circuit.

As is now apparent, an IGU can include one or more antennas configured to broadcast (or more generally transmit) radio frequency (RF) signals into an interior environment, such as within a building or room within a building. In some implementations, an IGU can include one or more antennas configured to receive RF signals from an exterior environment, such as from the outdoors or otherwise outside of a building or room within a building. In some implementations, an IGU can include one or more antennas configured to broadcast RF signals out to an exterior environment, such as outwards from a building or room within a building. In some implementations, an IGU can include one or more antennas configured to receive RF signals from an interior environment, such as from the inside of a building or room within a building. Additionally, in some implementations, an IGU can include the capabilities of broadcasting or receiving RF signals to or from both an interior environment and an exterior environment. Still further, in some implementations, an IGU can include capabilities for blocking transmission of RF signals from one side of the IGU though the IGU and out an opposite side of the IGU.

Electrochromic IGUS and Electrochromic Devices

FIGS. 2A-2J show cross-sectional views of example electrochromic window structures 202 with integrated antennas capable of transmitting signals into, or receiving signals from, an interior environment according to some implementations. These examples present a small subset of the available electrochromic IGU and electrochromic lite structures within the scope of this disclosure, so they should not be considered limiting in any way. Each of the example electrochromic window structures 202 shown and described with respect to these and the following figures can be configured as an IGU and will hereinafter be referred to as an IGU 202. FIG. 2A more particularly shows an example implementation of an IGU 202 that includes a first pane (also referred to herein as a "lite") 204 having a first surface S1 and a second surface S2. In some implementations, the first surface S1 of the first pane 204 faces an exterior environment, such as an outdoors or outside environment. The IGU 202 also includes a second pane 206 having a first surface S3 and a second surface S4. In some implementations, the second surface S4 of the second pane 206 faces an interior environment, such as an inside environment of a home, building or vehicle, or a room or compartment within a home, building or vehicle.

In some implementations, each of the first and the second panes 204 and 206 are transparent or translucent at least to light in the visible spectrum. For example, each of the panes 204 and 206 can be formed of a glass material and especially an architectural glass or other shatter-resistant glass material such as, for example, a silicon oxide ($SO_x$)-based glass material. As a more specific example, each of the first and the second panes 204 and 206 can be a soda-lime glass substrate or float glass substrate. Such glass substrates can be composed of, for example, approximately 75% silica ($SiO_2$) as well as $Na_2O$, CaO, and several minor additives. However, each of the first and the second panes 204 and 206 can be formed of any material having suitable optical, electrical, thermal, and mechanical properties. For example, other suitable substrates that can be used as one or both of the first and the second panes 204 and 206 can include other glass materials as well as plastic, semi-plastic and thermoplastic materials (for example, poly(methyl methacrylate), polystyrene, polycarbonate, allyl diglycol carbonate, SAN (styrene acrylonitrile copolymer), poly(4-methyl-1-pentene), polyester, polyamide), or mirror materials. In some implementations, each of the first and the second panes 204 and 206 can be strengthened, for example, by tempering, heating, or chemically strengthening.

Generally, each of the first and the second panes 204 and 206, and the IGU 202 as a whole, is a rectangular solid. However, in some other implementations other shapes (for example, circular, elliptical, triangular, curvilinear, convex, concave) are possible and may be desired. In some specific implementations, a length "L" of each of the first and the second panes 204 and 206 can be in the range of approximately 20 inches (in.) to approximately 10 feet (ft.), a width "W" of each of the first and the second panes 204 and 206 can be in the range of approximately 20 in. to approximately 10 ft., and a thickness "T" of each of the first and the second panes 204 and 206 can be in the range of approximately 1 millimeter (mm) to approximately 10 mm (although other lengths, widths or thicknesses, both smaller and larger, are possible and may be desirable based on the needs of a particular user, manager, administrator, builder, architect or owner). Additionally, while the IGU 202 includes two panes (204 and 206), in some other implementations, an IGU can include three or more panes. Furthermore, in some implementations, one or more of the panes can itself be a laminate structure of two, three, or more layers or sub-panes.

The first and second panes 204 and 206 are spaced apart from one another by spacers 218 to form an interior volume 208. In some implementations, the interior volume is filled with Argon (Ar), although in some other implementations, the interior volume 208 can be filled with another gas, such as another noble gas (for example, krypton (Kr) or xenon (Xn)), another (non-noble) gas, or a mixture of gases (for example, air). Filling the interior volume 208 with a gas such as Ar, Kr, or Xn can reduce conductive heat transfer through the IGU 202 because of the low thermal conductivity of these gases as well as improve acoustic insulation due to their increased atomic weights. In some other implementations, the interior volume 208 can be evacuated of air or other gas. The spacers 218 generally determine the thickness of the interior volume 208; that is, the spacing between the first and the second panes 204 and 206. In some implementations, the spacing "C" between the first and the second panes 204 and 206 is in the range of approximately 6 mm to approximately 30 mm. The width "D" of the spacers 218 can be in the range of approximately 5 mm to approximately 15 mm (although other widths are possible and may be desirable).

Although not shown in the cross-sectional view, the spacers 218 can be formed around all sides of the IGU 202 (for example, top, bottom, left and right sides of the IGU 202). For example, the spacers 218 can be formed of a foam or plastic material. However, in some other implementations, such as the example IGU shown in FIG. 5B, the spacers can be formed of metal or other conductive material, for example, a metal tube structure. A first primary seal 220 adheres and hermetically seals each of the spacers 218 and the second surface S2 of the first pane 204. A second primary seal 222 adheres and hermetically seals each of the spacers 218 and the first surface S3 of the second pane 206. In some implementations, each of the primary seals 220 and 222 can be formed of an adhesive sealant such as, for example, polyisobutylene (PIB). In some implementations, the IGU 202 further includes secondary seal 224 that hermetically seals a border around the entire IGU 204 outside of the spacers 218. To this end, the spacers 218 can be inset from the edges of the first and the second panes 204 and 206 by a distance "E." The distance "E" can be in the range of approximately 4 mm to approximately 8 mm (although other distances are possible and may be desirable). In some implementations, the secondary seal 224 can be formed of an adhesive sealant such as, for example, a polymeric material that resists water and that adds structural support to the assembly.

In the implementation shown in FIG. 2A, an electrochromic (EC) device (ECD) 210 is formed on the second surface S2 of the first pane 204. As will be described below, in some other implementations, the ECD 210 can be formed on another suitable surface, for example, the first surface S1 of the first pane, the first surface S3 of the second pane 206 or the second surface S4 of the second pane 206. Examples of electrochromic devices are presented in, e.g., U.S. Pat. No. 8,243,357, filed May 11, 2011, U.S. Pat. No. 8,764,951, filed Jun. 11, 2010, and U.S. Pat. No. 9,007,674, filed Feb. 8, 2013, each incorporated herein by reference in its entirety. In FIG. 2A, the ECD 210 includes an EC stack 212, which itself includes a number of layers. For example, the EC stack 212 can include an electrochromic layer, an ion-conducting layer, and a counter electrode layer. In some implementations, the electrochromic layer is formed of an inorganic solid material. The electrochromic layer can include or be formed of one or more of a number of electrochromic materials, including electrochemically-cathodic or electrochemically-anodic materials. For example, metal oxides suitable for use as the electrochromic layer can include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$) and cobalt oxide ($Co_2O_3$), among other materials. In some implementations, the electrochromic layer can have a thickness in the range of approximately 0.05 µm to approximately 1 µm.

In some implementations, the counter electrode layer is formed of an inorganic solid material. The counter electrode layer can generally include one or more of a number of materials or material layers that can serve as a reservoir of ions when the EC device 210 is in, for example, the transparent state. For example, suitable materials for the counter electrode layer can include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue. In some implementations, the counter electrode layer is a second electrochromic layer of opposite polarity as first electrochromic layer described above. For example, when the first electrochromic layer is formed from an electrochemically-cathodic material, the counter electrode layer can be formed of an electrochemically-anodic material. In some implementations, the counter electrode layer can have a thickness in the range of approximately 0.05 µm to approximately 1 µm.

In some implementations, the ion-conducting layer serves as a medium through which ions are transported (for example, in the manner of an electrolyte) when the EC stack 212 transitions between optical states. In some implementations, the ion-conducting layer is highly conductive to the relevant ions for the electrochromic and the counter electrode layers, but also has sufficiently low electron conductivity such that negligible electron transfer occurs during normal operation. A thin ion-conducting layer with high ionic conductivity enables fast ion conduction and consequently fast switching for high performance EC devices 210. In some implementations, the ion-conducting layer can have a thickness in the range of approximately 0.01 µm to approximately 1 µm. In some implementations, the ion-conducting layer also is an inorganic solid. For example, the ion-conducting layer can be formed from one or more silicates, silicon oxides (including silicon-aluminum-oxide), tungsten oxides (including lithium tungstate), tantalum oxides, niobium oxides and borates. These materials also can be doped with different dopants, including lithium; for example, lithium-doped silicon oxides include lithium silicon-aluminum-oxide.

In some other implementations, the electrochromic layer and the counter electrode layer are formed immediately adjacent one another, sometimes in direct contact, without an ion-conducting layer in between. For example, in some implementations, an interfacial region between the electrochromic layer and the counter electrode layer can be utilized rather than incorporating a distinct ion-conducting layer. A further description of suitable devices is found in U.S. Pat. No. 8,300,298, issued Oct. 30, 2012 and U.S. patent application Ser. No. 13/462,725, filed May 2, 2012, each incorporated herein by reference in its entirety. In some implementations, the EC stack 212 also can include one or more additional layers such as one or more passive layers. For example, passive layers can be used to improve certain optical properties, to provide moisture or to provide scratch resistance. In some implementations, the first and the second TCO layers 214 and 216 can be treated with anti-reflective or protective oxide or nitride layers. Additionally, other passive layers also can serve to hermetically seal the EC stack 212.

In some implementations, the choice of appropriate electrochromic and counter-electrode materials governs the relevant optical transitions. During operation, in response to a voltage generated across the thickness of electrochromic layer, the electrochromic layer transfers or exchanges ions to or from the counter-electrode layer resulting in the desired optical transitions in the electrochromic layer, and in some implementations, also resulting in an optical transition in the counter-electrode layer. In one more specific example, responsive to the application of an appropriate electric potential across a thickness of EC stack 212, the counter electrode layer transfers all or a portion of the ions it holds to the electrochromic layer causing the optical transition in the electrochromic layer. In some such implementations, for example, when the counter electrode layer is formed from NiWO, the counter electrode layer also optically transitions with the loss of ions it has transferred to the electrochromic layer. When charge is removed from a counter electrode layer made of NiWO (that is, ions are transported from the counter electrode layer to the electrochromic layer), the counter electrode layer will transition in the opposite direction.

Also to be appreciated is that transitions between a bleached or transparent state and a colored or opaque state are but some examples, among many, of optical or electrochromic transitions that can be implemented. Such transitions include changes in reflectivity, polarization state, scattering density, and the like. Unless otherwise specified herein (including the foregoing discussion), whenever reference is made to a bleached-to-opaque transition (or to and from intermediate states in between), the corresponding device or process described encompasses other optical state transitions such as, for example, intermediate state transitions such as percent transmission (% T) to % T transitions, non-reflective to reflective transitions (or to and from intermediate states in between), bleached to colored transitions (or to and from intermediate states in between), and color to color transitions (or to and from intermediate states in between). Additionally, the term "bleached" may refer to an optically neutral state, for example, uncolored, transparent or translucent. Furthermore, unless specified otherwise herein, the "color" of an electrochromic transition is not limited to any particular wavelength or range of wavelengths.

Generally, the colorization or other optical transition of the electrochromic material in the electrochromic layer is caused by reversible ion insertion into the material (for example, intercalation) and a corresponding injection of charge-balancing electrons. Typically, some fraction of the ions responsible for the optical transition is irreversibly bound up in the electrochromic material. Some or all of the irreversibly bound ions can be used to compensate for "blind charge" in the material. In some implementations, suitable ions include lithium ions (Li+) and hydrogen ions (H+) (i.e., protons). In some other implementations, other ions can be suitable. Intercalation of lithium ions, for example, into tungsten oxide ($WO_{3-y}$, ($0<y\leq\sim0.3$)) causes the tungsten oxide to change from a transparent state to a blue state.

In some implementations, the EC stack 212 reversibly cycles between a transparent state and an opaque or tinted state. In some implementations, when the EC stack 212 is in a transparent state, a potential is applied across the EC stack 212 such that available ions in the stack reside primarily in the counter electrode layer. When the magnitude of the potential across the EC stack 212 is reduced or when the polarity of the potential is reversed, ions are transported back across the ion conducting layer to the electrochromic layer causing the electrochromic material to transition to an opaque, tinted, or darker state. In some implementations, the electrochromic and counter electrode layers are complementary coloring layers. As one example of a complementary implementation, when or after ions are transferred into the counter electrode layer, the counter electrode layer is lightened or transparent, and similarly, when or after the ions are transferred out of the electrochromic layer, the electrochromic layer is lightened or transparent. Conversely, when the polarity is switched, or the potential is reduced, and the ions are transferred from the counter electrode layer into the electrochromic layer, both the counter electrode and the electrochromic layers become darken or become colored.

In some other implementations, when the EC stack 212 is in an opaque state, a potential is applied to the EC stack 212 such that available ions in the stack reside primarily in the counter electrode layer. In such implementations, when the magnitude of the potential across the EC stack 212 is reduced or its polarity reversed, the ions are transported back across the ion conducting layer to the electrochromic layer causing the electrochromic material to transition to a transparent or lighter state. The electrochromic and ion-conducting layers also can be complementary coloring layers.

The ECD 210 also includes a first transparent conductive oxide (TCO) layer 214 adjacent a first surface of the EC stack 212 and a second TCO layer 216 adjacent a second surface of the EC stack 212. For example, the first TCO layer 214 can be formed on the second surface S2, the EC stack 212 can be formed on the first TCO layer 214 and the second TCO layer 216 can be formed on the EC stack 212. In some implementations, the first and the second TCO layers 214 and 216 can be formed of one or more metal oxides and metal oxides doped with one or more metals. For example, some suitable metal oxides and doped metal oxides can include indium oxide, indium tin oxide (ITO), doped indium oxide, tin oxide, doped tin oxide, fluorinated tin oxide, zinc oxide, aluminum zinc oxide, doped zinc oxide, ruthenium oxide and doped ruthenium oxide, among others. While such materials are referred to as TCOs in this document, the term encompasses non-oxides as well as oxides that are transparent and electrically conductive such as certain thin metals and certain non-metallic materials such as conductive metal nitrides and composite conductors, among other suitable materials. In some implementations, the first and the second TCO layers 214 and 216 are substantially transparent at least in the range of wavelengths where electrochromism is exhibited by the EC stack 212. In some implementations, the first and the second TCO layers 214 and 216 can each be deposited by physical vapor deposition (PVD) processes including, for example, sputtering. In some implementations, the first and the second TCO layers 214 and 216 can each have a thickness in the range of approximately 0.01 microns (µm) to approximately 1 µm. A transparent conductive material typically has an electronic conductivity significantly greater than that of the electrochromic material or the counter electrode material.

The first and the second TCO layers 214 and 216 serve to distribute electrical charge across respective first and second surfaces of the EC stack 212 for applying an electrical potential (voltage) across the thickness of the EC stack 212 to modify one or more optical properties (for example, a transmittance, absorbance, or reflectance) of the EC stack 212 or layers within the EC stack 212. Desirably, the first and the second TCO layers 214 and 216 serve to uniformly distribute electrical charge from outer surface regions of the EC stack 212 to inner surface regions of the EC stack 212 with relatively little Ohmic potential drop from the outer regions to the inner regions. As such, it is generally desirable to minimize the sheet resistance of the first and the second TCO layers 214 and 216. In other words, it is generally desirable that each of the first and the second TCO layers 214 and 216 behave as substantially equipotential layers across all portions of the respective layers 214 and 216. In this way, the first and the second TCO layers 214 and 216 can uniformly apply an electric potential across a thickness of the EC stack 212 to effect a transition of the EC stack 212 from a bleached or lighter state (for example, a transparent, semitransparent, or translucent state) to a colored or darker state (for example, a tinted, less transparent or less translucent state) and vice versa.

A first bus bar 226 distributes a first electrical (for example, a voltage) signal to the first TCO layer 214. A second bus bar 228 distributes a second electrical (for example, a voltage) signal to the first TCO layer 214. In some other implementations, one of the first and the second bus bars 226 and 228 can ground the respective one of the first and the second TCO layers 214 and 216. In the illustrated implementation, each of the first and the second bus bars 226 and 228 is printed, patterned, or otherwise formed such that it is oriented along a respective length of the first pane 204 along a border of the EC stack 212. In some implementations, each of the first and the second bus bars 226 and 228 is formed by depositing a conductive ink, for example, a silver ink, in the form of a line. In some implementations, each of the first and the second bus bars 226 and 228 extends along the entire length (or nearly the entire length) of the first pane 204.

In the illustrated implementation, the first TCO layer 214, the EC stack 212 and the second TCO layer 216 do not extend to the absolute edges of the first pane 204. For example, in some implementations, a laser edge delete (LED) or other operation can be used to remove portions of the first TCO layer 214, the EC stack 212 and the second TCO layer 216 such that these layers are separated or inset from the respective edges of the first pane 204 by a distance "G," which can be in the range of approximately 8 mm to approximately 10 mm (although other distances are possible and may be desirable). Additionally, in some implementations, an edge portion of the EC stack 212 and the second TCO layer 216 along one side of the first pane 2014 is removed to enable the first bus bar 226 to be formed on the first TCO layer 214 to enable conductive coupling between the first bus bar 226 and the first TCO layer 214. The second bus bar 228 is formed on the second TCO layer 216 to enable conductive coupling between the second bus bar 228 and the second TCO layer 216. In some implementations, the first and the second bus bars 226 and 228 are formed in a region between the respective spacers 218 and the first pane 204 as shown in FIG. 2A. For example, each of the first and the second bus bars 226 and 228 can be inset from an inner edge of the respective spacer 218 by at least a distance "F," which can be in the range of approximately 2 mm to approximately 3 mm (although other distances are possible and may be desirable). One reason for this arrangement is to hide the bus bars from view. A further description of bus bar positioning and LED is found in U.S. Patent Application No. 61/923, 171, filed Jan. 2, 2014, which is incorporated herein by reference in its entirety.

Example Strip Line Antennas on IGUS and Lites

In the implementation shown in FIG. 2A, first and second antenna structures 230 and 232 are formed within the inset region defined by the distance G. In some implementations, each of the first and the second antenna structures 230 and 232 is configured as a strip line antenna. In some implementations, each of the first and the second antenna structures 230 and 232 is formed by depositing a conductive ink, for example, a silver ink, in the form of a line. In some other implementations, each of the first and the second antenna structures 230 and 232 can be formed by applying or adhering a conductive (for example, copper) foil or using suitable PVD or other deposition processes. In some other implementations, each of the first and the second antenna structures 230 and 232 is formed by patterning the first TCO layer 214 to electrically isolate conductive strip lines. In some implementations, each of the first and the second antenna structures 230 and 232 extends along a portion of the length of the first pane 204. The length of each of the first and the second antenna structures 230 and 232 is generally dictated by the wavelength of the respective signal the antenna structure is designed to transmit or receive. For example, the length of each of the first and the second antenna structures 230 and 232 can be equal to an integer number of quarter-wavelengths of the relevant signal. In some implementations, each of the first and the second antenna structures 230 and 232 has a width suitable for carrying signals of the desired frequencies, and a thickness suitable for carrying signals of the desired frequencies. In some implementations, the width and thickness of each of the first and the second antenna structures 230 and 232 may correspond to an integer multiple of a wavelength (or fraction thereof) of a signal to be carried by the antenna structure. In embodiments where the antenna structure occupies at least a portion of the visible region of a window lite, the lines defining the antenna structure may made sufficiently thin that they are not substantially visible to individuals looking through the IGU. The examples in FIGS. 2A-2J, 3A-3J, 4A-4B, and 5A-5B present a small subset of the available window antenna designs within the scope of this disclosure, so they should not be considered limiting in any way.

In some implementations, each of the first and the second antenna structures 230 and 232 can be individually-addressable or independently driven, as for example when each antenna is a monopole antenna. For example, each of the first and the second antenna structures 230 and 232 can be electrically connected via a conductive bus, line, or interconnect (hereinafter used interchangeably where appropriate) to the corresponding window controller or to another controller or device for transmitting signals to the first and the second antenna structures 230 and 232 or for receiving signals from the first and the second antenna structures 230 and 232. Additionally, in some implementations, each of the first and the second antenna structures 230 and 232 can have a different set of parameters than the other (for example, a different length, width or thickness depending on the relevant signal or signals to be transmitted or received). In some other implementations, the IGU 202 can include only one of the antenna structures 230 and 232 or more than the two antenna structures 230 and 232. In some implementations, one of the antennas is set to receive signals and the other is set to transmit signals. In some implementations, the two antenna structures are driven in a complementary controlled fashion as when they are part of a dipole antenna.

In some embodiments, a ground plane and/or antenna structure is fabricated on the same surface as the electrochromic device. In one example, a combined ground plane and electrochromic device stack includes a flat continuous ground plane next to the glass substrate, an insulating layer next to that ground plane, the first transparent conductive layer of the electrochromic stack on top of the insulator, and the remainder of the electrochromic device on top of that transparent conductive layer. The electrochromic device stack may be fabricated per conventional fabrication procedures. In this approach, the lower ground plane could be the TEC (a fluorinated tin oxide) layer applied by certain glass manufacturers, or it could be applied by the electrochromic device manufacturer, or it could be a combination of the two. For example, existing TEC could be modified by the glass manufacturer to be thicker or to include a combination of the TEC from the manufacturer with a thin additional layer of transparent conductor placed on top of the TEC.

In some implementations, the IGU 202 of FIG. 2A further includes a ground plane 234 on the first surface S1 of the first pane 204. The ground plane 234 can function to make the antenna structures 230 and 232 directional. For example, as described above, FIGS. 2A-2J show cross-sectional views of example IGUs 202 with integrated antennas capable of transmitting signals into, or receiving signals from, an interior environment according to some implementations. As such, by forming or otherwise including a ground plane 234 between the first and the second antenna structures 230 and 232 and the exterior environment, each of the first and the second antenna structures 230 and 232 can be so as to be directional with respect to the interior environment; that is, capable of transmitting signals into, or receiving signals from, only the interior environment. If such directionality is not needed or is not desired, the ground plane 234 is not included. In some implementations, the ground plane 234 can extend across substantially all of the surface S1 as shown. In some other implementations, the ground plane 234 can extend only along and across regions of the surface S1 in proximity to the respective first and second antenna structures 230 and 232. In some implementations, the ground plane 234 can be formed of a conductive material such as any of those described above, including thin film metals or metallic alloys as well as conductive oxides. Typically when the ground plane is in the viewable window area of an IGU, the ground plane has an optical transmissivity that does not significantly reduce an occupant's ability to see through the window when in a clear state.

FIG. 2B shows a cross-sectional view of another example IGU 202 with integrated antennas capable of transmitting signals into, or receiving signals from, an interior environment according to some implementations. The IGU 202 shown and described with reference to FIG. 2B is similar to the IGU 202 shown and described with reference to FIG. 2A except for at least the difference that the first and the second antenna structures 230 and 232 are formed on respective edge regions of the first TCO layer 214. To electrically insulate the first and the second antenna structures 230 and 232 from the first TCO layer 214, a dielectric or other insulating material layer 236 is provided on the first TCO layer 214 under the first and the second antenna structures 230 and 232. In some embodiments, only one of the two antennas is provided on first TCO layer 214. For example, antenna structure 232 may be provided directly on substrate 204.

FIG. 2C shows a cross-sectional view of another example IGU 202 with integrated antennas capable of transmitting signals into, or receiving signals from, an interior environment according to some implementations. The IGU 202 shown and described with reference to FIG. 2C is similar to the IGU 202 shown and described with reference to FIG. 2A except for at least the difference that the first and the second antenna structures 230 and 232 are formed on respective edge regions of the second TCO layer 216. To electrically insulate the first and the second antenna structures 230 and 232 from the second TCO layer 216, a dielectric or other insulating material layer 236 is provided on the second TCO layer 216 under the first and the second antenna structures 230 and 232. In some embodiments, only one of the two antennas is provided on second TCO layer 216. For example, antenna structure 230 may be provided directly on substrate 204 or on first TCO layer 214 (but separated therefrom by insulating layer 236).

FIG. 2D shows a cross-sectional view of another example IGU 202 with integrated antennas capable of transmitting signals into, or receiving signals from, an interior environment according to some implementations. The IGU 202 shown and described with reference to FIG. 2D is similar to the IGU 202 shown and described with reference to FIG. 2A except for at least the difference that the first and the second antenna structures 230 and 232 are formed by patterning the second TCO layer 216. For example, one or more laser scribing, laser ablating or etching processes can be used to pattern the first and the second antenna structures 230 and 232 and to electrically insulate the first and the second antenna structures 230 and 232 from the surrounding portions of the second TCO layer 216. In the depicted embodiment, antenna structure 230 includes two strip lines.

FIG. 2E shows a cross-sectional view of another example IGU 202 with integrated antennas capable of transmitting signals into, or receiving signals from, an interior environment according to some implementations. The IGU 202 shown and described with reference to FIG. 2E is similar to the IGU 202 shown and described with reference to FIG. 2C except for at least the difference that the first and the second antenna structures 230 and 232 are formed on a ground plane 234, which is, in turn, formed on the second TCO layer 216. To electrically insulate the ground plane 234 from the second TCO layer 216, a dielectric or other insulating material layer 238 is provided on the second TCO layer 216 and under the ground plane 234. Insulating strips 236 isolate antenna structures 230 and 232 from ground plane 234.

FIG. 2F shows a cross-sectional view of another example IGU 202 with integrated antennas capable of transmitting signals into, or receiving signals from, an interior environment according to some implementations. The IGU 202 shown and described with reference to FIG. 2F is similar to the IGU 202 shown and described with reference to FIG. 2E except for at least the difference that the ground plane 234 is formed between the second surface S2 of the first pane 204 and the EC device 210. To electrically insulate the ground plane 234 from the first TCO layer 214, a dielectric or other insulating material layer 238 is first formed on the ground plane 234 before the formation of the first TCO layer 214. In the depicted embodiments, antenna structures 230 and 232, along with insulating strips 236, reside on second TCO 216. In other embodiments, one or both of the antenna structures reside on first TCO 214.

FIG. 2G shows a cross-sectional view of another example IGU 202 with integrated antennas capable of transmitting signals into, or receiving signals from, an interior environment according to some implementations. The IGU 202 shown and described with reference to FIG. 2G is similar to the IGU 202 shown and described with reference to FIG. 2A except for at least the difference that the first and the second antenna structures 230 and 232 are formed on respective edge regions of the first surface S3 of the second pane 206. In some cases, the antenna structures are formed by printing conductive materials such as silver ink. In some implementations, the IGU 202 of FIG. 2G further includes a ground plane 234 disposed over the first and the second antenna structures 230 and 234. To electrically insulate the ground plane 234 from the first and the second antenna structures 230 and 232, a dielectric or other insulating material layer 236 is first formed over the first and the second antenna structures 230 and 232 before the formation of the ground plane 234. In some other implementations, the ground plane 234 can be disposed on the first surface S1 of the first pane 204 or on the second surface S2 of the first pane 204 under or over the EC device 210.

FIG. 2H shows a cross-sectional view of another example IGU 202 with integrated antennas capable of transmitting signals into, or receiving signals from, an interior environment according to some implementations. The IGU 202 shown and described with reference to FIG. 2H is similar to the IGU 202 shown and described with reference to FIG. 2G except for at least the difference that the first and the second antenna structures 230 and 232 are patterned from a conductive oxide layer (for example, such as the same material as the first and second TCO layers 214 and 216).

FIG. 2I shows a cross-sectional view of another example IGU 202 with integrated antennas capable of transmitting signals into, or receiving signals from, an interior environment according to some implementations. The IGU 202 shown and described with reference to FIG. 2I is similar to the IGU 202 shown and described with reference to FIG. 2G except for at least the difference that the first and the second antenna structures 230 and 232 are formed on respective edge regions of the first surface S1 of the first pane 204. In some cases, the antenna structures are conductive strips such as silver ink strips. In some implementations, the IGU 202 of FIG. 2I further includes a ground plane 234 formed over the first and the second antenna structures 230 and 234. To electrically insulate the ground plane 234 from the first and the second antenna structures 230 and 232, a dielectric or other insulating material layer 236 is first formed over the first and the second antenna structures 230 and 232 before the formation of the ground plane 234.

FIG. 2J shows a cross-sectional view of another example IGU 202 with integrated antennas capable of transmitting signals into, or receiving signals from, an interior environment according to some implementations. The IGU 202 shown and described with reference to FIG. 2J is similar to the IGU 202 shown and described with reference to FIG. 2I except for at least the difference that the first and the second antenna structures 230 and 232 are patterned from a conductive oxide layer (for example, such as the same material as the first and second TCO layers 214 and 216).

FIGS. 3A-3J show cross-sectional views of example IGUs 202 with integrated antennas capable of transmitting signals out to, or receiving signals from, an exterior environment according to some implementations. Many of the features shown and described with reference to FIGS. 2A-2J are applicable to the embodiments of FIGS. 3A-3J but with the relative positions of the ground plane and antenna structures reversed. The IGU 202 shown and described with reference to FIG. 3A is similar to the IGU 202 shown and described with reference to FIG. 2A except for at least the difference that the ground plane 234 is formed on the first surface S3 of the second pane 206. In some other implementations, the ground plane 234 can be formed on the second surface S4 of the second pane 206.

FIG. 3B shows a cross-sectional view of another example IGU 202 with integrated antennas capable of transmitting signals out to, or receiving signals from, an exterior environment according to some implementations. The IGU 202 shown and described with reference to FIG. 3B is similar to the IGU 202 shown and described with reference to FIG. 3A except for at least the difference that the first and the second antenna structures 230 and 232 are formed on respective edge regions of the first TCO layer 214. To electrically insulate the first and the second antenna structures 230 and 232 from the first TCO layer 214, a dielectric or other insulating material layer 236 is first formed on the first TCO layer 214 before the formation of the first and the second antenna structures 230 and 232.

FIG. 3C shows a cross-sectional view of another example IGU 202 with integrated antennas capable of transmitting signals out to, or receiving signals from, an exterior environment according to some implementations. The IGU 202 shown and described with reference to FIG. 3C is similar to the IGU 202 shown and described with reference to FIG. 3A except for at least the difference that the first and the second antenna structures 230 and 232 are formed on respective edge regions of the second TCO layer 216. To electrically insulate the first and the second antenna structures 230 and 232 from the second TCO layer 216, a dielectric or other insulating material layer 236 is first formed on the second TCO layer 216 before the formation of the first and the second antenna structures 230 and 232.

FIG. 3D shows a cross-sectional view of another example IGU 202 with integrated antennas capable of transmitting signals out to, or receiving signals from, an exterior environment according to some implementations. The IGU 202 shown and described with reference to FIG. 3D is similar to the IGU 202 shown and described with reference to FIG. 3A except for at least the difference that the first and the second antenna structures 230 and 232 are formed by patterning the second TCO layer 216. For example, laser scribing or etching processes can be used to pattern the first and the second antenna structures 230 and 232 and to electrically insulate the first and the second antenna structures 230 and 232 from the surrounding portions of the second TCO layer 216.

FIG. 3E shows a cross-sectional view of another example IGU 202 with integrated antennas capable of transmitting signals out to, or receiving signals from, an exterior environment according to some implementations. The IGU 202 shown and described with reference to FIG. 3E is similar to the IGU 202 shown and described with reference to FIG. 3C except for at least the difference that the ground plane is formed over the first and the second antenna structures 230 and 232. To electrically insulate the ground plane 234 from the first and the second antenna structures 230 and 232, a dielectric or other insulating material layer 238 is first formed on the first and the second antenna structures 230 and 232 before the formation of the ground plane 234.

FIG. 3F shows a cross-sectional view of another example IGU 202 with integrated antennas capable of transmitting signals out to, or receiving signals from, an exterior environment according to some implementations. The IGU 202 shown and described with reference to FIG. 3F is similar to the IGU 202 shown and described with reference to FIG. 3E except for at least the difference that the first and the second antenna structures 230 and 232, the insulating layer 236 and the ground plane 234 are formed on the second surface S2 of the first pane 204 under and before the formation of the EC device 210.

FIG. 3G shows a cross-sectional view of another example IGU 202 with integrated antennas capable of transmitting signals out to, or receiving signals from, an exterior environment according to some implementations. The IGU 202 shown and described with reference to FIG. 3G is similar to the IGU 202 shown and described with reference to FIG. 3A except for at least the difference that the first and the second antenna structures 230 and 232 are formed on respective edge regions of the first surface S3 of the second pane 206. In some implementations, the IGU 202 of FIG. 3G further includes a ground plane 234 formed between the first and the second antenna structures 230 and 234 and the surface S3. To electrically insulate the ground plane 234 from the first and the second antenna structures 230 and 232, a dielectric or other insulating material layer 236 is first formed over the ground plane 234 before the formation of the first and the second antenna structures 230 and 232. In some other implementations, the ground plane 234 can be formed on the second surface S4 of the second pane 206.

FIG. 3H shows a cross-sectional view of another example IGU 202 with integrated antennas capable of transmitting signals out to, or receiving signals from, an exterior environment according to some implementations. The IGU 202 shown and described with reference to FIG. 3H is similar to the IGU 202 shown and described with reference to FIG. 3G except for at least the difference that the first and the second antenna structures 230 and 232 are patterned from a conductive oxide layer (for example, such as the same material as the first and second TCO layers 214 and 216).

FIG. 3I shows a cross-sectional view of another example IGU 202 with integrated antennas capable of transmitting signals out to, or receiving signals from, an exterior environment according to some implementations. The IGU 202 shown and described with reference to FIG. 3I is similar to the IGU 202 shown and described with reference to FIG. 3G except for at least the difference that the first and the second antenna structures 230 and 232 are formed on respective edge regions of the first surface S1 of the first pane 204. In some implementations, the IGU 202 of FIG. 2I further includes a ground plane 234 formed over the surface S1 under the first and the second antenna structures 230 and 234. To electrically insulate the ground plane 234 from the first and the second antenna structures 230 and 232, a dielectric or other insulating material layer 236 is first formed over ground plane 234 before the formation of the first and the second antenna structures 230 and 232.

FIG. 3J shows a cross-sectional view of another example IGU 202 with integrated antennas capable of transmitting signals into, or receiving signals from, an interior environment according to some implementations. The IGU 202 shown and described with reference to FIG. 3J is similar to the IGU 202 shown and described with reference to FIG. 3I except for at least the difference that the first and the second antenna structures 230 and 232 are patterned from a conductive oxide layer (for example, such as the same material as the first and second TCO layers 214 and 216).

Figure 4A:
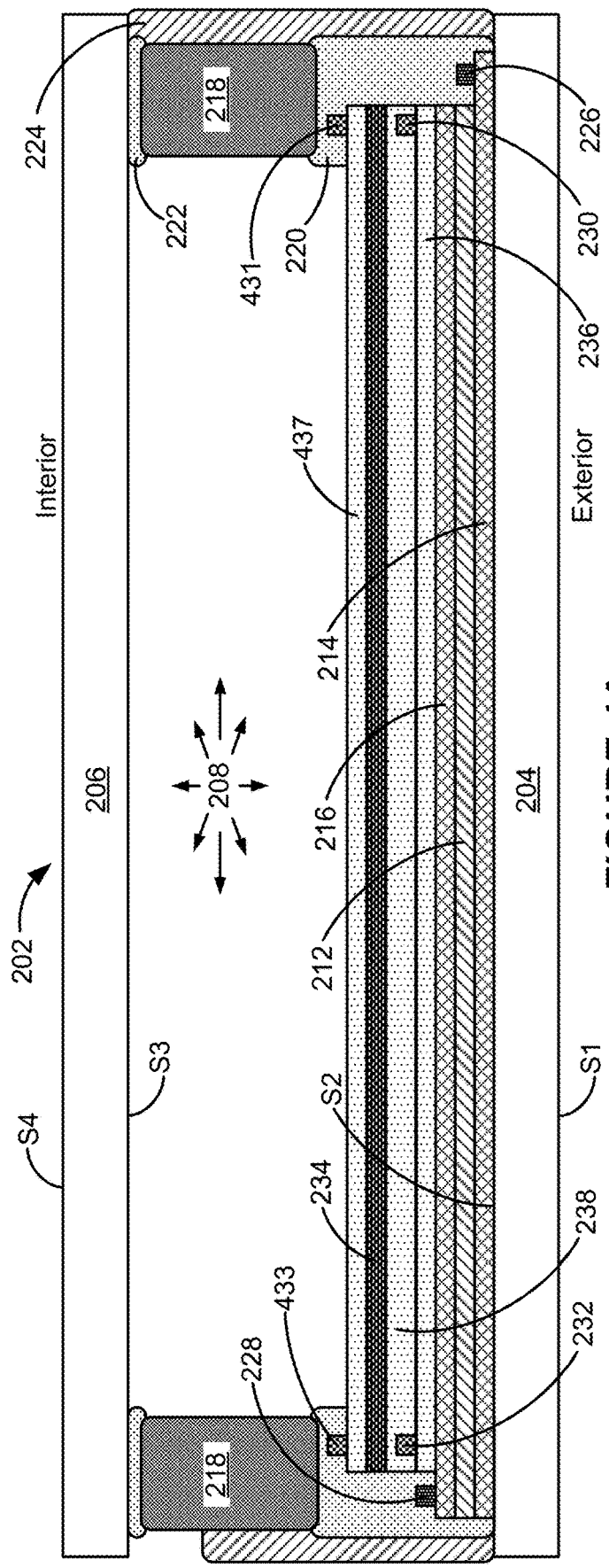
FIGS. 4A and 4B show cross-sectional views of example electrochromic window structures with integrated antennas capable of transmitting and receiving signals to and from interior and exterior environments according to some implementations.
Figure 4B:
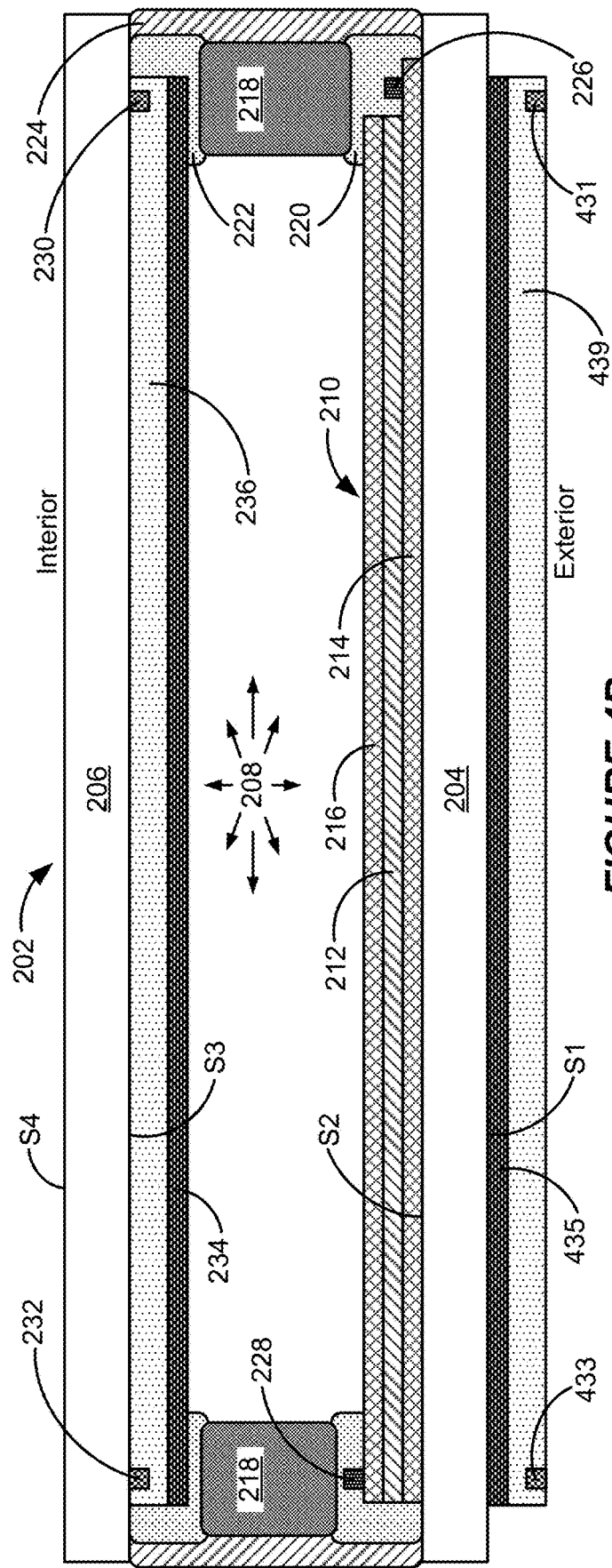

FIGS. 4A and 4B show cross-sectional views of example IGUs 202 with integrated antennas capable of transmitting and receiving signals to and from interior and exterior environments according to some implementations. In various embodiments having such functionality, at least one ground plane is disposed between one antenna structure on the interior side of the ground plane and another antenna structure on the exterior side of the ground plane. The interior facing antenna structure is not blocked by a further ground plane on the interior side of the antenna structure. Similarly, the exterior facing antenna structure is not blocked by a further ground plane on the exterior side of the antenna structure. In some implementations, multiple ground planes are disposed between the interior and exterior facing antenna structures.

Certain embodiments pertain to patch antennas having (i) a patch of conductive material on a window to form the antenna structure, and (ii) a ground plane that may be parallel to or perpendicular to (or any angle between) the patch antenna structure. The patch antenna may be configured as a monopole antenna similar to the strip line antennas described elsewhere herein. While the strip line is typically relatively thin (in a dimension parallel to the surface on which it is formed), the patch is relatively wider, e.g., at least about 0.5 inches in its narrowest dimension (i.e., a dimension parallel to the surface on which it is formed). In other embodiments, the patch is at least about 1 inch in its narrowest dimension, or about at least about 2 inches, or at least about 3 inches. In certain embodiments, the patch antenna structure is a continuous, unpatterned patch of conductive material having a thickness (directly perpendicular to the surface on which it is formed) as appropriate for strip line antenna structures disclosed herein. In some embodiments, a patch antenna structure is patterned; e.g., some fractal antenna structures. Unless otherwise specified, any discussion of a strip line antenna structure applies equally to a patch antenna structure.

Ground Plane and Antenna Structure on Same Plane

The embodiments of FIGS. 2A-4B show the ground plane and antenna structure on different layers. This need not be the case. In some implementations, the ground plane and antenna structure(s) occupy different regions of a single layer. For example, a TCO layer may be patterned and electrically connected so that a grounded portion of the TCO serves as the ground plane and one or more separately connected lines serve as the antenna structure. Such designs may be appropriate when, for example, it is not convenient to provide a flat ground plane on an off-lite structure such as spacer or window frame structure. Depending on the relative sizes, positions, and orientations of the ground plane and antenna structure on a layer, the radiation for transmission or reception is distributed as understood by those of skill in the art. For example, as explained above, radiation transmitted from a window antenna may be directed away from the ground plane. FIG. 9D presents an example of fractal patch antenna 995 and a strip ground plane 993 deployed on the same pane of a lite. Other examples employ other shapes and sizes of ground plane, including rectangles covering all or a portion of a side of a lite. Other examples, employ other antenna structures such as other forms of patch antenna, strip line antennas, etc.

Classes of Antenna Design for Window Antennas

Location of Antenna Structure with Respect to an Electrochromic Device

The various IGU antenna designs typically fall into one or more classes In one class, the electrochromic device itself is modified to include an antenna or a portion thereof. In such embodiments, the antenna may be fabricated in or on a transparent conductor layer of the device such as a transparent conductor layer (e.g., a fluorinated tin oxide or "TEC" layer) disposed adjacent to the glass substrate or an upper transparent conductor layer (e.g., an indium tin oxide or "ITO" layer) provided at the top of the electrochromic stack opposite the glass surface. In the electrochromic device, each of the two transparent conductor layers is connected to its own bus bar which drives the transparent conductive layers to opposite polarities during switching of the electrochromic device. When an antenna is provided in or on one of these layers, the antenna must be electrically isolated from the surrounding portion of the conductive layer and an additional electrical connection must be provided for the antenna transmission line. For example, an antenna design pattern can effectively be drawn and electrically isolated from the surrounding conductive layer by laser scribing or etching. In some embodiments, the bus bar is segmented so that one or more segments power the electrochromic device transition and a different segment transmits or receives electrical signals to/from the antenna.

In another class, an antenna structure is fabricated in a layer of a stack that is integral with the electrochromic device, but the layer does not directly serve a function associated with tinting or switching of the electrochromic device. In one example, a separate layer of conductive material is deposited on the substrate containing the electrochromic device stack. In some embodiments, the additional layer is deposited on the side of the substrate (glass) where the electrochromic device stack is fabricated and the formation of this layer can be integrated in the deposition of the electrochromic device stack layers. For example, on top of the electrochromic device (on the side away from the glass substrate), the antenna structure may be implemented as an insulating layer over the upper transparent conductor layer and a printed pattern or a patterned conductive layer over the insulating layer, with the pattern defining the antenna structure. In some embodiments, the separate conductive layer dedicated to the antenna structure is provided with the substrate and need not be separately deposited during the fabrication of the electrochromic device. Regardless of how the dedicated antenna structure layer is fabricated, it will include a separate electrical connection for the antenna structure(s) in or on the layer. Separately, the two transparent conductive layers that serve to drive switching of the electrochromic device will have standard bus bars or other connections for applying voltage of polarities required to drive the optical switching.

In another class, a portion of one of the transparent conductive layers of the electrochromic device stack is stripped off the underlying substrate, and subsequently, the antenna structure is formed on the exposed area (e.g., with CVD, rolling mask lithography or conductive-ink printing techniques). In certain embodiments, the removed portion of the TCO is located at or near the edge of an electrochromic lite.

In another class, the antenna structure is disposed on an IGU surface other than the one having the electrochromic device. Such other surface may be a surface opposite the lite surface on which the electrochromic device stack resides. In some such embodiments, an electrochromic lite includes a laminate structure, including the antenna structure, that includes additional layers or panes not included in the current ECD design. In other embodiments, the antenna structure is formed on a surface of a separate lite of an IGU.

Antennas on Spacers

FIGS. 5A and 5B show cross-sectional views of other example IGUs 202 with integrated antennas according to some implementations. In the IGU 202 shown and described with reference to FIG. 5A, one or more first antenna structures 540 are formed on an interior side surface of a first one of the spacers 218 while one or more second antenna structures 542 are formed on an interior side surface of a second one of the spacers 218. The first and the second antenna structures 540 and 542 may be adhered to the spacers 218 using adhesive layers 544 and 546, respectively. For example, the first and the second antenna structures 542 and 544 can be formed of a conductive foil mounted or otherwise deposited or formed on a mylar or other adhesive tape. The IGU 202 shown and described with reference to FIG. 5B is similar to the IGU 202 shown and described with reference to FIG. 5A except for at least the difference that the IGU 202 of FIG. 5B includes metal spacers 548 rather than foam or other insulating spacers 218. In such implementations, the spacers 548 themselves may function as ground planes. Alternatively, if a spacer or portion thereof is appropriated configured (size, shape, location, conductor material), the spacer may be driven as a radiating antenna electrode.

Figure 8A:
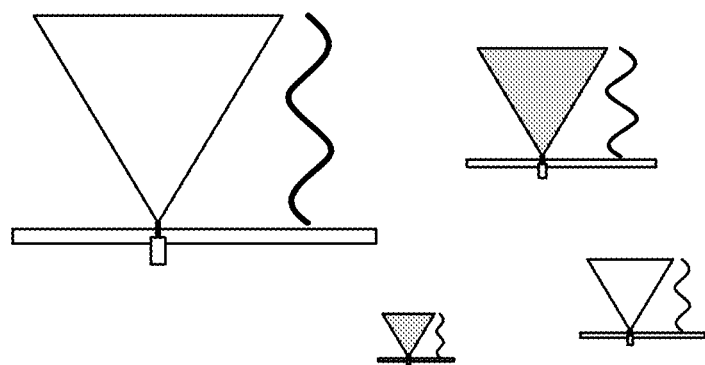
FIGS. 8A-8C show examples and information about Sierpinski fractal window antennas.
Figure 8A:
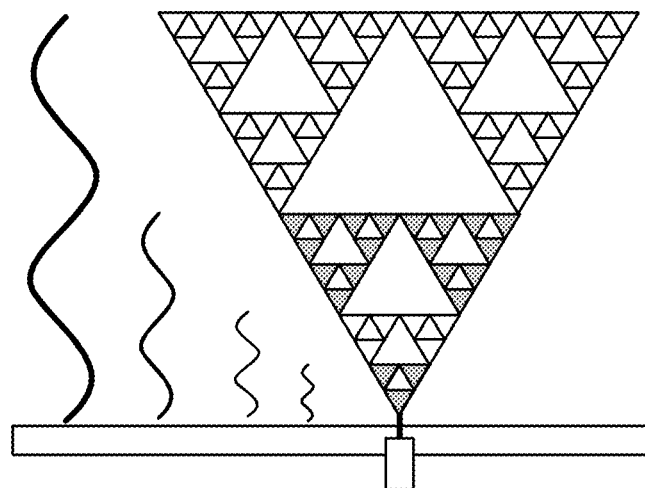
Figure 8B:
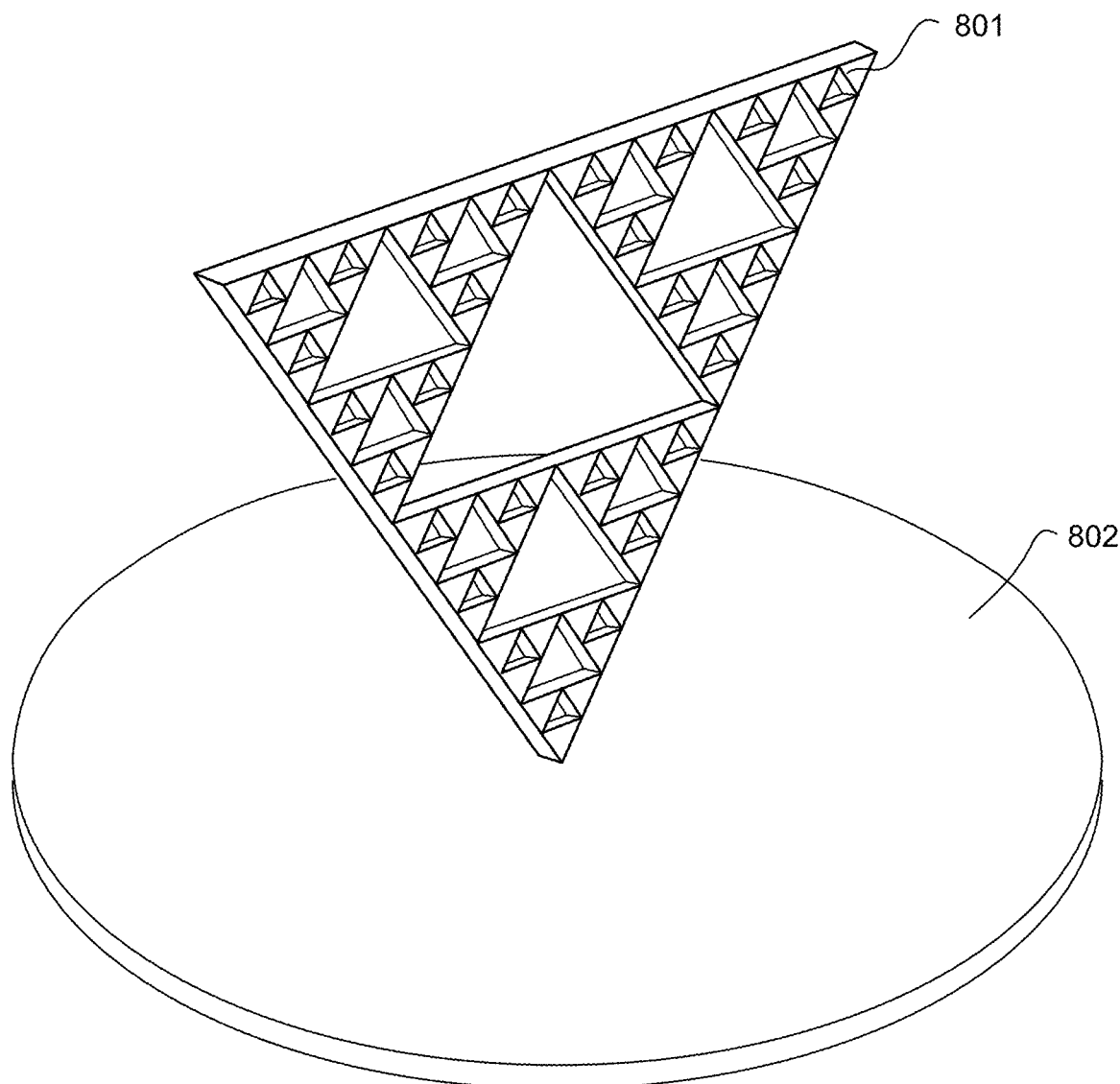
Figure 9A:
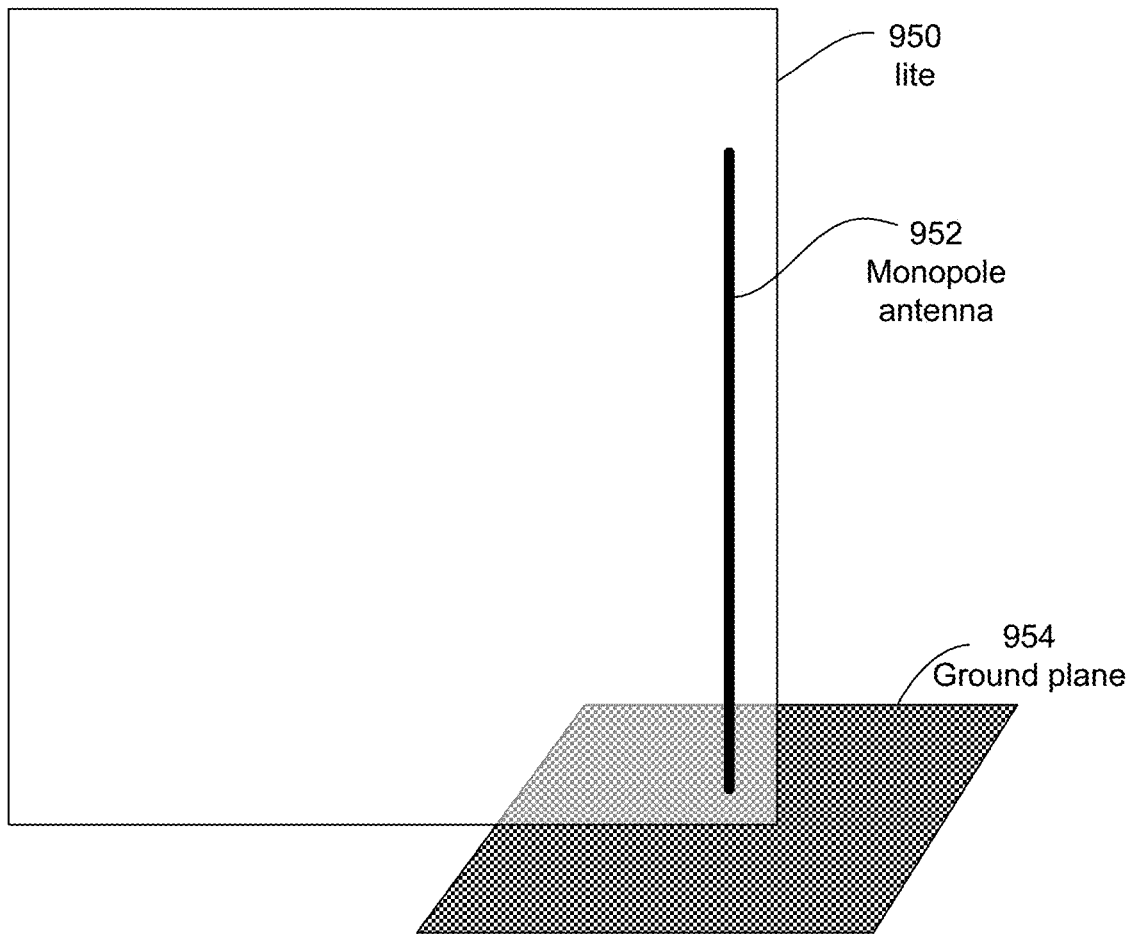
FIG. 9A shows a simplified view of an example monopole antenna for a window.

Window Antenna Designs as Characterized by Electrode Structure and Radiation Properties Example Monopole Antennas A monopole antenna has an antenna structure that is a single pole, line, or patch, although it may include other shapes such as the triangular shapes employed in some fractal antennas such as those shown in FIGS. 8A and 8B. Often in window implementations, the antenna structure is provided as a strip line or patch on a window surface (e.g., as a thin line of TCO, copper metal, or silver ink). The second electrode is a ground plane oriented perpendicular to the axis of the line forming the antenna structure. The term perpendicular is intended to include orientations in which the electrodes are exactly 90 degrees apart as well as orientations where the electrodes are not exactly 90 degrees apart (e.g., they are at about 85 to 90 degrees, or at about 75 to 90 degrees, or at about 60 to 90 degrees). The ground plane is disposed beyond one of the ends of the antenna structure, such that a gas (e.g., air or gas filling the IGU interior) or other dielectric separates the end of the antenna structure from the ground plane. When the antenna structure is disposed on a window, the ground plane may be provided on an adjacent structure such as a window frame, a building framing component such as a mullion or transom, the spacer of an IGU, or a separate conductive, substantially-planar structure affixed to the window or any of the foregoing elements. A basic structure of a monopole antenna for application in a window antenna is depicted in FIG. 9A, which includes a lite 950, on which is provided a strip of conductive material (antenna structure 952), and a separate ground plane 954, oriented substantially perpendicular to the antenna structure. FIG. 9D also depicts a monopole antenna, this time with a fractal patch as the antenna structure, and a coplanar conductive strip as the ground plane.

A monopole antenna transmits (and/or receives) radiation in a single frequency or a narrow band of frequencies. The frequency spread is chosen for the application. Typically, the narrower the spread, the more efficient the antenna uses power. However, some transmission protocols such as Wi-Fi employ a spread of frequencies (e.g., 2.40 GHz to 2.49 GHz) and it may be desirable for the antenna to transmit or receive over a comparable range. The length of a monopole antenna is determined by the wavelength of the RF waves it is used with. For example, a quarter-wave monopole has a length approximately ¼ of a wavelength of the radio waves.

A monopole antenna typically transmits (and/or receives) radiation omnidirectionally; e.g., approximately 360 degrees around the axis of the antenna structure's line. The signal strength may be evenly or nearly evenly distributed around the monopole axis. It radiates (or receives) little if any signal beyond the ground plane. Further, it radiates (or receives) only limited signal in the direction of the monopole axis, away from the ground plane. When a monopole antenna structure is disposed a flat surface such as a lite, it radiates to the left and right of the structure, as well as into and out of the plane of the lite. This directionally allows monopole designs to be used for many applications where omnidirectional azimuthal transmission or reception is desired.

A monopole antenna implemented on a window is relatively easy to fabricate. It may be implemented by a strip of conductive material on the plane of a glass window and a ground plane located orthogonal to the axis of the strip or patch of conductive material on the window. The ground plane can be implemented in many different ways. For example, it can be part of a conductive framing structure such as an aluminum transom some or mullion. It could also be a conductive sheet especially fabricated to be a ground plane such as a sheet of metal or conductive material affixed to a lite and separated from a terminus of the monopole antenna structure. It may also be such a flat section of conductive material formed on or affixed to the window frame or an insulated glazing unit, or other structure around the periphery of a glass pane having the monopole structure. In some implementations, the ground plane is disposed on the same lite as the monopole electrode antenna structure. As with other monopole antenna embodiments, the ground plane is offset from an axial terminus of the antenna structure, but in this case the ground plane is formed on a flat face of the a lite, either the surface on which the antenna structure resides (see FIG. 9D) or a parallel surface. In other embodiments, the ground plane is disposed on an edge of a lite. For example, the ground plane may be a conductive strip such as metal strip disposed on an edge of a lite adjacent a terminus of the monopole electrode structure. In some cases, such ground plane is disposed on two or more edges of the lite, as appropriate to constrain the antenna's radiation pattern.

Monopole antennas have various applications in the context of electrochromic windows. For example, monopole antennas may be employed in broadcasting signal to both the inside or outside the building. Monopole antennas may also receive signals from either the inside or outside of the building. Omnidirectional monopole antennas may be employed to produce Bluetooth beacons (IEEE 802.15.1; 2.4-2.485 GHz), Wi-Fi repeaters (IEEE 802.11; mainly 2.4 gigahertz and 5 gigahertz), Zigbee network communications (IEEE 802.15.4; 915 MHz in the US), etc.

A variant monopole antenna has a design similar to that of an omnidirectional monopole antenna design in that the antenna structure of the antenna is a single pole, patch, or line. And like the omnidirectional monopole antenna, the this monopole antenna has a ground plane, but the ground plane is oriented parallel to the axis of the monopole antenna structure. The term parallel is intended to include orientations in which the electrodes are exactly 0 degrees apart as well as orientations where the electrodes are not exactly 0 degrees apart (e.g., they are at about 0 to 5 degrees, or at about 0 to 15 degrees, or at about 0 to 30 degrees). When the antenna structure is disposed on a window, the ground plane may be provided on the same surface as the antenna structure or on parallel surface such as the opposite surface of the window having the antenna structure, or on one of the surfaces of a separate window of an IGU or other assembly of multiple window panes. As examples, the structures shown in FIGS. 2A-4B may be implemented as monopole antennas with parallel ground planes.

Like an omnidirectional monopole antenna, a monopole antenna with a parallel ground plane transmits (and/or receives) radiation in a single frequency or a narrow band of frequencies.

Unlike omnidirectional monopole antennas, monopole antennas with parallel ground planes typically transmit (and/or receive) radiation directionally; e.g., about 180 degrees around one side of the axis of the antenna structure's line. The signal strength may be evenly or nearly evenly distributed around the 180 degrees. It radiates (or receives) little if any signal beyond the ground plane. The radiation distribution may be a lobe, with the strongest signal in a direction opposite the ground plane. In some cases, the radiation distribution forms approximately one-half of cylinder sliced along the length of the antenna structure's axis.

Monopole antennas with parallel ground planes have various applications in the context of electrochromic windows. For example, monopole antennas with parallel ground planes may be employed to produce Bluetooth beacons (IEEE 802.15.1; 2.4-2.485 GHz), Wi-Fi repeaters (IEEE 802.11; mainly 2.4 gigahertz and 5 gigahertz), Zigbee network communications (IEEE 802.15.4; 915 MHz in the US), etc.

Example Dipole Antennas

A dipole antenna includes two electrodes, which are both antenna structures that radiate (or receive) electromagnetic energy. Each such electrode is a single pole, patch, or line, like the monopole. And, as with monopole antennas in window implementations, the dipole electrodes may be provided as strip lines on a window surface (e.g., as thin lines of TCO, copper metal, or silver ink). Typically, the lines or patches of the dipole antenna are parallel. The term parallel is intended to include orientations in which the electrodes are exactly 0 degrees apart as well as orientations where the electrodes are not exactly 0 degrees apart (e.g., they are at about 0 to 5 degrees, or at about 0 to 15 degrees, or at about 0 to 30 degrees). A dipole antenna may be designed with or without a ground plane. When present, a ground plane may be a third electrode and may be oriented perpendicular to or parallel to the poles of the dipole antenna, in a manner similar to the arrangements in omnidirectional and limited-directional monopole antennas. The individual dipole electrodes may share a single ground plane. In dipole designs, the ground plane may be provided on a conductive framing structure or other specially designed the structure as described above for the monopole antenna.

Dipole antennas typically operate at a single frequency or a narrow band of frequencies when the electrode lengths are the same or substantially the same. In such cases, the wavelength may be about two times the length of the dipole antenna structure lengths. When the antenna structures have different lengths, the antenna structure radiates (or receives) radiation of different frequencies, each associated with a different pole (electrode).

Dipole antennas operate directionally with maximum radiation strength (or signal reception efficiency) on two lobes substantially parallel to the two poles of antenna and having relatively high strength on a plane located between the two poles. Applications of dipole window antennas include those for monopole antennas, but in some cases with more directionality or where a stronger signal is required such as the lower floors of a tall building in a city. Such locations may experience severe noise and interference from multiple RF sources.

Figure 6B:
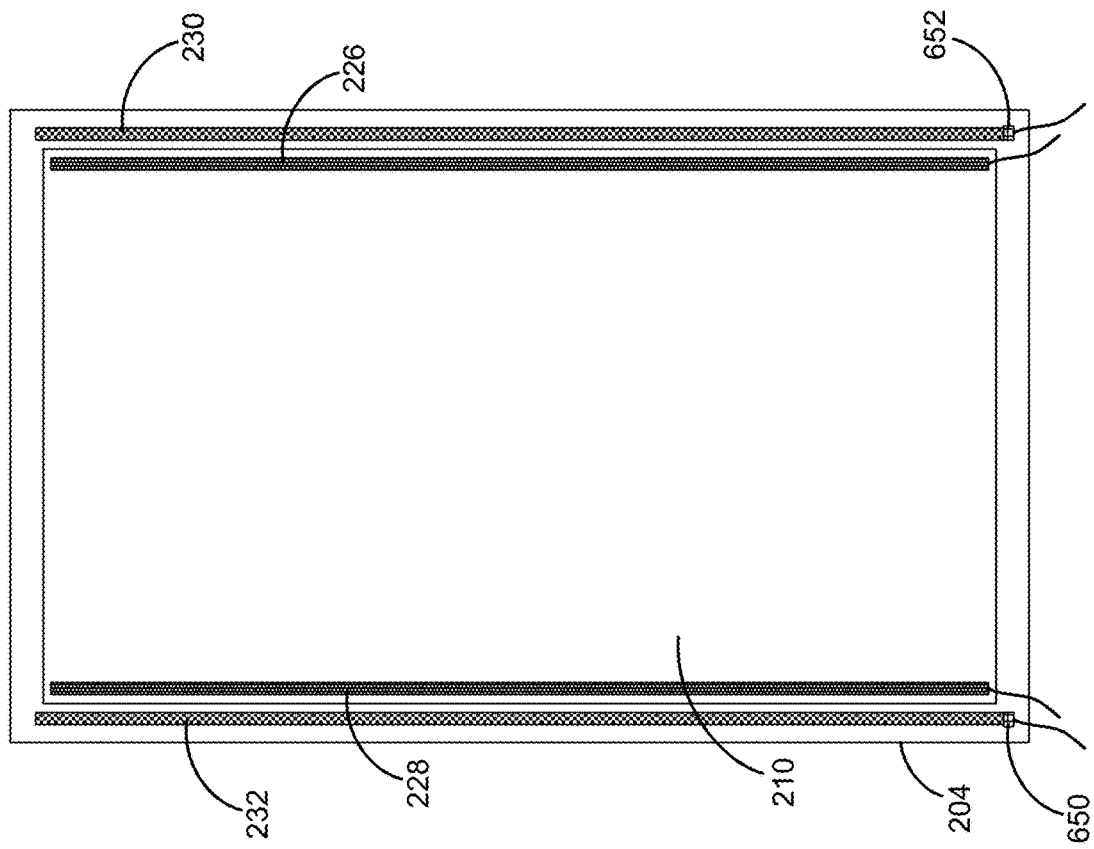
FIGS. 6A and 6B show plan views of example electrochromic window structures with integrated antennas according to some implementations. Plan views are taken from a front on perspective of the window, as for example, seen by a building occupant standing in a room having a window installed in a wall or façade.
Figure 6A:
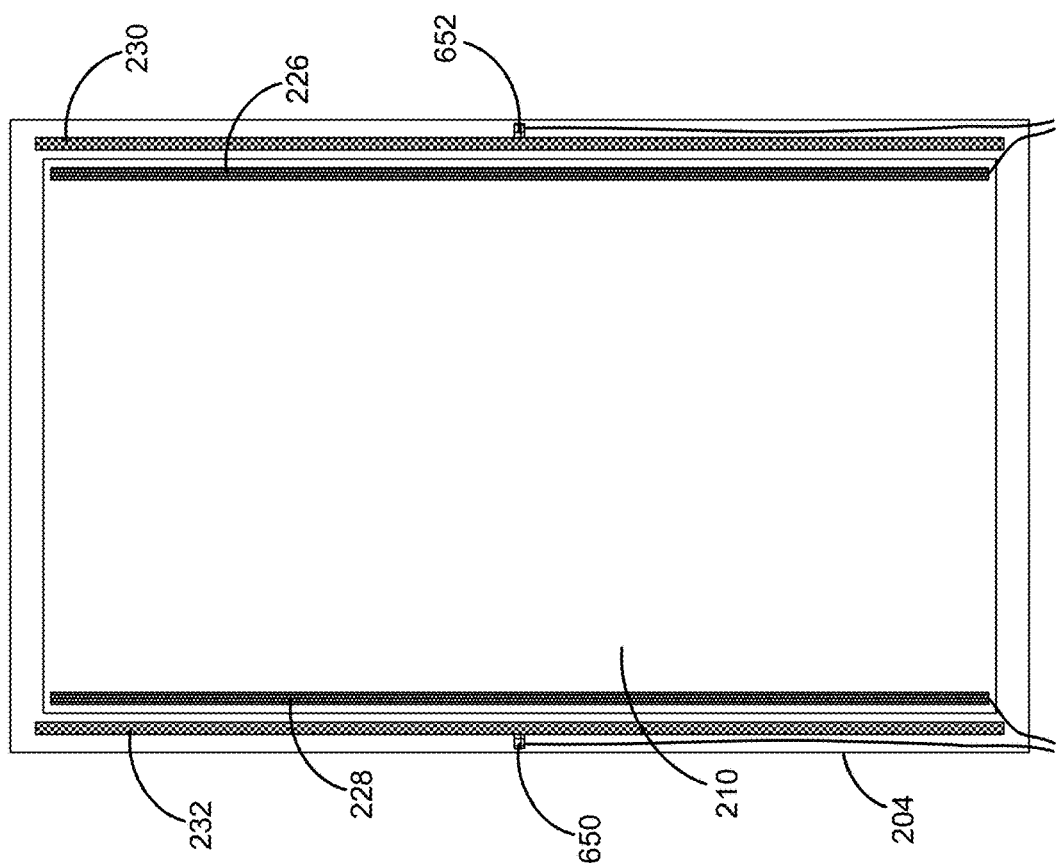

FIG. 6A shows a top or plan view of an IGU 202 such as that shown and described with reference to FIG. 2A or 2B. In the IGU 202 of FIG. 6A, the first and the second antenna structures 230 and 232 are center-connected as dipole antennas. In some implementations, the IGU 202 of FIG. 6A further includes matching circuits 650 and 652 for providing impedance matching or filtering for the first and the second antenna structures 230 and 232. For example, each of the matching circuits 650 and 652 can include one or more passive circuit elements such as one or more inductors, capacitors, resistors and/or transformers. The IGU 202 shown and described with reference to FIG. 6B is similar to the IGU 202 shown and described with reference to FIG. 6A except for at least the difference that the first and the second antenna structures 230 and 232 are electrically connected as monopole antennas.

Referring to FIG. 6B, if the first and the second antenna structures 230 and 232 have the same parameters (especially length) and are driven with signals of the same frequency in-phase, there will be constructive interference between them. However, if the first and the second antenna structures 230 and 232 have the same parameters (especially length) and are driven with signals of the same frequency 180 degrees out-of-phase, the combination of the first and the second antenna structures 230 and 232 will function as a folded dipole with each of the first and the second antenna structures 230 and 232 functioning as a half-dipole. Additionally, if the parameters of the first and the second antenna structures 230 and 232 are different or if the frequencies or phases of the signals applied to each of the first and the second antenna structures 230 and 232 are different, there will be both constructive and destructive interference, which can be used to adjust the directionality of the combination of the first and the second antenna structures 230 and 232 as a whole. In general, in implementations including multiple antenna design patterns (for, e.g., transmitting at different frequencies), the window is configured such that the multiple design patterns may be addressed independently by, e.g., a network controller. In some cases, the window and/or controller may be configured to dynamically select which antenna to use and which power and phase to apply. Additionally, in implementations in which a fractal antenna is used, a controller also can be used to adjust a frequency operating range of the fractal antenna In some embodiments, antenna structures 230 and 232 or other antenna structures such as those of FIG. 8B are located proximate edges of one or more lites in an IGU such that they are obscured by the IGU spacer and are therefore not visible in the viewable region of the lites. As such, the antenna structures can have line widths and other dimensions and optical properties that would make them otherwise visible if they were not hidden by the spacers. Note that in some embodiments, an IGU spacer is made from a non-conductive material when the spacer obscures an antenna structure.

Figure 7B:
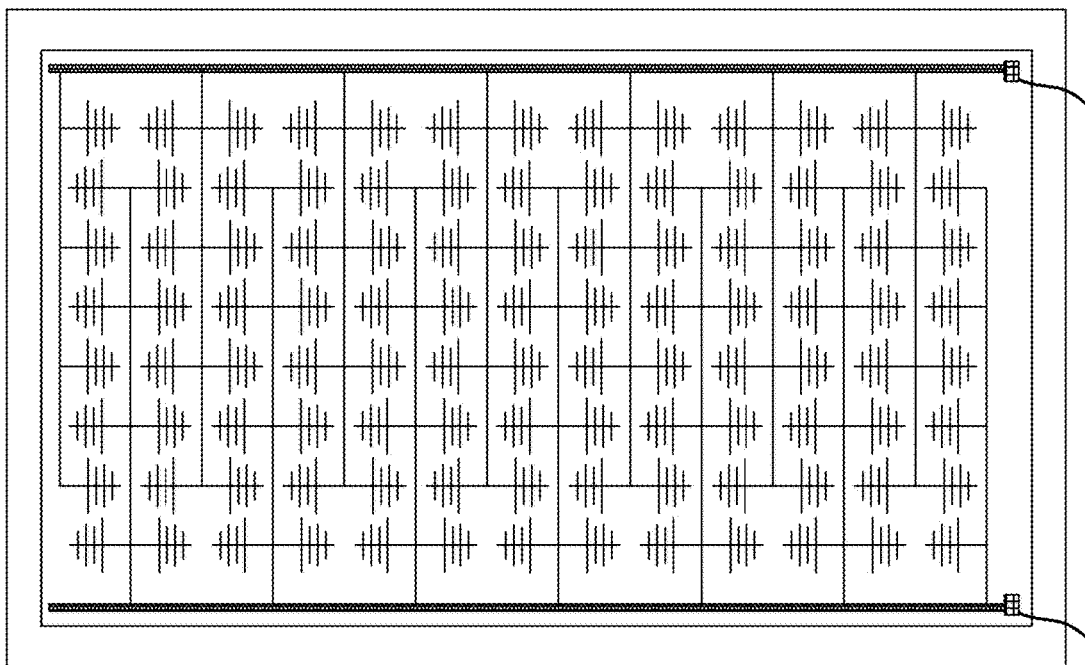
FIGS. 7A and 7B show top views of example electrochromic window structures with integrated multi-structure antennas according to some implementations.
Figure 7A:
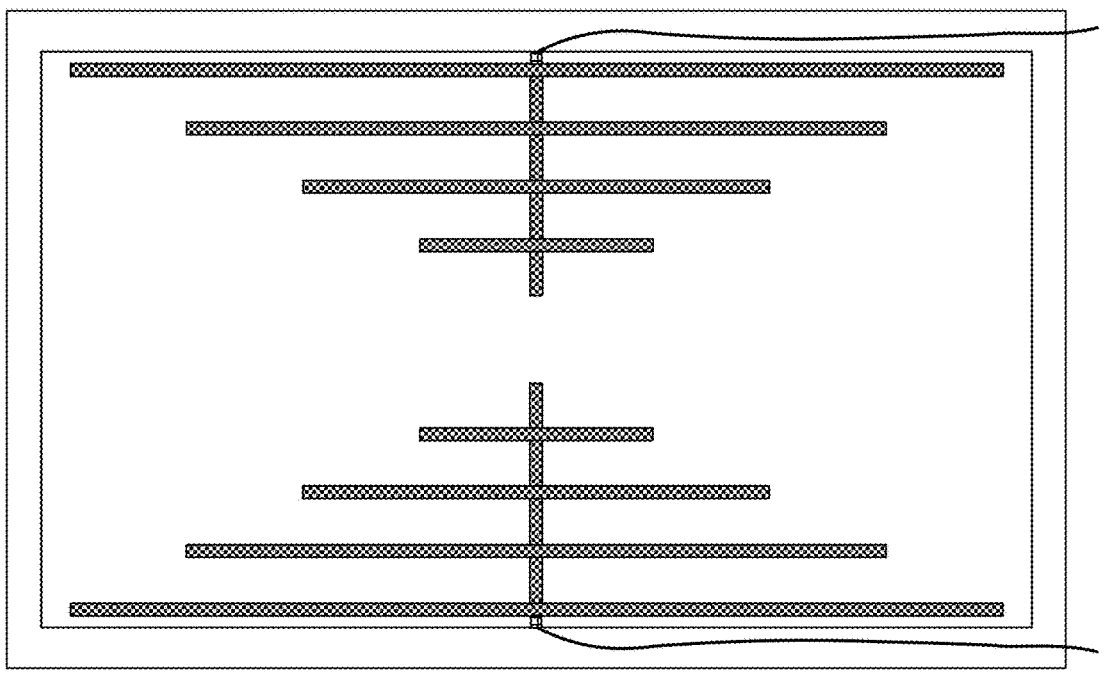

FIGS. 7A and 7B show different example antenna structures and patterns according to some other implementations. The IGU 202 shown and described with reference to FIG. 7A is similar to the IGU 202 shown and described with reference to FIG. 6A except for at least the difference that the first and the second dipole-connected antenna structures 230 and 232 each include multiple dipole-connected antenna structures driven by the same signals. In the illustrated implementation, each of the antenna structures has a length equal to a different number of integer quarter wavelengths of a relevant signal. In some similar implementations, one or more antenna structures can be implemented as Yagi or log periodic antennas. The IGU 202 shown and described with reference to FIG. 7B is similar to the IGU 202 shown and described with reference to FIG. 7A except for at least the difference that the first and the second dipole-connected antenna structures 230 and 232 each include an array of dipole-connected antenna structures driven by the same signals.

A Yagi Antenna includes multiple parallel elements distributed along a line. The parallel elements may be attached to a crossbar. At least one pair of these elements is driven as a dipole pair and connected to the antenna circuit (transmitter or receiver) by a transmission line. See FIGS. 7A-7B. Among the parallel elements is at least one parasitic element that is not electrically connected to the transmitter or receiver, and serves as a resonator reradiating the radio waves to modify the radiation pattern. Another of the parallel elements is a reflector located on one side of the driven elements. Typical spacings between elements vary from about ⅒ to ¼ of a wavelength, depending on the specific design. The lengths of the directors are slightly shorter than that of the driven element, while the reflector(s) are slightly longer.

Yagi antennas have the same frequency characteristics as dipole antennas. A Yagi antenna has a single frequency or a narrow band of frequencies when the electrode lengths are the same or substantially the same. In such cases, the wavelength may be about two times the length of the dipole antenna structure lengths. When the antenna structures have different lengths, the antenna structure radiates (or receives) radiation of different frequencies, each associated with a different pole (electrode). The radiation pattern is substantially unidirectional with a main lobe along the axis perpendicular to the elements in the plane of the elements. Applications on windows include those where a strong directional component is required. Note that Yagi antennas transmit and receive radiation polarized in the direction of the plane of the antenna structure. In a case where broadcast radiation is polarized in a horizontal direction, a Yagi antenna disposed on a skylight or other horizontally oriented window may be appropriate.

A Log Periodic Antenna has an antenna structure with multiple dipole driven elements of gradually increasing length. See e.g., FIGS. 7A-7B. Each dipole driven element contains a pair of parallel conductive strips or lines, which may be formed on a window surface. The dipole elements are disposed close together along a line, connected in parallel to a feed line from the transmitter or receiver. The dipole elements are spaced at intervals following the sigma function of frequency. The lengths of the lines in the dipole elements correspond to resonance at different frequencies of the antenna's overall bandwidth. Every line element of the log periodic antenna is active, that is, electrically connected to the feed line. When present, a ground plane may be oriented perpendicular to or parallel to the dipole elements of the log periodic antenna, in a manner similar to the arrangements in monopole antennas.

A log periodic antenna transmits and/or receives a wide band of frequencies determined in part by the lengths of the driven dipole elements. Log periodic antennas are highly directional, often having a narrow beam radiation pattern. The radiation pattern is is nearly constant over the log periodic antenna's frequency range. Applications on window antennas include those appropriate for other dipole antennas such as Yagi antennas.

Example Fractal Antennas

Fractal Antenna has an antenna structure with a fractal shape. One example of a suitable shape is the Sierpinski fractal shape. Other examples include Koch curves and Hilbert-Peano curves. See e.g., FIGS. 8A-8B. Fractal antennas are designed and made various companies including Fractus Corporation of Barcelona, Spain. Often in window implementations, it is provided as a fractal design on a window surface (e.g., as a thin pattern of TCO, copper metal, or silver ink). In some implementations, the second electrode is a ground plane oriented perpendicular to the axis of the line forming the antenna structure as described above for the monopole antenna. In some implementations, the ground plane is oriented parallel to the axis of the fractal antenna structure like the monopole antenna with a parallel ground plane. The window area occupied by a fractal antenna can be relatively small; e.g., on the order of about 4 inches or less on a longest dimension (e.g., about 20 mm by 30 mm).

A fractal antenna may have a single or multiple frequencies depending on the fractal structure. A fractal antenna may be designed to have the characteristics of a monopole antenna or a group of monopole antennas. Because a fractal antenna may be designed to have the characteristics of a monopole antenna or a group of monopole antennas, it may have the directional characteristics of an omnidirectional monopole antenna or monopole antenna with parallel ground plane (both described above) depending on where the ground plane is located. A benefit of fractal antennas is that they can efficiently operate at multiple frequencies while occupying a relatively small space on a window. As illustrated in FIG. 8A, the repeating structure of a Sierpinski fractal provides multiple iterations of monopole antennas each with a different frequency. In some implementations, the different frequencies can provide different applications for a window antenna or they can provide different operational bands for a single application.

FIG. 8B illustrates a monopole window antenna having a Sierpinski fractal antenna structure 801 oriented perpendicular to a ground plane 802. In certain implementations, the Sierpinski fractal antenna structure 801 is fabricated on a lite surface and the ground plane 802 is implemented on a spacer or window frame element such as a mullion or transom.

Figure 8C:
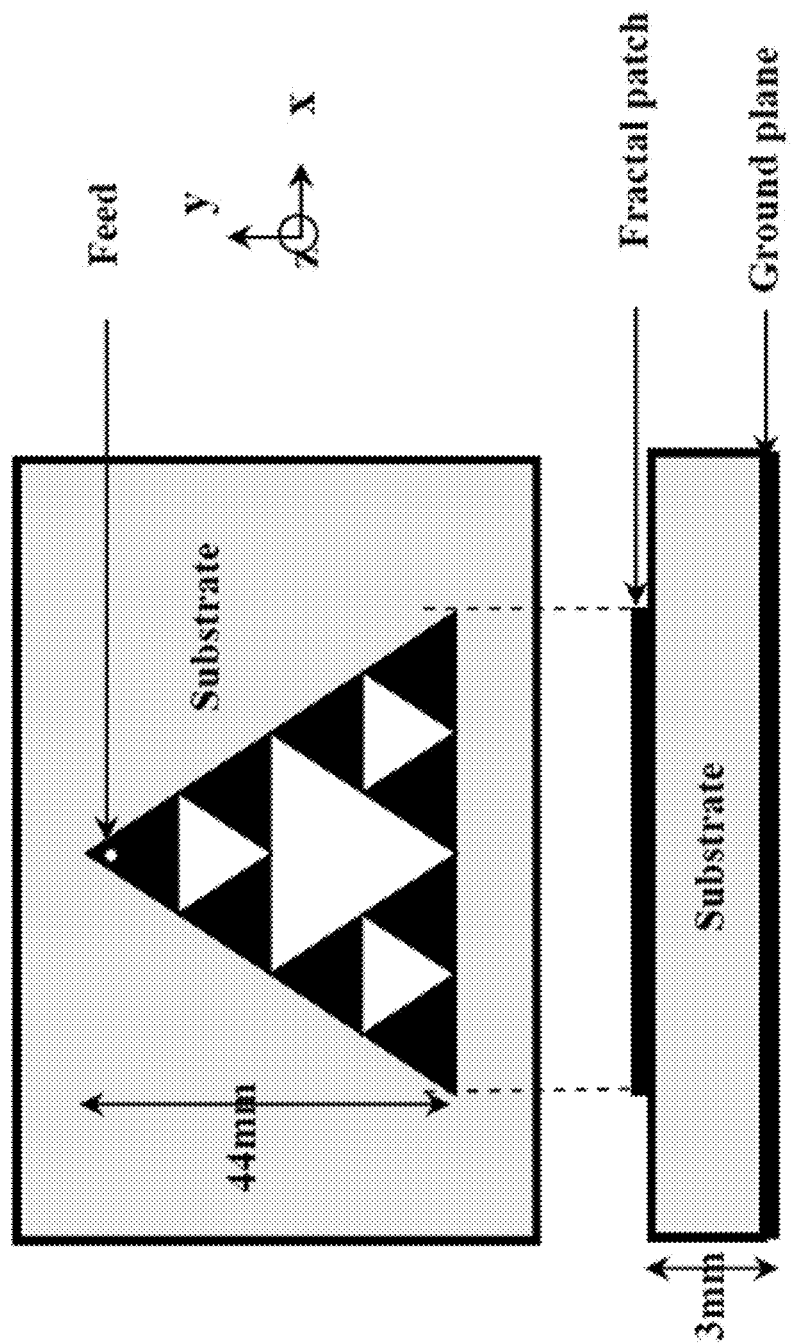

FIG. 8C illustrates a Sierpinski fractal antenna structure implemented as a patch antenna ("Fractal patch" in FIG. 8B) and a parallel ground plane, which together sandwich a substrate such as a lite. Example dimensions are provided in the figure. In general, Sierpinski fractal antennas can be implemented in small dimension patches, e.g., having a base to vertex dimension of about 5 inches or less, or about 2 inches or less.

Figure 8E:
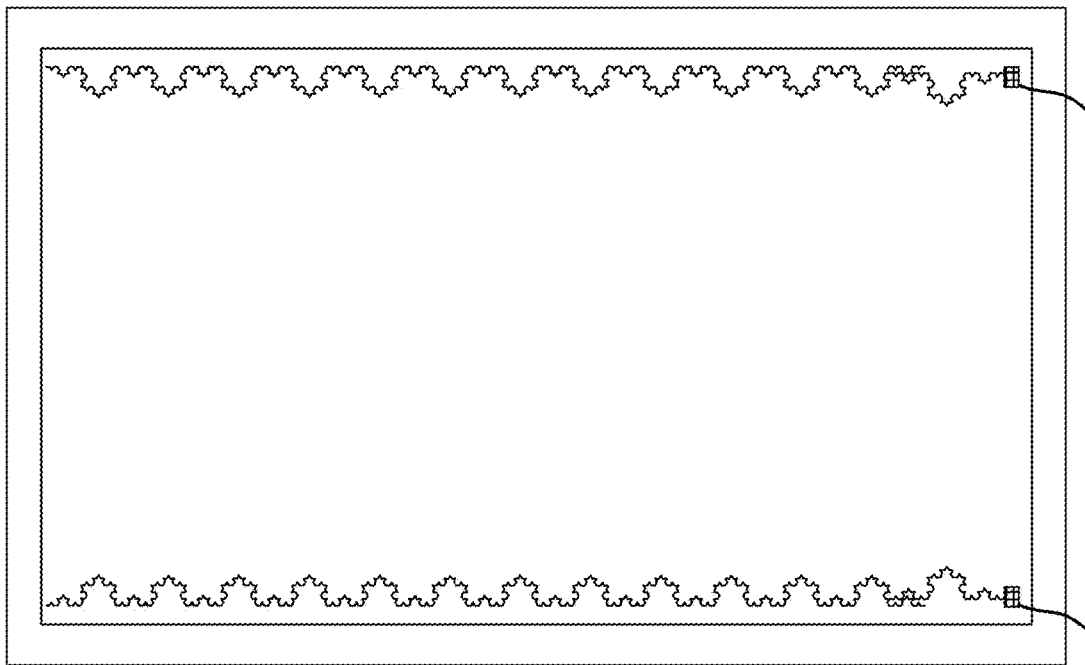
FIGS. 8D and 8E show top views of example electrochromic window structures with integrated fractal-based antennas according to some implementations.
Figure 8D:
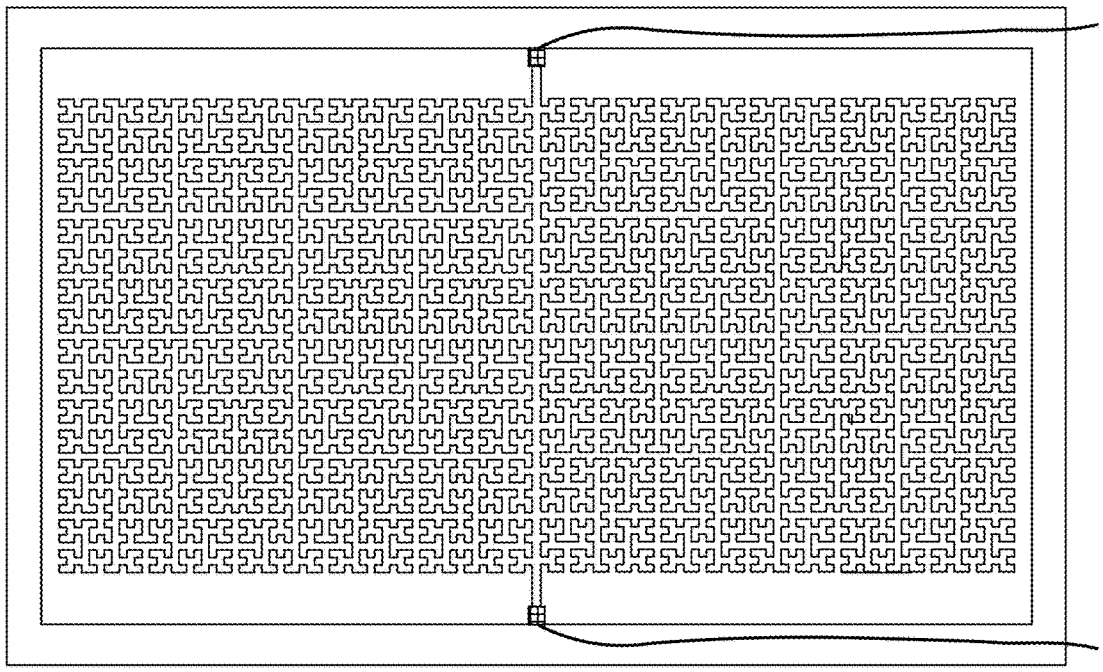

The IGUs 202 shown and described with reference to FIG. 8D and FIG. 8E are similar to the IGU 202 shown and described with reference to FIG. 6A except for at least the difference that the first and the second antenna structures 230 and 232 are patterned or otherwise formed as fractal antennas. More specifically, in the IGU 202 of FIG. 8D, each of the first and the second antenna structures 230 and 232 are patterned as a Koch curve. in the IGU 202 of FIG. 8E, each of the first and the second antenna structures 230 and 232 are patterned as a Hilbert-Peano curve. In some such implementations (and even in the other implementations described above), the antenna structures 230 and 232 can advantageously be patterned using silver or other conductive material nano-printing, rolling mask photolithography or other techniques. In these and the other implementations, it is generally desirable for the antenna structures to be sufficiently narrow or otherwise transparent so as not to be readily or easily viewable by the human eye. In some other implementations, the first and the second antenna structures 230 and 232 can be pattered to form other types of antennas including Greek key antennas.

Multiple Antennas on a Single Window, IGU, or Window and Associated Structure (Such as Frame, Mullion, Transom, Etc.)

In certain embodiments, a window and/or window associated components contain multiple antennas. Given the small size and inobtrusive configuration of many antenna structures, multiple antennas can be provided on a single window (lite) and/or associated window components. Fractal antennas, for example, can be roughly 2 inches per dimension. In addition to the lite or lites of a window assembly, antennas may be disposed on one or more window and/or antenna controllers, IGU spacers, window frames (including mullions and transoms), etc. In some cases, an antenna is provided on a circuit board of the window controller. In some cases, an antenna is provided on an adhesive strip that is used to provide a conductor connecting two or more elements such as an electrochromic window, an antenna structure, a ground plane, and a controller. Examples of such adhesive strips are provided in FIGS. 11D, 11G and 11H. As apparent, certain designs employ two or more antennas, each having its own radiation pattern. In such embodiments, the design may address the possibility of interference and/or null regions.

Figure 9B:
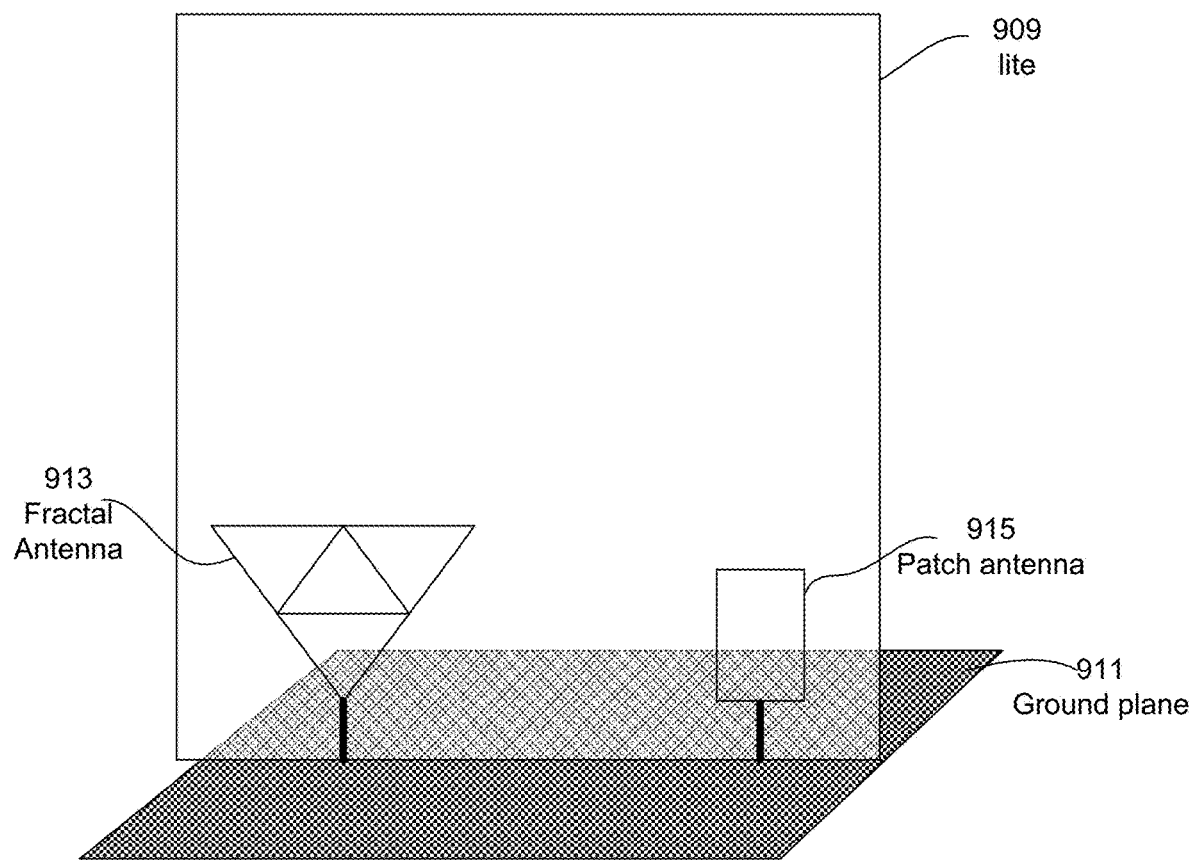
FIGS. 9B-9C show example embodiments where multiple antennas are provided on a lite and/or other window structure.

FIG. 9B presents an example in which a lite 909, which like many of the lites described herein can be an electrochromic lite, contains a fractal antenna 913 and a generic patch antenna 915, each separately controlled, but sharing a single ground plane 911. In certain embodiments, the two antennas employ different ground planes. In some implementations, the two antennas are driven in a complementary fashion to serve as a dipole antenna. In other implementations, the antennas do not work together, but provide separate applications such as providing a bluetooth beacon and providing Wi-Fi services. In the depicted configuration, ground plane 911 is substantially perpendicular to lite 909 and the associated antennas 913 and 915.

Figure 9C:
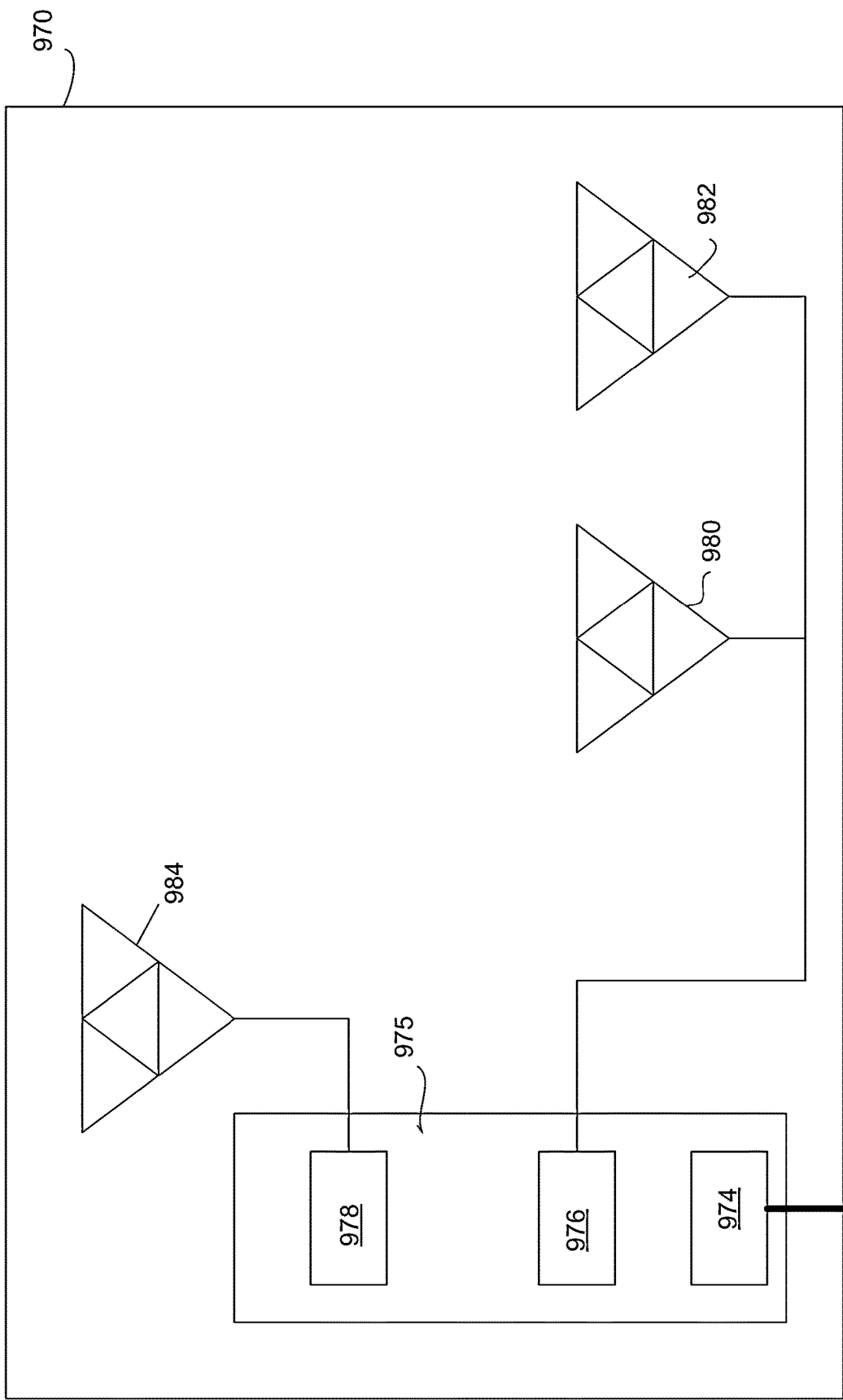

FIG. 9C presents an example in which a lite 970 has three Sierpinski fractal antennas 980, 982, and 984 disposed on the lite's surface. While not shown, one or more associated ground planes may be provided on a parallel surface of lite 970 or a parallel lite which may part of an IGU with lite 970. A controller 975 may be disposed on or proximate lite 970. In one example, controller 975 is implemented using a window-attached carrier as discussed in connections with FIGS. 11A-11F. In the depicted example, a communications interface 974 is provided within controller 975. Interface 974 may provide communications between the antennas of lite 970 and a master controller or other source of instructions for operating the antennas. In some implementations, interface 974 is configured to interface with a CAN bus. Of course, other communications protocols may be used. Controller 975 also includes logic for controlling the antennas. Such logic may serve a reception/transmission logic for the individual antennas. As shown, a logic block 978 controls antenna 984 and a logic block 976 controls antennas 980 and 982. In some implementations, antennas 980 and 982 operate together as a dipole antenna.

Interconnects for Connecting Antenna Components to Transmitter/Receiver Logic

As explained, the antenna structure may be implemented as, e.g., a line of conductive material such as a line of a transparent conductive oxide on the plane of a window surface, but separated from the ground plane by a dielectric. As described, at least the antenna structure must each be electrically coupled to transmitter and/or receiver logic, which may be implemented in an antenna controller. Additionally, the ground plane, if present, must be connected to ground. Various types of electrical connection (or "interconnect") may be used for these purposes, with the types varying depending on the portion of a window where the antenna components and the controller reside.

Interconnect Around the Edge of One or More Lites

In antenna designs where the antenna electrodes are located on different surfaces (e.g., they are not both located on the same surface of the lite), an electrical connection may be required that passes between or around portions of a window or IGU. For example, an electrical connection may be required between IGU surfaces S4 and S3, between surfaces S4 and S2, between surfaces S4 and S1, between surfaces S3 and S2, between surfaces S3 and S1, between surfaces S2 and S1, between a spacer surface and any the IGU lite surfaces, or between a window frame element (including a mullion or transom) and any of the lite surfaces. The electrical connection may take the form of a wire, cable, tape, conductive block, etc. routed as appropriate to make the necessary connection(s). In some cases, the interconnect passes through the interior or under an IGU spacer. In some cases, the interconnect conforms to the shape/surface of the edge of a lite, spacer, or other surface between the antenna electrodes requiring a connection. A few examples are presented below. Any of these examples can be extended to employ other types of interconnects described herein.

In various embodiments, two interconnects emanate from a connector on an IGU or other associated window structure. The connector connects to an antenna controller (receiver and/or transmitter logic) located elsewhere on the IGU or at a remote location. FIGS. 10A-10F present examples of a connector located on or near a window or IGU and separate electrical connections running to a ground plane and an antenna structure.

FIG. 10A shows a cross-section of a lite 1001, in which a cable 1003, such as a shielded coaxial cable, attaches to an edge of the lite. Cable 1003 is in electrical communication with an antenna receiver and/or transmitter (not shown). Grounded shielding 1005 of cable 1003 connects a ground plane 1007 on lite 1001, and a center conductor 1009 of cable 1003 connects to a strip line or patch antenna 1011 on lite 1001. Ground plane 1007 and antenna structure 1011 are on opposite faces of lite 1001. In this embodiment, cable 1003 retains its integrity (the grounded shielding 1005 surrounds central conductor 1009) from the antenna transmitter/receiver until it reaches the lite 1001, where the shielding 1005 is separated from the conductor 1009 to reach the separate locations of the ground plane 1007 and the antenna structure 1011. In the depicted embodiment, cable 1003 attaches to an edge of lite 1001, and, from there, splits into the ground and signal/power connectors. In alternative embodiments, the cable 1003 attaches to a face of lite 1001 or other location proximate the ground plane and antenna structure.

FIG. 10B shows a related embodiment, in which cable 1003 attaches to a face of lite 1001, rather than an edge. In this example, lite 1001 forms part of an insulated glass unit that includes a parallel lite 1013 and a spacer 1015. The antenna structure 1011 is located just outside an outer edge of spacer 1015. If spacer 1015 is not conductive or e.g. coated with a non-conductive material, antenna structure 1011 can be provided fully or partially under the spacer.

Figure 10E:
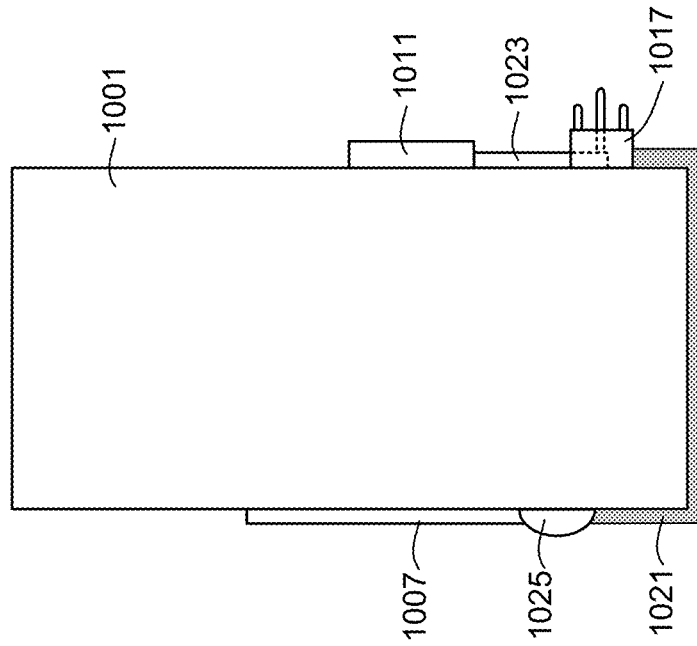
Figure 10D:
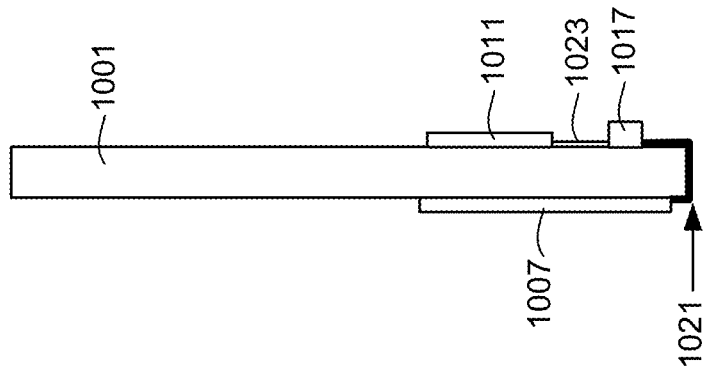

FIG. 10C presents a similar example, but relies on a small connector 1017 such as a standard MCX connector to connect a line 1019 from the antenna receiver/transmitter to the antenna structure 1011 and ground plane 1007. Many types of small (e.g., no dimension greater than about an inch) connectors are available for making connections the necessary connection. As connector 1017 does not include grounded shielding of cable 1003, a separate conductive line 1021 is used to route the ground plane 1007 to a ground terminal of connector 1017. Various options are available for implementing conductive line 1021. One of these is shown in FIGS. 10D and 10E. As shown there, conductive line 1021 is strip that conforms to the edge of lite 1001 as it extends from connector 1017 to ground plane 1007. Conductive line 1021 may be a strip of malleable material such as metal foil, e.g., copper foil. Alternatively, the conductive line 1021 may be a flexible tape containing a conductor, similar to those depicted in FIGS. 11D and 11G, but not necessarily requiring more than a single conductor line. In the detail shown in FIG. 10E, line 1021 connects to ground plane 1007 via solder 1025. Of course, friction fittings, conductive ink, etc. may be used in lieu of solder. As shown in FIGS. 10D and 10E, a conductive line 1023 spans the distance from connector 1017 to antenna element 1011. In certain embodiments, line 1023 is a strip of transparent conducting material or conductive ink. Current carrying conductive lines on lite surfaces will be described below.

Figure 10F:
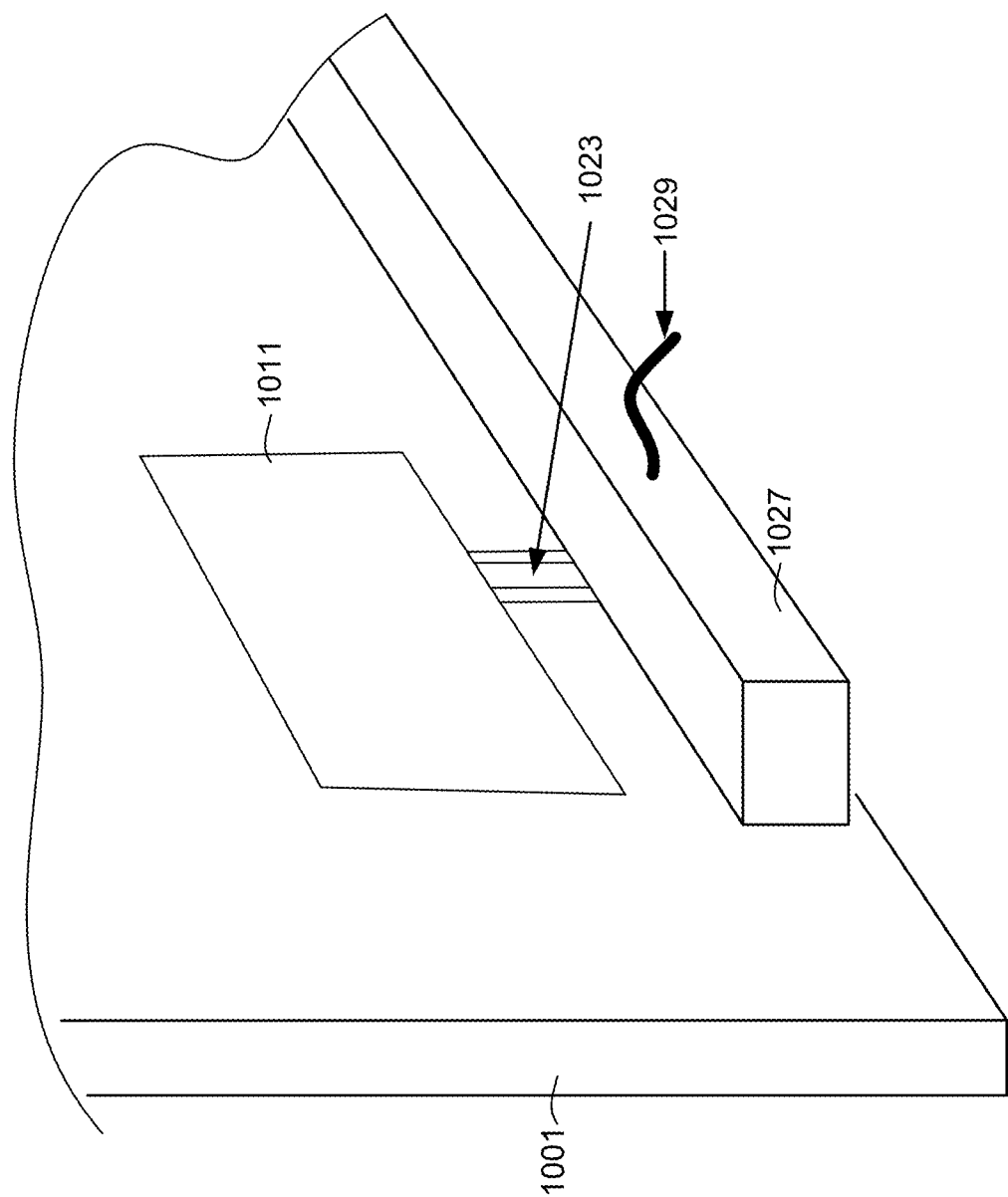

FIG. 10F illustrates an embodiment for providing an electrical connection to a patch antenna 1011 via a conductive line 1023. In this embodiment, a wire 1029 or other free standing conductive line passes through a spacer 1027 of an IGU including lite 1001. Wire 1029 may attach to the conductive line 1023 via solder or other connection.

Interconnect on a Lite Surface

In the case of a ground plane and antenna structure located on the same plane, one example of a suitable interconnection design is provided in FIG. 9D. As shown there, a fractal patch antenna 995 and ground plane strips 993 are disposed on a single surface (e.g., S2) of a lite 991. A transceiver connects to the ground plane and patch antenna structure via a cable 997 having a central conductor 998 and a grounded sheath surrounding the central conductor. The ground plane strips 993 are electrically connected to the cable sheath via short connectors 999, which may be, for example, soldered to strips 993. The antenna structure 995 is electrically connected to central conductor 998 via solder or other appropriate connection.

When a transmission line is provided on a window surface between an antenna structure and another element such as a ground plane or transmitter, the transmission line should be designed so that it does not radiate. To this end, the transmission line may be implemented as three parallel lines, the central one being a signal carrying line and the surrounding ones being ground lines.

Such design may be needed when the antenna structure is located on a region of a window relatively far from the lite's edge where the ground plane, transmitter, or receiver is connected. For example, the antenna structure may need to be some distance from a conductive framing structure such as a mullion or transom.

In conventional cabling, such as coaxial cabling, shielding is accomplished with a grounded shield around the conductors in the interior of the cable. In a window implementation described here, where the transmission line spans some distance on the lite's surface, a similar shielding structure can be provided by placing grounded conductive strips on either side of a central signal conducting line. A similar three conductor structure may be employed when flexible tape is employed to provide the electrical connection such as the tape shown in FIG. 11G, but on a flat surface.

Interconnect Between a Controller and Antenna Components

Figure 11A:
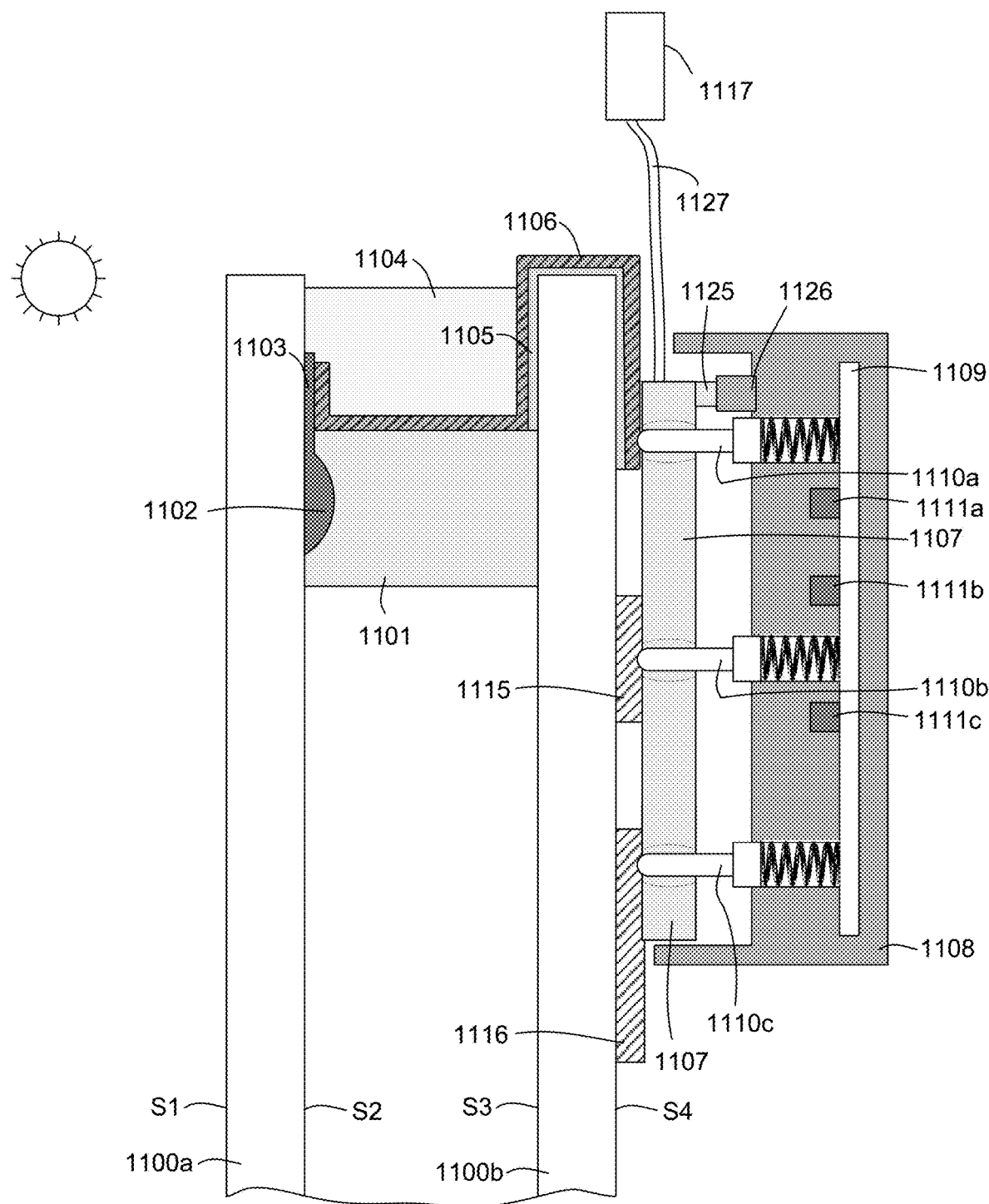
Figure 11B:
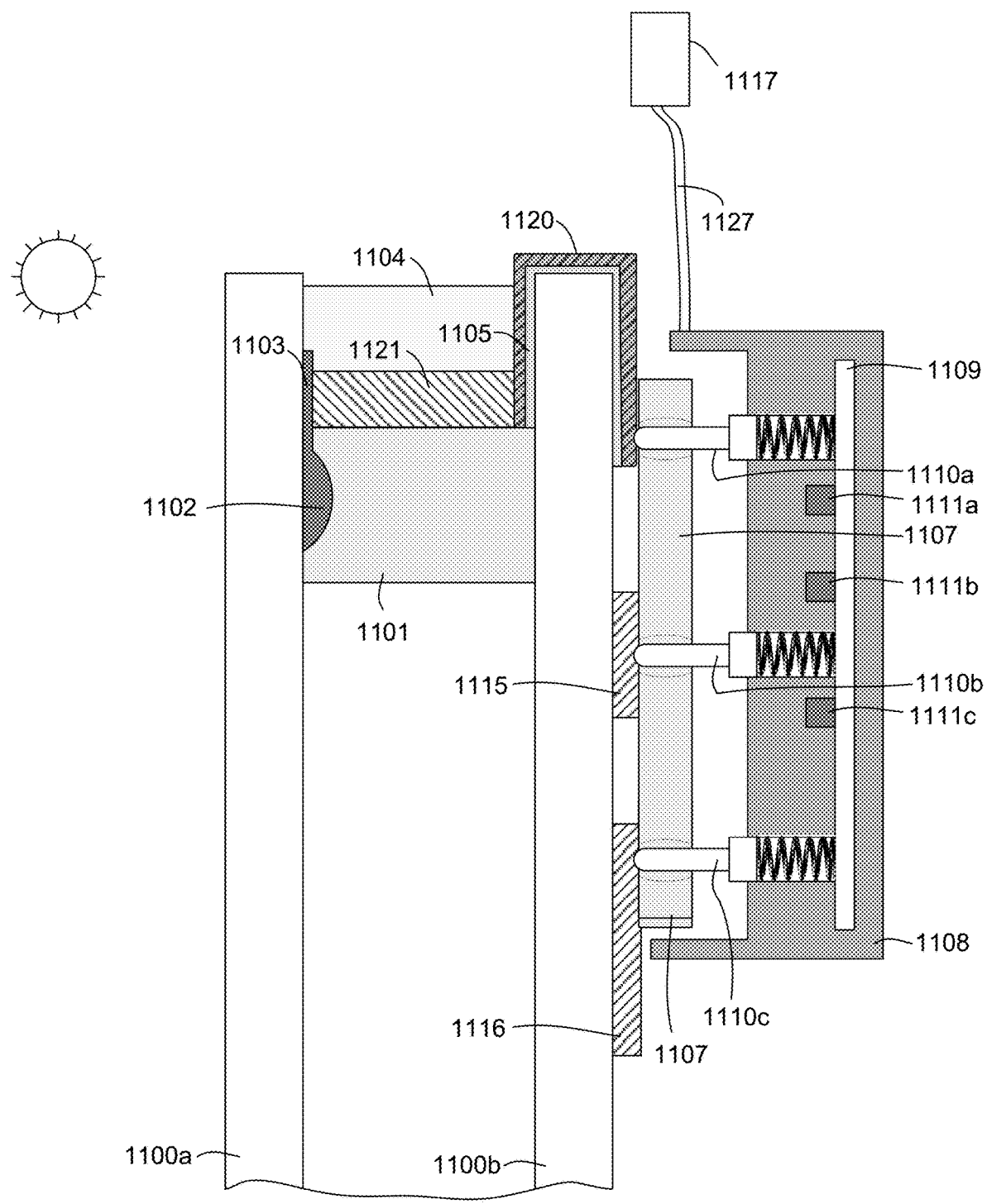
Figure 11C:
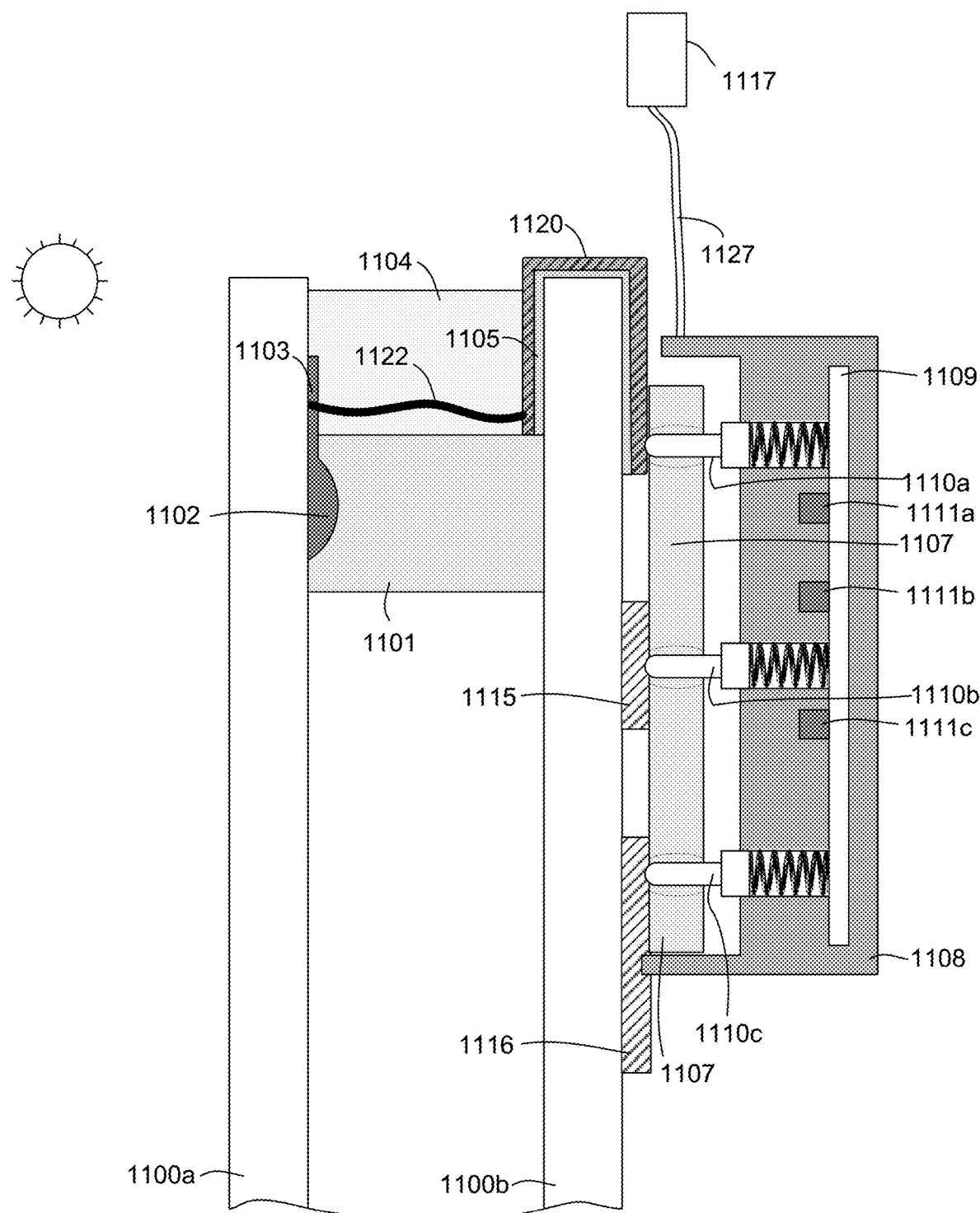

In some implementations, an antenna controller (e.g., receiver and/or transmitter control logic), which may be implemented with an electrochromic window controller or other logic, may be positioned on a pane of an IGU, for example on a surface that can be accessed from the interior of the building. In the case of an IGU having two panes, for example, the controller may be provided on surface S4. FIGS. 11A-11C depict embodiments where various controller components are provided in a carrier 1108 that may be mounted on a base 1107, which may be attached to surface S4 of an inboard lite 1100*b* via pressure sensitive adhesive (e.g., double-sided tape and the like, not shown) or a different adhesive (e.g. an epoxy or other adhesive). In various cases, the carrier 1108 may house all the components typically found in an antenna and optionally a window controller.

In FIG. 11A, an IGU includes an outboard lite 1100*a* and an inboard lite 1100*b*, having surfaces S1-S4 as shown. Lites 1100*a* and 1100*b* are separated by a spacer 1101, which is hermetically sealed to the lites 1100*a* and 1100*b* through a primary seal material (not shown). A bus bar 1102 runs under the spacer 1101, e.g. along its length (into and out of the plane of the page), with a bus bar lead 1103 that extends peripherally outward past the edge of spacer 1101. Carrier 1108 registers with and fits onto base 1107. In this example, base 1107 is connected to a connector 1117 via a cable 1127. The connector 1117 may be an M8 connector in some cases. Cable 1127 may deliver power and/or communication information to the IGU. The power and/or communication information may be transferred from base 1107 to carrier 1108 through any available connections. In FIG. 11A, power and/or communication information may be transferred from the base 1107 to the carrier 1108 through one or more connections 1125 and 1126 on the base 1107 and carrier 1108, respectively.

The carrier 1108 includes a printed circuit board (PCB) 1109, with a variety of components 1111*a*, 1111*b*, and 1111*c* installed thereon. The components 1111*a-c* may be a number of different components typically used by those of ordinary skill in the art and, e.g. described in relation to FIG. 2E. The various components on the circuit board may all be provided on a single side of the circuit board in some cases, while in other cases components may be provided on both side of the circuit board. The controller may have more than one circuit board, e.g. in a stacked format or side to side in the same plane.

A series of electrical connection structures such as spring-loaded pogo pins 1110*a*, 1110*b*, and 1110*c* may provide power from the carrier 1108 through the base 1107, to components located below the base 1107. The electrical connection structures may provide permanent or temporary electrical connections. The electrical connection structures may provide a secure attachment by adhesion, metallurgical bonding, friction, etc. In some cases, friction may be provided by spring loading (e.g., in the case of pogo pins), pressure from the overall connections between the carrier 1108/base 1107/lite 1100*b*, etc. While the following examples present pogo pins, this is merely an example. The connections may be gold plated, e.g. to increase reliability and prevent corrosion.

For example, pogo pin 1110*a* provides power to an electrical connection 1106, which routes power from S4 to S2, where the EC film (not shown) and bus bar 1102 are provided. The electrical connection 1106 may provide power to the bus bar lead 1103. Electrical connection 1106 may be a thin tape patterned with conductive lines (e.g., copper ink, silver ink, etc.), a ribbon cable, another type of cable, a clip patterned with conductive lines thereon or therein, or a different type of electrical connection. Similar connections can be provided to antenna components.

A seal material 1105 may be provided in some cases between the inboard lite 1100*b* and the electrical connection 1106, which may help ensure that the interior of the IGU remains hermetically sealed. In some such cases (not shown), this seal material 1105 (or anther seal material) may extend to reach along the outer perimeter of the spacer 1101 to help keep the electrical connection 1106 in place next to the spacer 1101. The seal material 1105 may be a pressure sensitive seal material or another kind of seal material. Located peripherally outside of the spacer 1101 and the electrical connection 1106 is a secondary seal material 1104. Alternatively, connector 1106, rather than passing around the edge of the inner pane, may pass through an aperture through the inner pane, e.g. where 1106 emanates at the base and thus is not seen by the end user. In this case a sealing material like 1105 may be used to seal around 1106 (e.g. a wire) to seal between 1106 and the aperture in the inner lite through which 1106 passes.

A second pogo pin 1110*b* may provide an electrical connection between the carrier 1108 and component 1115, while a third pogo pin 1110*c* may provide an electrical connection between the carrier 1108 and component 1116. In various embodiments, components 1115 and 1116 may form part of an antenna that is patterned onto surface S4. For instance, component 1115 may provide a ground connection for a ground plane of the antenna, and component 1116 may be a part of the antenna structure (e.g., a strip line, fractal element, log periodic element, etc.). In some embodiments, a ground plane and/or antenna structure may be provided on any one or all of S1-S4, on a spacer of the IGU, on the window/antenna controller itself, on a frame, mullion, or transom, or on another component associated with the IGU or window. Electrical connections to the antenna are configured appropriately depending upon the location of components on glass surfaces or in between the panes, e.g. in, or on the spacer surfaces.

Although only three pogo pins are shown in FIGS. 11A-11C, any number of pogo pins may be provided, as needed to power different components or receive input from antennas and the like. In one example, an additional pogo pin (not shown) is provided, which provides power to a PV connector similar to the electrical connector 1106. The PV connector may have the same shape/properties as electrical connector 1106, but instead of delivering power to the bus bars, the PV connector delivers power from a PV film positioned on surface S2 to the carrier 1108. In cases where the PV film is positioned on surface S3, the PV connector may simply deliver power from the PV film on surface S3 to the base and/or carrier on surface S4, similar to the electrical connector 1120 shown in FIG. 11B. The PV connector may supply power from the PV cell to an onboard battery or supercapacitor as described. Any of the mechanisms and hardware described herein for routing power between (a) a carrier and/or base and (b) bus bars (or conductors electrically connected with the bus bars) may also be used for establishing an electrical connection between (a) a carrier and/or base and (b) a PV film positioned on one of the lites of the IGU.

The carrier 1108 may fit securely over the base 1107, and in some cases may lock into place (e.g., to prevent theft and minimize any possible damage). A mouse hole, thin slit, or other opening may be provided in the carrier 1108, through which cable 1127 may run. Cable 1127 may be hidden from sight by virtue of the carrier being positioned sufficiently close to the frame of the window so as to obscure cable 1127 (which passes into the frame, e.g. connector 1117 is within the frame and makes electrical connection there).

FIG. 11B presents an embodiment similar to the one shown in FIG. 11A, and only the two primary differences will be described. In FIG. 11B, cable 1127 connects directly to the carrier 1108 rather than to the base 1107 (though in an alternative embodiment, it may be configured as in FIG. 11A). Thus, there is no need for any connections (such as 1125 and 1126 of FIG. 11A) for bringing power and/or communication information from the base 1107 to the carrier 1108. In this example, the base 1107 may be unpowered, with power being transferred directly from the carrier 1108 to the electrical connection 1120 (and to components 1115 and 1116) through the pogo pins 1110*a-c*. In another embodiment, one or more of the pogo pins 1110*a-c* may terminate on top of the base 1107 instead of going through the base 1107. The base 1107 may then transfer power, via any available electrical connections, to the components below the base 1107. In one example, the base 1107 includes conductive traces, each trace electrically connecting (a) the point at which a pogo pin 1110*a-c* touches the base 1107 and (b) the component below the base 1107 that is powered by the associated pogo pin (e.g., components 1115 and 1116, and electrical connections 1106 or 1120). Alternatively or in addition, the base may include electrical connections that pass through the base, rather than being provided only on a surface of the base.

Another difference in FIG. 11B compared to FIG. 11A is that the electrical connection 1106 is replaced by a different electrical connection 1120 and a block 1121. The electrical connection 1120 brings power from S4 to S3, around the edge of the inboard lite 1100*b*. The block 1121 brings power from S3 to S2, where it can deliver power to the bus bar lead 1103 and/or antenna components. The block 1121 may be conductive or have conductors thereon or therein to accomplish this purpose. In one example, the block 1121 is made of a material that is easy to securely insert between the lites 1100*a* and 1100*b*. Example materials include foam, rubber, silicone, etc. In some cases, conductive lines may be printed on the block to electrically connect S2 and S3, in some embodiments the block is mated with an adhesive backed ribbon cable or flexible printed circuit to make the connections between S2 and S3.

The electrical connection 1120 may be any of the types of connections described with respect to electrical connection 1106. Seal material (not shown) may be provided between the spacer 1101 and the block 1121 to ensure a hermetic seal.

FIG. 11C presents an embodiment similar to the one shown in FIG. 11B, and only the primary difference will be described. In FIG. 11C, the block 1121 is replaced by a wire 1122 (or series of wires), which brings power from S3 to S2. In a similar embodiment, a block or sheet (not shown) may be provided to secure the wire 1122 (or other electrical connection) against the spacer 1101. This technique may ensure that the wire 1122 or other electrical connection is out of the way when the secondary seal 1104 is formed. In an alternative configuration, wire or wires 1122 may pass through pane 1100*b* via an aperture or apertures and optionally a sealant material may be used to form a hermetic seal so that moisture cannot also pass through the aperture(s).

In each of FIGS. 11A-11C, one set of electrical connections is shown providing power from S4 to S2. However, it should be understood that each electrochromic window has two (or more) bus bars, and the electrical connections should be configured to bring appropriate power connections to each bus bar. Further, any of the electrical connection designs may be used to bring power and/or data to and/or from antenna elements.

Although not explicitly shown in FIGS. 11A-11C, either or both of the base 1107 and the carrier 1108 may include a programmable chip that includes information relevant to the associated IGU such as information about an antenna and/or an electrochromic lite in the IGU. Such information may relate to any one or more of the following: the antenna configuration (e.g., monopole, dipole, strip line, fractal, etc.), the frequency characteristics of the antenna, the radiation intensity distribution (e.g., omnidirectional), the polarization state of the transmitted or received radiation, the drive parameters of the antenna, size of the window, materials of the window and associated electrochromic device, current and voltage limitations particular to the electrochromic device, control algorithms or other control parameters particular to the electrochromic device (e.g., required drive and hold voltages and ramps), cycling and other lifetime information, etc. It may be particularly beneficial to include the chip in the base 1107 to eliminate the risk that the chip gets mis-matched through a mistaken installation on a different window. In this way, the carrier 1108 may be essentially generic/swappable, such that it would make no difference which carrier gets paired with which IGU. This feature may significantly decrease installation complications and errors. Similarly, some of the other components typically found in a controller may be provided in a base or other dock, as desired (e.g., as opposed to being provided in the carrier). As mentioned elsewhere, in cases where the dock itself includes components typically found in the controller, the term "the controller" may refer to the dock, the carrier, or both. Also not shown in FIGS. 11A-11C, either or both of the base 1107 or carrier 1108 may include a port (e.g., a USB port, mini USB port, micro USB port, etc.). In various embodiments, the port may be oriented such that the device that interfaces with the port (e.g., a USB drive) inserts in a direction that is parallel with the lites of the IGU. In some other embodiments, the port may be oriented such that the device that interfaces with the port inserts in a direction that is normal to the lites of the IGU. Other options are possible, for example where the dock and/or carrier is not rectangularly shaped.

FIG. 11D presents an example of a piece of flexible tape that has conductive lines; it may in a sense be viewed as a flexible printed circuit. The conductive tape is shown in the shape it would have if used for the electrical connection 1106 shown in FIG. 11A. The tape wraps around the inboard lite 1100*b*, extends over the outer perimeter of the spacer 1101, and rests on S2 of the outboard lite 1100*a*, where it can provide a powered connection to the bus bars/bus bar leads (not shown), with one lead for each bus bar. Similarly, the flexible tape can be used to provide electrical connections to antenna components such as a ground plane and one or more antenna structures. In some embodiments when used for connection with an antenna structure, the tape may include three conductors, rather than the two shown in FIG. 11D. For example, as depicted in FIG. 11G, a central conductor 1191 is used for signal communication, and the outer conductors 1193 are grounded to prevent the central conductor from radiating. In general, the tape can be deliver power and/or communications between any surfaces of an IGU (e.g., S4-S3, S4-S2, S4-S1, S3-S1, S2-S1, and S3-S2). The individual antenna elements are connected to an antenna controller (receiver and/or transmitter) through the connections.

In certain embodiments, the flexible tape includes an adhesive surface allowing it adhere to the IGU structures it traverses.

FIG. 11E presents a view of a portion of an IGU as described in relation to FIG. 11A. The base 1107 is shown mounted on the inboard lite 1100b. The electrical connection 1106 delivers power from S4 to S2, thereby bringing power to a first bus bar lead 1125a and to a second bus bar lead 1125b. The first bus bar lead 1125a may deliver power to a first bus bar, while the second bus bar lead 1125b may deliver power to a second bus bar. In embodiments where additional bus bars are provided (e.g., to define different zones within a single EC lite), additional lines on the conductive tape, and additional bus bar leads connecting to such tape, may be provided. Likewise, if other electrical components of the window assembly reside on S1, S2, S3 and/or S4, such as antenna components, the flexible tape circuit can be configured to make electrical connection to these additional components. Base 1107 is shown in FIG. 11E to include a number of features 1119. These features may be a variety of different components including, but not limited to, holes provided to accommodate sensors (e.g., light sensors), holes to accommodate connections (e.g., pogo pins) to window elements, connections for transferring power and/or communication information between the base and the carrier, locking mechanisms for ensuring that the carrier doesn't come off the base unless appropriate, etc. Although the base is depicted with a single flexible circuit tape type connector e.g. running to one side of the base, there may be other flexible tape circuits running to the base. For example, one tape may run as depicted and another run to another side of the base. This embodiment may facilitate having contacts on e.g. S2, S3 for coatings, antenna components, etc. thereon and not having to make a single circuit tape make all the connections. Though in certain embodiments a single circuit tape is desirable for simplicity of fabrication, e.g. a convergent fabrication where all the electrical connections between the lites are made using a single location (flexible circuit). In some embodiments, a tape connector may include more than two conductive lines. It may also include one or branches for directing some conductive lines to one location and one or more other conductive lines to one or more other locations.

Figure 11F:
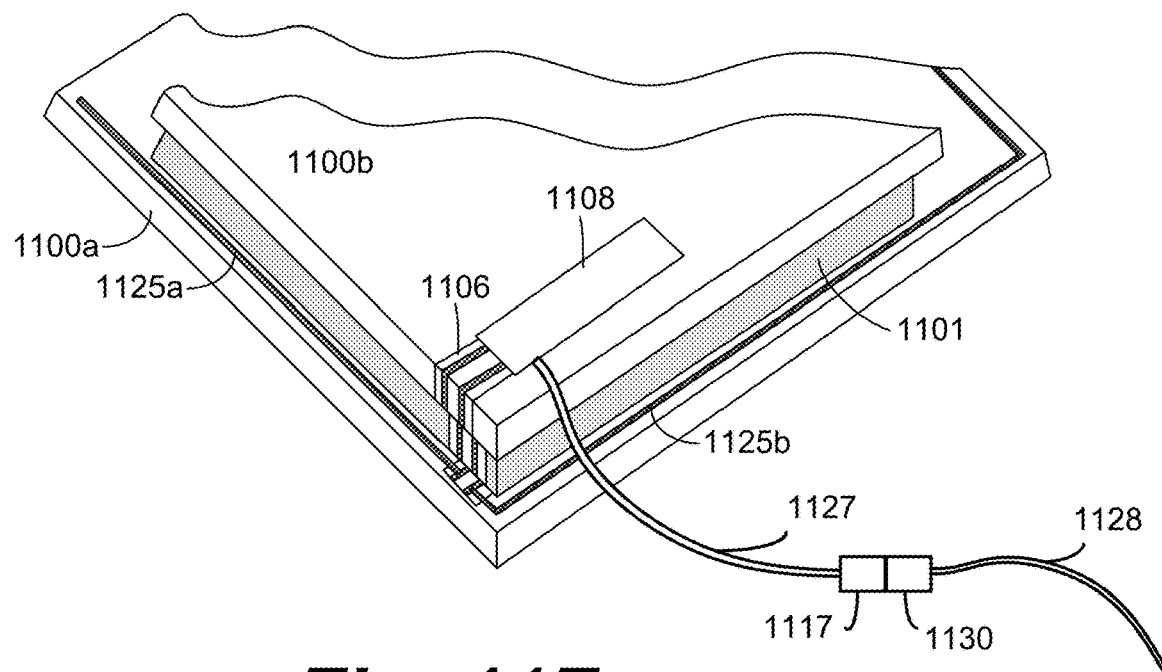
Figure 11G:
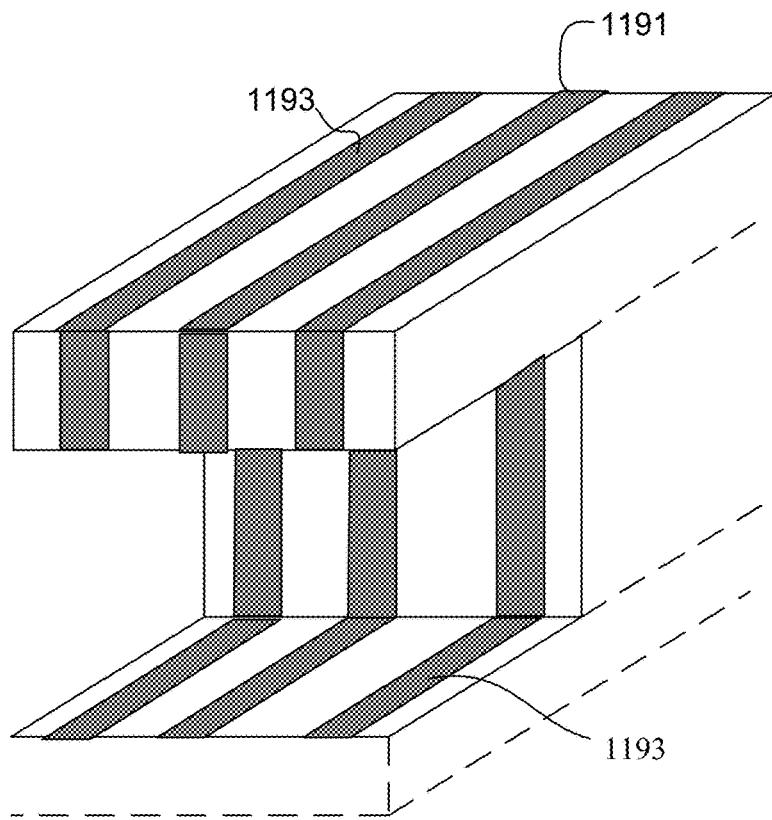

FIG. 11F illustrates the embodiment of FIG. 11E with the carrier 1108 installed on the base (not shown). Cable 1127 provides power and/or communication information to the IGU, and may connect to the base 1107 (as shown in FIG. 11A) or to the carrier 1108 (as shown in FIGS. 11B and 11C). The connector 1117 may mate with another connector 1130, which may provide power and/or communication via cable 1128. The connectors 1117 and 1130 may be M8 connectors, and cable 1128 may be a drop line, which may connect directly to a trunk line as described herein. Cable 1127 may be a window cable, also referred to as an IGU cable. FIG. 11F shows the cable 1127 and the electrical connection 1106 emanating from different sides of the carrier 1108 (and/or base 1107), though in other embodiments these two connections may emanate from the same side of the carrier 1108 (and/or base 1107). Even though having a hard wired connection to power is present in this embodiment, it still has the advantage that the controller is readily accessible on e.g. S4 of the IGU and the controller can be removable, e.g. in a modular, cartridge-type format.

One embodiment is an electrochromic window having an antenna controller mounted on a pane of the window, where the antenna controller has a base and a carrier. In one embodiment the antenna controller has a cartridge format, where the base and the carrier dock with each other in a reversible interlocking fashion. In one embodiment, the controller includes a battery. In one embodiment the battery is removable from the controller. In one embodiment the battery is part of the base. In another embodiment, the battery is part of the carrier. In one embodiment the battery is a flat battery. In one embodiment the battery is rechargeable. In one embodiment, the battery is a lithium ion based battery. In one embodiment the carrier and base have a tamper proof mechanism to detach the carrier from the base. In one embodiment, the base is adhesively attached to the pane. In one embodiment the base is in electrical communication with an electrochromic device of the electrochromic window via a circuit tape or a ribbon cable. In one embodiment the base is in electrical communication with an antennae of the electrochromic window via a circuit tape or a ribbon cable. In one embodiment the base is in electrical communication with one or more antenna components of the electrochromic window via a circuit tape or a ribbon cable. In one embodiment the base is in electrical communication with bus bars or a sensor of the electrochromic window via a circuit tape or a ribbon cable. In one embodiment the top (outermost facing from the pane) surface of the base is about ½ inch or less from the surface of the pane to which it is attached, for example about ⅜ inch or less from the surface of the pane, for example ⅛ inch or less from the surface of the pane. In one embodiment, the top (outermost facing from the pane) surface of the carrier, when docked with the base, is about 1 inch or less from the surface of the pane to which it is attached, for example about ¾ inch or less from the surface of the pane, for example ½ inch or less from the surface of the pane. In one embodiment the base is rectangular. In one embodiment the base's shape has at least one right angle so that it can fit into a corner of a frame that supports the electrochromic window. In one embodiment, the controller includes at least one display. The display may be e.g. an LCD display, and LED display or the like. The display may indicate the tint level of the electrochromic window or an antenna setting. In one embodiment the controller includes control switches, e.g. buttons and/or a keypad. The control switches may for example, correspond to tint states and/or antenna settings. The controller may include one or more indicator lights, e.g. LED's, to indicate a tint level change, antenna state, wireless communication connectivity, power status and the like; these functions may also be displayed via the aforementioned display with or without separate indicator lights. In one embodiment the controller includes a USB port. In one embodiment the controller includes an optical fiber communication port. In one embodiment the controller includes a coaxial connection port. In one embodiment the controller includes an antennae. In one embodiment the controller has wireless communication, e.g. Bluetooth.

IGUs are typically installed in a frame or framing system for support. Individual IGUs may be installed in individual frames, while larger numbers of IGUs may be installed in a curtain wall or similar structure, with mullions and transoms separating adjacent windows. All of these components may be considered to form the frame of an IGU. In a number of embodiments, a hole, slit, or other perforation may be provided in a frame that surrounds an IGU, and one or more wires/cables may be fed through the perforation. For example, in the context of FIG. 11F, cable 1127 may be routed through such an aperture in a frame surrounding the IGU. In a similar embodiment, both the cable 1127 and the electrical connection 1106 emanate from the same side of the carrier 1108 (or a dock thereunder), and the frame into which the IGU is installed includes a hole proximate where the electrical connection 1106 wraps around the edge of the inboard lite 1100b. This hole may be hidden by the edge of the carrier 1108 (or dock in another embodiment), which may abut against the interior edge of the frame. In some cases, the outer casing of the carrier 1108 may be made of a material that has a certain degree of give (e.g., rubber, pliable plastic, etc.) such that it is easy to abut the carrier against the frame without any space in between. In other embodiments, though the case of the carrier is rigid, a flexible material, such as foam or rubber is applied to one side of the casing and/or the frame around the hole, so that when the carrier is docked with the base, the flexible material obscures connection 1106 and/or cable 1127. Similarly, the portion of the carrier that abuts the edge of the frame may be made of such a material, with the remaining portions of the carrier being made of different materials. Cable 1127 may be routed through the hole in the frame and connected with power and/or communication delivered via cable 1128. In this way the on glass controller has a very clean look, no wiring or electrical connections to the controller can be seen by the end user; and since the controller's footprint is small (e.g. less than 4 in$^2$, less than 3 in$^2$, or less than 2 in$^2$), it takes up very little of the viewable area of the window.

FIG. 11F can also be used to illustrate another embodiment. For example, rather than 1108 being a dock for a carrier (controller), it can be a user interface, e.g. a control pad, e.g. a touch pad, key pad or touch screen display (and thus thin, for example) and the wiring 1106 is used to connect the user interface to a controller in the secondary seal. This is akin to the embodiment where the carrier contains the controller circuitry and a user control interface, but moving the controller circuitry between the glass, e.g. in the secondary seal and keeping the user interface on the glass. Thus wiring 1106 would connect the bus bars, antennas, and other features as described above between the panes, but also the controller circuitry, which is also between the panes in this example, to the control pad. The user interface may be affixed, e.g. with an adhesive, and may be removable/replaceable. The user interface may be very thin, having e.g. only keypad connections to flexible circuit 1106 or the control pad may be a digital display (which can also be thin and e.g. flexible). The control interface may be at least partially transparent. In one embodiment, the user control interface and circuit 1106 are a single component. For example, an adhesive sealant 1105 on the back of 1106 (as described above) may also be on the back of the user control interface with e.g. a protective backing for a "peel and stick" form factor. For example, during fabrication, appropriate electrical contacts to the bus bars, antennae, controller and other components between the panes are made to a local area on S2 and/or S3 as appropriate. When the lites are brought together during IGU formation, the local areas, if one on both S2 and S3 for example, are registered. Then the user interface is peeled and stuck onto the glass, e.g. starting from S3, across the spacer, onto S2, around the edge of pane 1100b and then onto S4. In this way a convergent (and thus efficient) fabrication process is realized.

Figure 11H:
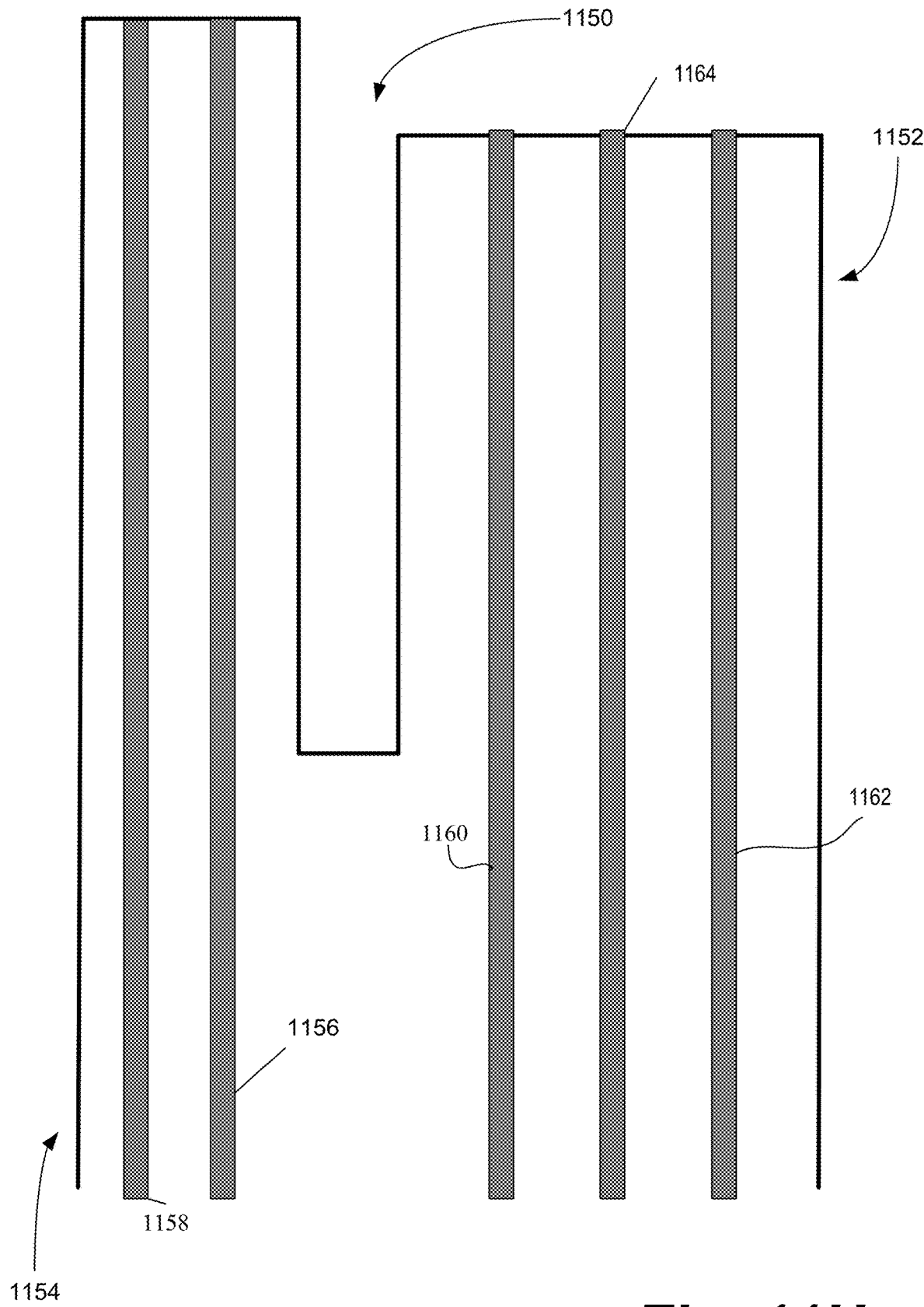

FIG. 11H depicts a flexible tape type interconnect 1150 having a first portion 1152 for providing signal to/from an antenna structure and a second portion 1154 for providing power to bus bars of an electrochromic device. Within first portion 1152, a central conductor 1164 is provided for carrying signal to/from the antenna structure associated with a window, while outer conductors 1160 and 1162 are grounded and block passage of radiation. Within second portion 1154, conductors 1156 and 1158 are provided for powering the opposite polarity electrodes on the electrochromic device. The depicted interconnect includes a branch that allows the first portion and second portion to separate and direct their conductors to different locations, where the bus bars and antenna elements may reside. In certain embodiments, all logic for controlling the electrochromic device and the antenna components is provided at a single location such as a hybrid window/antenna controller as described elsewhere herein. While not depicted in this figure, interconnect 1150 typically extends beyond the top and bottom end points shown here.

Arrays of Window Antennas

Figure 12:
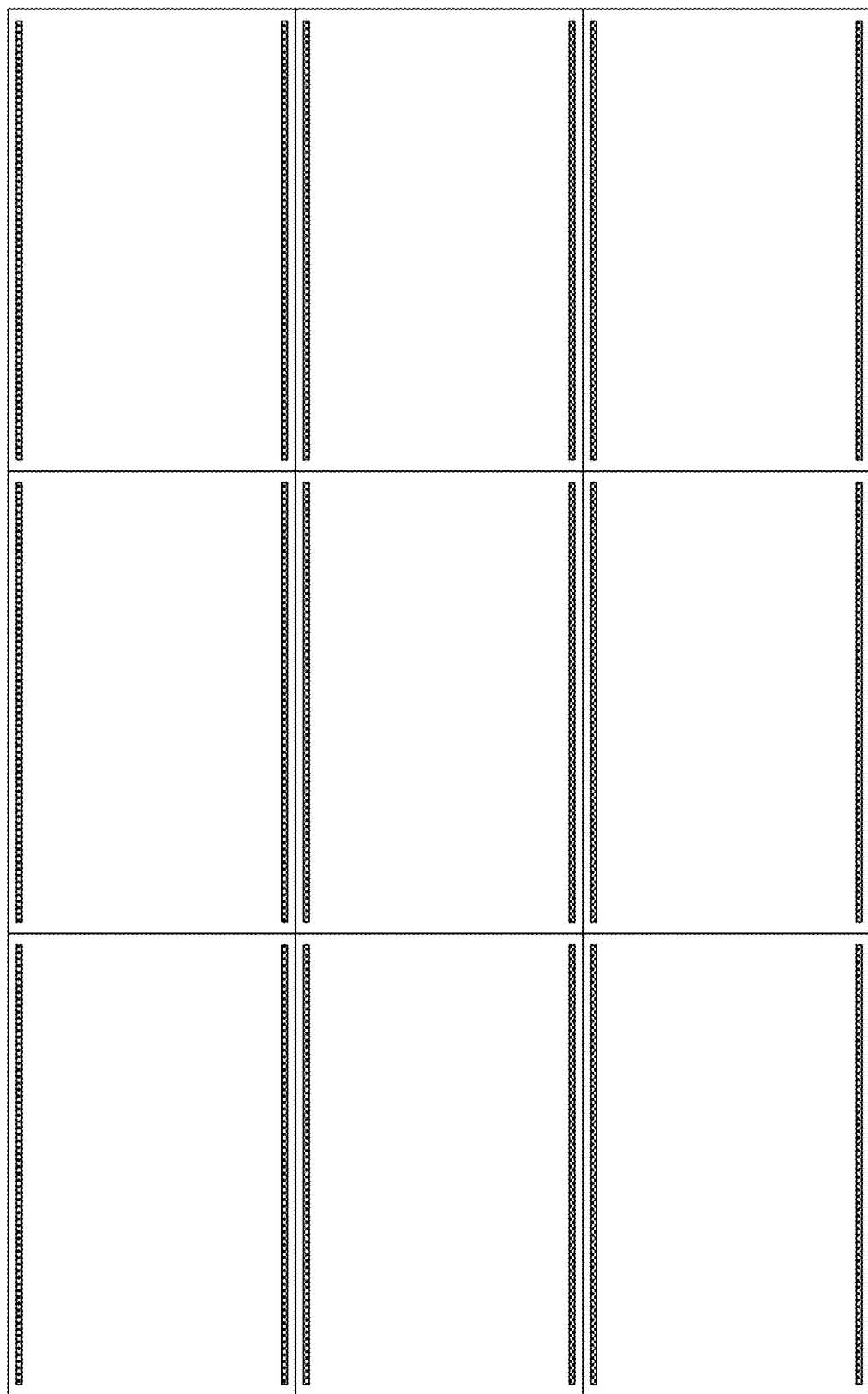
FIG. 12 shows an example array of electrochromic window structures with integrated antennas according to some implementations.

FIG. 12 shows an array of IGUs 202 such as described with reference to any of the implementations illustrated or described above. For example, such an array can be arranged on a side or façade of a building. Each of the antenna structures within each of the respective IGUs can be independently controlled (for example, by a network controller and corresponding window controllers described above) with different signals or different phases to selectively provide constructive and destructive interference and ultimately provide for ore granular directionality of the transmitted signals. Further, such an arrangement can be used to map an exterior environment or an interior environment. Additionally, such as arrangement or array of antennas can provide the gain needed to collectively serve as a broadcast tower or reception tower thereby obviating the need for other broadcast (for example, cellular towers).

Figure 13A:
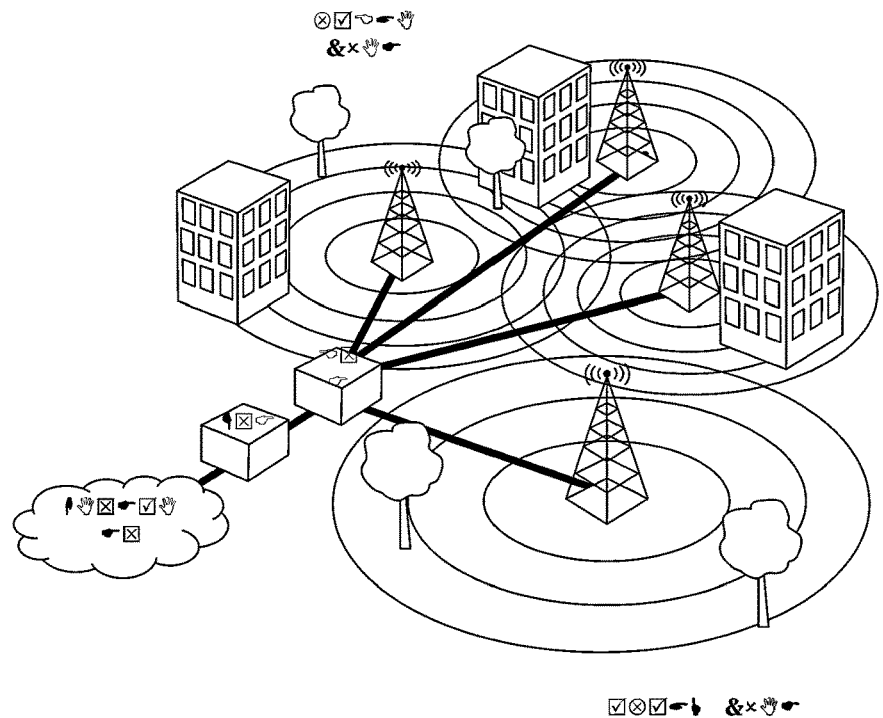
FIGS. 13A and 13B depict conventional cell tower networks and cellular networks where buildings fitted with antennae glass serve as cell towers, respectively.
Figure 13B:
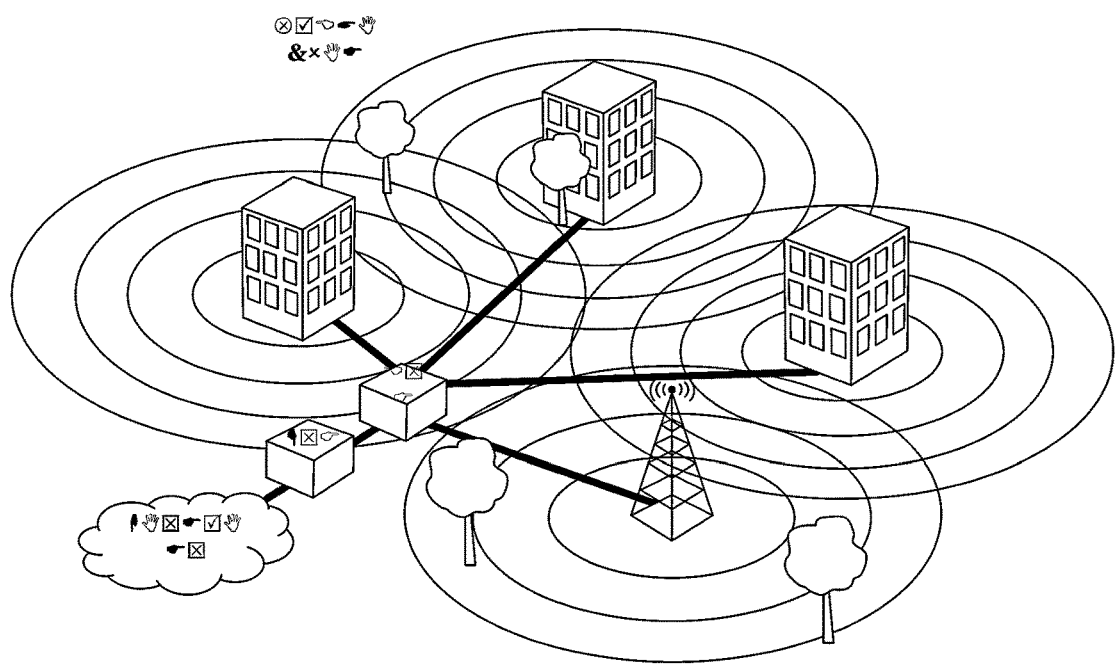

Phased arrays of antennas can be advantageous for directing the transmission of signals along a certain direction to reach a particular region as well as to narrow a region where reception is desired. Such directional transmission or reception also is referred to as beamforming or spatial filtering. Spatial filtering using phased arrays is generally accomplished by combining elements in a phased array such that signals at particular angles experience constructive interference while signals at other angles experience destructive interference. As noted above, beamforming can be used at both the transmitting and receiving ends in order to achieve spatial selectivity. To change the directionality of the array when transmitting, a controller controls the phases and relative amplitudes of the signals provided to each of the transmitting antenna elements to create a pattern of constructive and destructive interference in the wavefront collectively produced by the phased array. Similarly, when receiving, information from different antenna elements is combined and otherwise processed to preferentially observe or otherwise provide information within a particular region of space or along a particular direction. In some implementations, each signal sent to (or received from) each antenna may be amplified by a different "weight." Different weighting patterns (e.g., Dolph-Chebyshev) can be used to achieve the desired sensitivity patterns. For example, a main lobe (the "beam") can be produced having a controlled width together with nulls and sidelobes having controlled positions, directions or widths. FIG. 13A shows a conventional cell tower network, e.g. having four cellular towers positioned as necessary for appropriate overlap so as to maintain substantially complete geographical coverage for a theoretical urban and rural zone. FIG. 13B depicts using three of the buildings as cell tower surrogates by using antennae equipped glass, e.g. electrochromic antennae equipped glass as described herein, in each of the three buildings. In this way, conventional cell towers may be removed and, e.g., broader geographical coverage can be achieved while maintaining complete coverage and clearing the landscape of many unwanted conventional cell towers. Moreover, the EC antennae glass can be used to boost signal internal to each building and/or make cellular traffic uni- or bidirectional, depending upon the need. The antenna windows may obviate some need for cell towers.

Under appropriate control, arrays of IGUs having antennas work in concert. At one instant, some window antennas may be selected for activation and others for quiescence, and the activated antennas have radiation applied at designated powers, frequencies, and/or phases. As an example, antennas on adjacent windows arranged in a line may be selectively activated and powered to create a directional radiation pattern. The signal delivered to some or all windows in a façade also can be controlled to tune the transmission and/or reception properties of the individual windows. Additionally, in implementations in which some windows include multiple antenna structure patterns (for, e.g., transmitting or receiving different frequencies), a controller, such as the master controller 111 or network controller 112 described above with reference to FIGS. 1A and 1B, can be configured to dynamically select which antenna to use. In implementations employing fractal antennas, a controller may fine tune the operating frequency of the individual antenna.

Additionally, in some implementations, the antenna structures and antennas described herein can be used to communicate signals between the respective IGU 102 and the window controller 114, the network controller 112 or the master controller 111. For example, in some implementations, a window controller 112 can communicate voltage or current drive parameters to a driver within or otherwise associated with the IGU 102 via the antenna structures described herein. The driver can be connected to one or more power sources and a ground and use the parameters received from the window controller 114 to power the ECD within the IGU 102. As another example, in implementations in which each IGU 102 includes one or more sensors (for example, a temperature sensor, a current sensor, a voltage sensor, a light sensor, or other environmental sensors), a window controller 114 can wireless request and/or receive sensor data from the sensors via the antenna structures described herein. In some other implementations, a window controller 114 can communicate with the network controller 112 or the master controller 111, and vice versa, via the antenna structure described herein.

In various implementations, some or all of the antenna structures described herein are configured to operate in selected frequency ranges such as, but not limited to, the ISM bands, and particularly, the ISM bands for cellular communication (for example, the 700 MHz, 800 MHz, 850 MHz, 900 MHz, 1800 MHz, PCS, AWS, and BRS/EBS bands) and Wi-Fi (for example, the 2.4 GHz UHF and 5 GHz SHF bands) including those frequency used by the Bluetooth wireless technology standard. Such antenna structures also can function as microbeacons, picocells, and femtocells.

With the movement to 4G and 5G wireless mobile telecommunications standards, cellular service carriers are moving from a model that relies on large high-power cell towers to a model that relies on multiple smaller power transmitters. Part of the motivation is to blanket an area with coverage and maintain capacity recognizing that power to receivers falls off with the square of distance from a cell transmitter. The disclosed approach of controlling multiple windows of the building or possibly even multiple buildings which can each be tuned to particular powers and frequencies of transmission perhaps meshes with the 4G/5G model.

Properties of a Transparent Conductive Layer Used for a Ground Plane and/or Antenna Structure Some of the discussed embodiments employ a ground plane as a sheet of transparent conductive material having the appropriate properties, and a printed or patterned antenna structures. In many embodiments, the ground plane is present in the viewable area of an IGU, and, as such, the ground plane material should be substantially transparent at the thickness required to provide its function.

As an example, a ground plane fabricated from indium tin oxide may have a thickness of about 1700 nm or greater for transmission or reception of a 2.54 GHz signal. Some metal ion doped TCO materials may have increased conductivity and thereby permit thinner ground plane areas. Examples of metal ion dopants include silver and copper.

In certain embodiments, the antennas pattern is defined by thin conductive lines deposited on a layer of the electrochromic device stack. The thin conductor layers may be provided by printing conductive ink or laying down wires such as a wire mesh, etc. Whether printed or provided by a mesh or otherwise, the conductive lines should be sufficiently thin that they do not impact viewing by the occupant through the window.

When a wire mesh is used, it may be provided as a prefabricated mesh, which is then laminated or otherwise affixed to an appropriate conductive or insulating layer that serves as part of or is integrated with the electrochromic device stack. Alternatively, rolling mask lithography techniques can be used to deposit the wire mesh. The pattern defining the antenna maybe created by selectively removing portions of the wire mesh area or whole wires.

Fabrication of-Window Antenna Structures

As indicated elsewhere herein, various techniques may be employed for fabricating antennas on windows. Such techniques include printing antenna structures, blanket depositing of ground planes, etching conductive layers to form antenna structures or ground planes, masking, lithography, etc. as well understood by those of skill in the art. Various materials may be employed to form the antenna structures and ground planes, and some of these materials are identified elsewhere herein. In some embodiments, the material is a conductive ink such as a silver ink. In some embodiments, the material is a conductive transparent material such as transparent conductive oxide (e.g., indium tin oxide).

In certain embodiments, an antenna or plurality of antennas on one or more surfaces of an electrochromic window's substrate(s) comprises a material deposited by a sol-gel process. In certain embodiments, the sol-gel process involves applying a gelled precursor material to the substrate as a thin-film in a pattern corresponding to the antenna(s) desired. After an optional drying process, the thin-film is heated to form the antenna(s). The substrate may be heated to effect heating of the thin-film, either locally or the entire substrate. The heat treatment can be, e.g., in the range of 100° C. to 400° C., e.g. 150° C. to 350° C., in another example, 200° C. to 300° C. The heating may take place for between about 30 minutes and 5 hours, for example between about 1 hour and about 3 hours.

The sol-gel process is a method for producing solid materials from colloidal solutions. The method is used for the fabrication of metal oxides, for example ITO and other oxides for antennae described herein. The colloidal solution forms an integrated network of discrete particles or network polymers which is the gelled precursor. Typical gelled precursors comprise one or more metal oxides and/or metal alkoxides, e.g. indium tin oxide, and may contain silicon oxides, such as silicon dioxide. In one embodiment, the one or more metal oxides and/or metal alkoxides is based on one or more of the following metals: aluminum, antimony, chromium, cobalt, copper, gallium, germanium, gold, indium, iridium, iron, molybdenum, nickel, palladium, platinum, rhodium, ruthenium, tantalum, tin, titanium, tungsten, silver, zinc and zirconium.

The thin-film pattern may be applied to the substrate, e.g., by ink jet printing, screen printing, spraying while using masks, and the like. In certain embodiments the thin-film pattern is a localized area on the window substrate, where the area does not have any particular patterning. The localized area has sufficient dimensions from which to pattern one or more antenna, e.g. an antennae suite. After the thin film is heat treated, it is patterned, e.g., by laser ablation, to form the antenna(s) as described herein.

Various other deposition processes may be employed. Examples include chemical vapor deposition and physical vapor deposition. These techniques may be employed with patterning such as a mask on the lite. In one example, the physical or chemical deposition process is employed with a traditional lift-off technique where the process applies a photoresist to the lite and then patterns the resist to reveal the desired antenna pattern. After deposition, the process lifts off of the photoresist leaving behind the lite except for region(s) wherein TCO or other conductor is deposited. Other processes may be employed such as ink jet or screen print, which may be performed, e.g., over a lite without anything else on it or on an electrochromic lite after the lite leaves its coating apparatus with, e.g., a protective insulative top coat.

Applications for Window Networks

Window antennas may be used for various applications benefiting the optically switchable windows and/or associated systems. Examples of such applications include personalization services and wireless network communication.

For internal building communication nodes/hardware, window antennas can replace some or all of the conventional antennas such Wi-Fi antennas, small base stations, internal repeaters, network interfaces, etc. Such applications of window antennas can improve interior aesthetics by clearing out conventional internal antennas hanging off the walls/ceilings for internal cell, computer and other device connectivity. Additionally, window antennas may obviate some need for cell towers.

Personalization Services

Generally, personalization services provide window or antenna conditions applicable to particular individuals who use regions of building (e.g., rooms and lobbies). Different individuals can have different associated window parameters. For example, a first individual may prefer a relatively dark room with no Wi-Fi services and security features that block incoming and outgoing wireless signals. A second individual may prefer a much brighter room with Wi-Fi services. The building may have a default setting for all rooms which does not match the preferences of either individual. For example, the default setting may be no Wi-Fi or security services and window tint state settings based on time of day and current weather conditions. Using personalization services, when an occupant enters a region of a building, the window/antenna system determines that the occupant is present and determines the occupant's personal settings and adjusts the window and/or antenna settings to conform to the occupant's preferences. Some of the personalization can be executed in advance of an occupant's arrival in an area by extrapolating the occupant's directional movement i.e. walking through a building lobby towards an office.

In one example, a window antenna in the relevant region of the building determines that an occupant has entered or is entering. This determination may be made via communications with the occupant's smart phone or other wireless communications device. Bluetooth is one example of a suitable protocol for communicating between the user and a local window antenna. Other link protocols may be used. In implementation, the occupant's smart phone (or other device) communicates a user ID received by the window antenna. The antenna and network logic then determine the occupant parameters by looking them up in a database or other source of occupant parameters. In another implementation, the occupant's smart phone or other communication device stores the parameters and transmits them to the window antenna.

Examples of personalization services that may be available to occupant include any one or more of the following:
1. Tint levels of optically switchable windows in the vicinity of an occupant
2. Communication shielding on/off. For example, an antenna, ground plane, etc. may be placed in a state that blocks electromagnetic communications from passing through a window or other structure containing the antenna, ground plane, etc.
3. Notifications based on user location for retail applications. In some implementations, a building's network determines that a particular customer is at a particular location in the building. It may do by detecting communications between the customer's mobile device and an antenna at the location. Based on a user ID communicated via the antenna, the building/retail logic sends a notification to the user (via a mobile device application, for example). The notification may contain information about merchandise in the vicinity of the customer and the antenna. Such information may include promotions (sale price, for example), merchandise specifications, vendor information, reviews by other customers, reviews by professional reviewers, etc. A customer may personalize the retail building parameters so that the customer receives some, all, or none of the available information.
4. Communicating personalized settings to non-window systems such as thermostats, lighting systems, door locks, etc. via a BMS or other building system/network once an occupant is detected in the vicinity. Occupants may personalization such settings to allow communication of settings to some, all, or none of the non-window settings.
5. Wireless charging of small devices such as an occupant's mobile device when the user is detected in the in the vicinity of a wireless charging circuit; e.g., an inductively coupled circuit.

Any one or more of an individual's personalization parameters (e.g., preferred tint levels and preferred communications shielding) may be stored on a storage device that is part of a window and/or antenna network of the building. In some cases, the storage device is not on the building's window and/or antenna network, but the device is accessible to the building's network. For example, the storage device may reside in a remote location having a communications link with the window/antenna network. Examples of remote locations for the storage device include a different building, a publically available data storage medium (e.g., the cloud), a central control center for multiple buildings (e.g., see U.S. Patent Application No. 62/088,943, filed Dec. 8, 2014, and incorporated herein by reference in its entirety), etc. In some embodiments, the individual's personalization parameters are stored locally, either on the user's mobile device or on a local window or antenna controller (i.e., a controller at the location of the optically-switchable window or window device that can be adjusted by the individual's personalization parameters). In some cases, the individual's mobile device does not store the parameter's locally but can access them over a cellular or other network that is separate from the window or antenna network for the building. In such cases, the parameters can be downloaded to the mobile device, as needed, or supplied from a remote storage location, via the mobile device, to the local window and/or antenna controller. Local storage or local access to personalization parameters is useful in the event the building's window and/or antenna network becomes unavailable (e.g., a network connection is temporarily severed), and in cases where a network is not present in the building.

A window control network may provide services, such as weather services, to third parties, including other buildings. Such information can be used by the originating building/network for making local tint decision and by third parties who may not have sensors, weather feeds etc. The originating building may include window antennas configured to broadcast such information to other buildings. Alternatively, or in addition, other buildings may be configured to receive such information from originating building and transmit the information to still other buildings via window antennas.

A window/antenna network may be configured to provide security services such as detecting intruders in a building's perimeter, vicinity, or interior if an intruder is carrying a cell phone or other type of radio. The network may also be configured to detect when any window has been broken by, for example, detecting a change in current and/or voltage read from an electrochromic window.

Building-specific personalization services may be used in office sharing, hoteling, and/or seasonal or recurring residential and business renting applications. In one example, antennas throughout a multi-room building determine where a visitor is at any time and supply this location information to a mobile application displaying a building map on the user's mobile device. This map is updated with the visitor's current location as determined by the antennas. In one example, a Bluetooth or Bluetooth Low Energy (BTLE) is the protocol used by window antennas to communicate with the visitor's mobile device and determine user ID and provide a current location for the user ID. Such applications may include features that activate in the context of emergencies, particularly in building where multiple visitors or students are present. Disasters such as fires or earthquakes and security events such as hostage or terrorist situations may trigger the mobile application and antennas activate map and instructions evacuation or reaching an internal safe location.

In some embodiments, one or more window antennas are available to provide Wi-Fi or other services to occupants and/or tenants of a portion or all of the building where the window antennas are installed. If the occupant/tenant pays for the service, the antennas and associated controllers are activated to make the service available. If the occupant/tenant declines the service, the antennas/controllers are not activated for the service. Of course, the antennas/controllers may be available and used for other services, even when the occupant/tenant declines the service.

Wireless Communications

Window networks may be wired or wireless. For wireless window networks, antennas transmit and receive the communications regarding window tint states, faults, usage patterns, etc. Window antennas such as those described herein may be used to transmit and receive the necessary communications. Examples of wireless window network designs are presented in View, Incorporated's U.S. Provisional Patent Application No. 62/085,179, filed Nov. 24, 2014, which is incorporated herein by reference in its entirety. In certain embodiments, wireless window networks are provided in contexts where power for controlling windows is provided locally, rather than from a central building power source. For example, where the window power comes from photovoltaic sources receiving light through skylights or other local locations, or even from photovoltaic sources disposed on the windows, the communications network can be decoupled from the infrastructure of the power distribution network. In such cases, it becomes cost-effective to use a wireless communications network.

Commissioning and Site Monitoring

The commissioning process (automated or not) for windows or IGUs (IGU will be used to refer to both in this context) may involve reading and transmitting an ID for the IGU and/or its associated window controller. Further information related to commissioning/configuring a network of electrochromic windows is presented in U.S. patent application Ser. No. 14/391,122, filed Oct. 7, 2014, and titled "APPLICATIONS FOR CONTROLLING OPTICALLY SWITCHABLE DEVICES," which is herein incorporated by reference in its entirety.

In some cases, communication with an antenna associated with an IGU to be configured is used to identify the IGU. This information is shared over the network, for example to a network controller and/or to other window controllers. This identification process may be one step in generating a map or other directory of all the electrochromic windows on the network, as discussed below. In various embodiments, the IGU identification/configuration process may involve individually triggering or detecting each IGU controller to cause the IGU's associated controller to send a signal to the network. The signal may include the IGU's identification number and/or the identification number of the controller associated with the IGU. For example, an installer(s) will install IGUs in their physical location in a building. The IGUs will have the chip or memory which contains the IGU's ID and certain physical characteristics/parameters of the IGU etc.

The triggering may occur through a variety of mechanisms. In one example, some or all of the IGUs to be commissioned include an antenna associated antenna logic configured to trigger the IGU to send its ID when the antenna receives a communication from a user's mobile device or other user communication device in the vicinity of the IGU. The user can turn the communication device to a commissioning mode whereby it transmits triggering signals to the window antennas in reception range (e.g., all the IGUs in a room visited by the user). Because the user or a commissioning application associated with the user's mobile device knows where the mobile device is located, the IGUs within reception range can be associated with their physical locations. In some embodiments, the user may enter the location of the mobile device when a communication with the IGUs' window antennas occurs. This also allows the IGUs within reception range to be associated with their physical locations.

In one example, a network of electrochromic windows includes 10 windows, with two windows provided in each of five rooms. After the IGUs are physically installed, a user/installer may commission the windows to identify each IGU and associate it with its physical location in the network. The installer may use an electronic device such as a phone, tablet, computer, etc. to help commission the windows. A program on the electronic device (or accessible by the device) may include a list, directory, and/or map of all the electrochromic windows on the network. When the installer enters the first room, she can trigger the first electrochromic window by walking close to it, thereby causing the associated window/antenna controller to send a signal over the network with the window's (and/or controller's) identification. As a result of this signal, the identification for the triggered window may appear on the electronic device. The user can then associate the identification with the physical location of the window they triggered. In one example where the program on the electronic device generates (or otherwise utilizes) a map of the windows, this association may be made in a graphical user interface (GUI), e.g., by dragging the triggered identification number onto the map at the appropriate location, or by clicking the map at the appropriate location in response to the triggered identification appearing. After the first window is associated with its physical location, the installer can trigger the second window in the first room by walking close to it (or otherwise directing a transmission to its antenna) and thereby associate the identification of the second IGU/controller with its physical location. This process can then be repeated for each of the other rooms in which electrochromic windows are installed. In some cases, it is sufficient to merely identify the rooms or general vicinities of multiple IGUs. In such cases, the transmission of an electromagnetic signal from the user's device may be received simultaneously by multiple IGUs in the vicinity. Each of them can transmit its respective ID to the commissioning program to thereby determine the general location of the IGUs. In some cases, the user moves from one room to the next or one region to another, with the user's location being known or determined during the movement. Individual IGUs may respond multiple times while in transmission range of the user. In this way, individual IGUs can be disambiguated even though multiple of them may respond concurrently to a transmission signal from the user's device.

In another example, each electrochromic IGU may include a beacon that transmits information related to the IGU, for example the identification of the IGU and/or the associated controller. Bluetooth Low Energy (BLE) beacons may be used in some cases. An installer may have a receiver to allow them to read the beacon. Phones and other electronic devices commonly have Bluetooth receivers that can be used for this purpose. Any appropriate receiver may be used. An installer may read the information on the beacons during commissioning to associate the identification for each IGU/controller with the physical location of the IGU. A map or directory may be used to accomplish this association.

In a similar embodiment, each IGU may be triggered over the network, which may cause a component on the IGU to notify an installer/user that it has been triggered. In one example, each IGU is configured to transmit a particular commissioning signal (e.g., a particular frequency, pulse train, etc.) from its window antenna. A signal can be sent over the network to trigger a relevant IGU or window controller, which triggers the IGU to transmit its commissioning signal. A user's device can then identify the relevant IGU by receiving the IGU-specific signal. Based on this process and information, the installer/user can associate each IGU/controller with its physical location and identification.

Figure 14A:
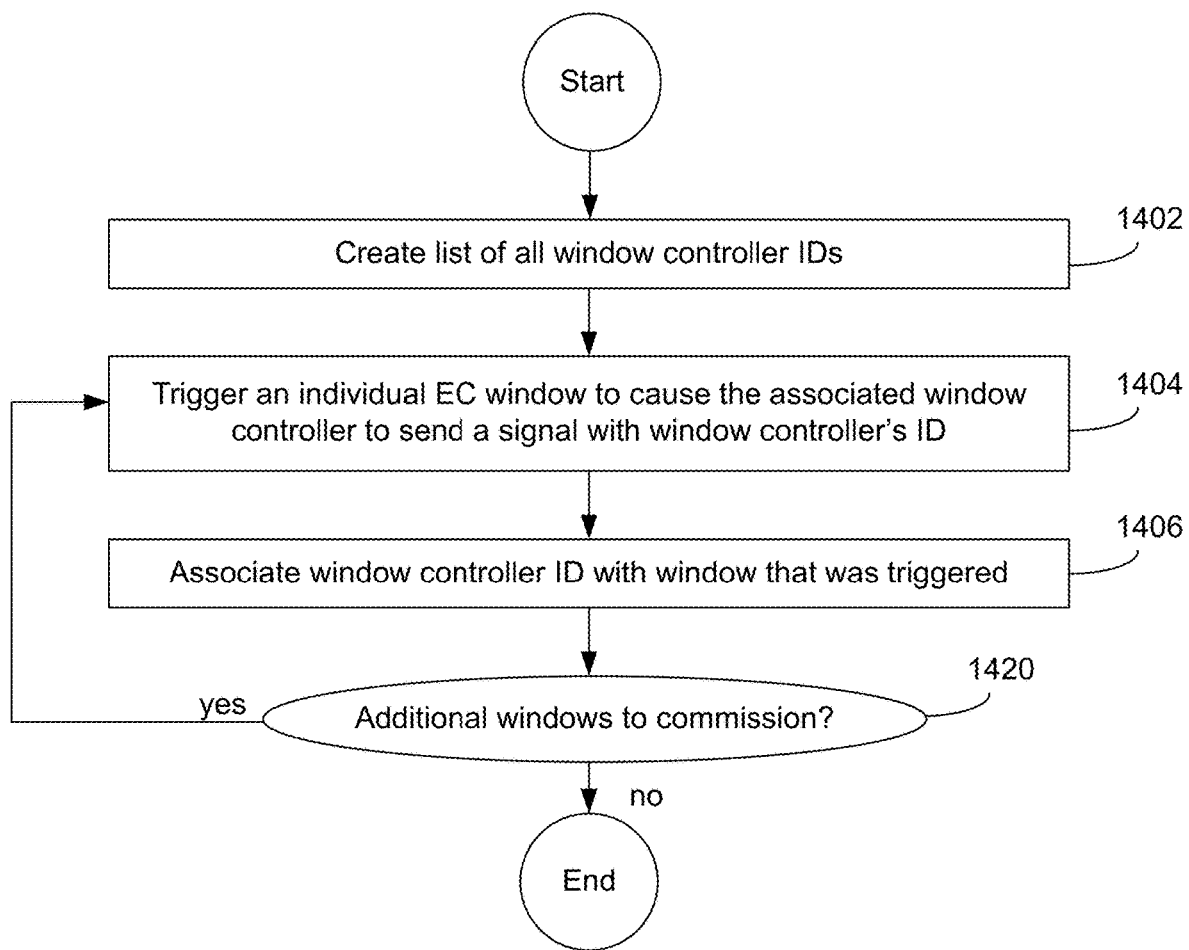

FIG. 14A is a flowchart depicting a method 1400 of commissioning a network of electrochromic windows according to certain embodiments. For example, after all the IGUs have an associated controller, at operation 1402, a list of all the window controller IDs is created. This step is explained further below with reference to FIGS. 14C-14E. The window controller IDs may include a number of individual identifying factors about each window. This information is stored, e.g., in a chip in each window assembly, e.g., in a dock (or wiring harness). In one example, the window ID includes a CAN ID and a LITE ID. The CAN ID may relate to a unique address of the window/window controller on the CAN bus system, while the LITE ID may relate to a unique serial number of the electrochromic IGU and/or its associated window controller. The LITE ID (or other ID used) may also include information about the window such as its size, properties of the electrochromic device, parameters to be used when transitioning the electrochromic device, etc. After the list of window controllers is generated, an individual window controller is triggered in operation 1404. The triggering may occur through any of the methods described herein. This trigger causes the relevant window controller to send a signal with the window controller's ID. In response, a user or a program that accesses IGU transmitted data over a network can associate the triggered window controller's ID with the window's physical location in operation 1406. Operations 1404 and 1406 are further explained in the context of FIGS. 14F and 14G. At operation 1420, it is determined whether there are additional windows to commission. If there are additional windows to commission, the method repeats from operation 1404. The method is complete when all of the windows are commissioned.

Figure 14B:
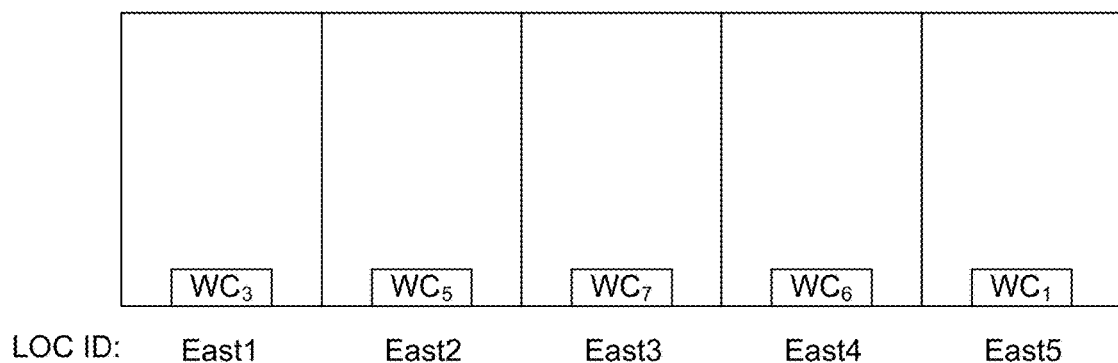

FIG. 14B presents a representation of the physical location of five electrochromic windows installed on an East wall of a building. The "LOC ID" refers to the location of the relevant window, in this case labeled, arbitrarily, East1-East5. Additional electrochromic windows may be provided elsewhere in the building. The method of FIG. 14A, for example as explained in relation to FIGS. 14C-14G, may be performed on the set of windows shown in FIG. 14B.

Figure 14C:
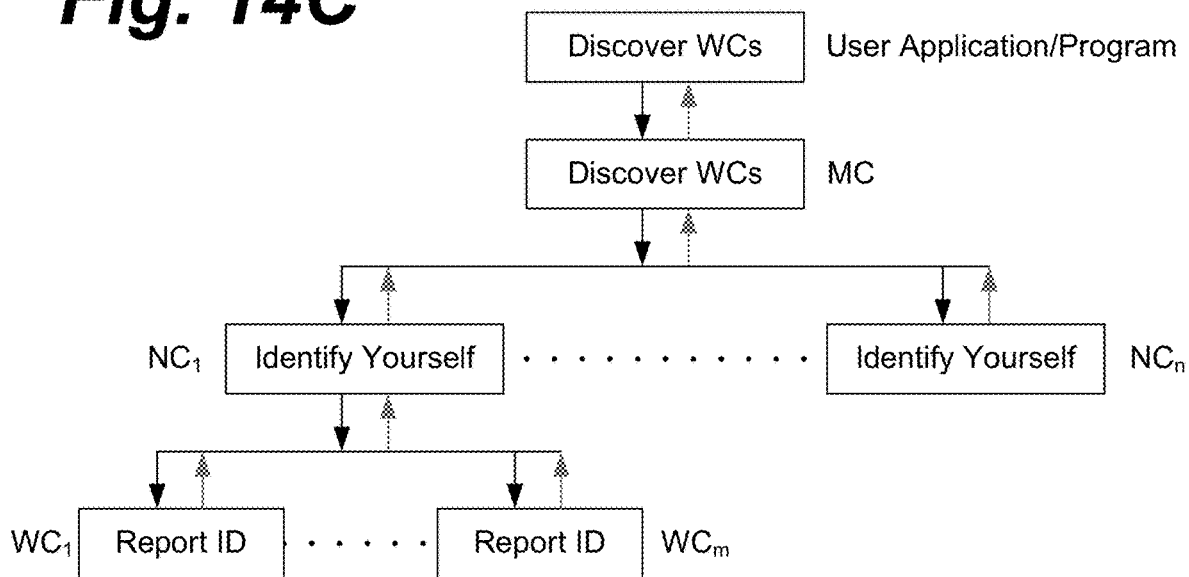
Figure 14D:
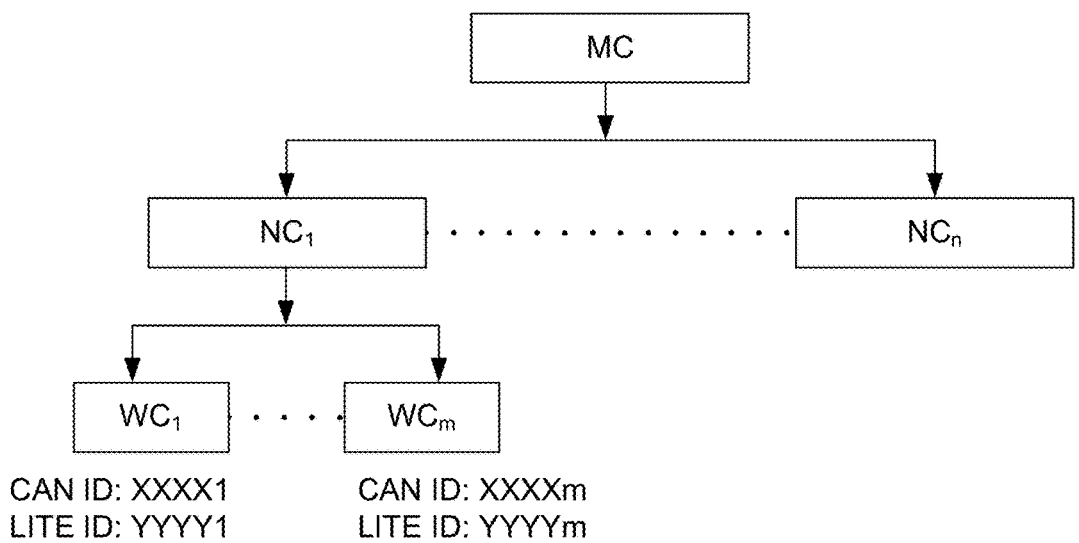

FIG. 14C illustrates certain steps that may be taken during operation 1404 of FIG. 14A. In this example, the network of electrochromic windows includes a master controller (MC), two or more network controllers ($NC_1$-$NC_n$), and several window controllers ($WC_1$-$WC_m$). For the sake of clarity, only information relevant to window controllers that operate under the first network controller ($NC_1$) are shown. The dotted lines indicate that many other network controllers and window controllers may be present. First, a user may initiate a command, via a user application/program/etc., to cause the window controllers to be discovered. The user application/program forwards this command to the master controller. The master controller directs the network controllers to discover the window controllers, and the network controllers direct the window controllers to identify themselves. In response, the window controllers report their IDs to the network controllers, which then report the window controller IDs to the master controller, which reports the window controller IDs to the user application/program. The master controller and/or the user application/program may aggregate this information to create the list of all window controllers. This list may include information detailing which window controllers are controlled by each network controller. The list may also be provided as a chart that shows the configuration of all the relevant controllers on the network, as shown in FIG. 14D. The network representation shown in FIG. 14D may appear on the graphical user interface in some cases.

FIG. 14E depicts an example of user interface features that may be presented to a user after operation 1404 is complete and the list of window controller IDs is created. On the upper portion of FIG. 14E, a map of the relevant windows is shown. This map may be created by any means available, and in some cases may be specifically programmed for each installation. After operation 1404, it is still not known where each window is positioned. Thus, the map does not yet show the CAN ID or LITE ID for any of the windows, but rather has empty fields that will be populated with this information during the commissioning process. On the bottom portion of FIG. 14E, a list of the window controller IDs is provided. After operation 1404, all of the window IDs (the CAN IDs and LITE IDs) are generally known, but they have not yet been associated with their physical positions (the LOC IDs). For this reason, the bottom portion of FIG. 14E shows the CAN IDs and LITE IDs as populated, while the LOC IDs are still blank. A similar list may be provided for each of the different network controllers.

Figure 14F:
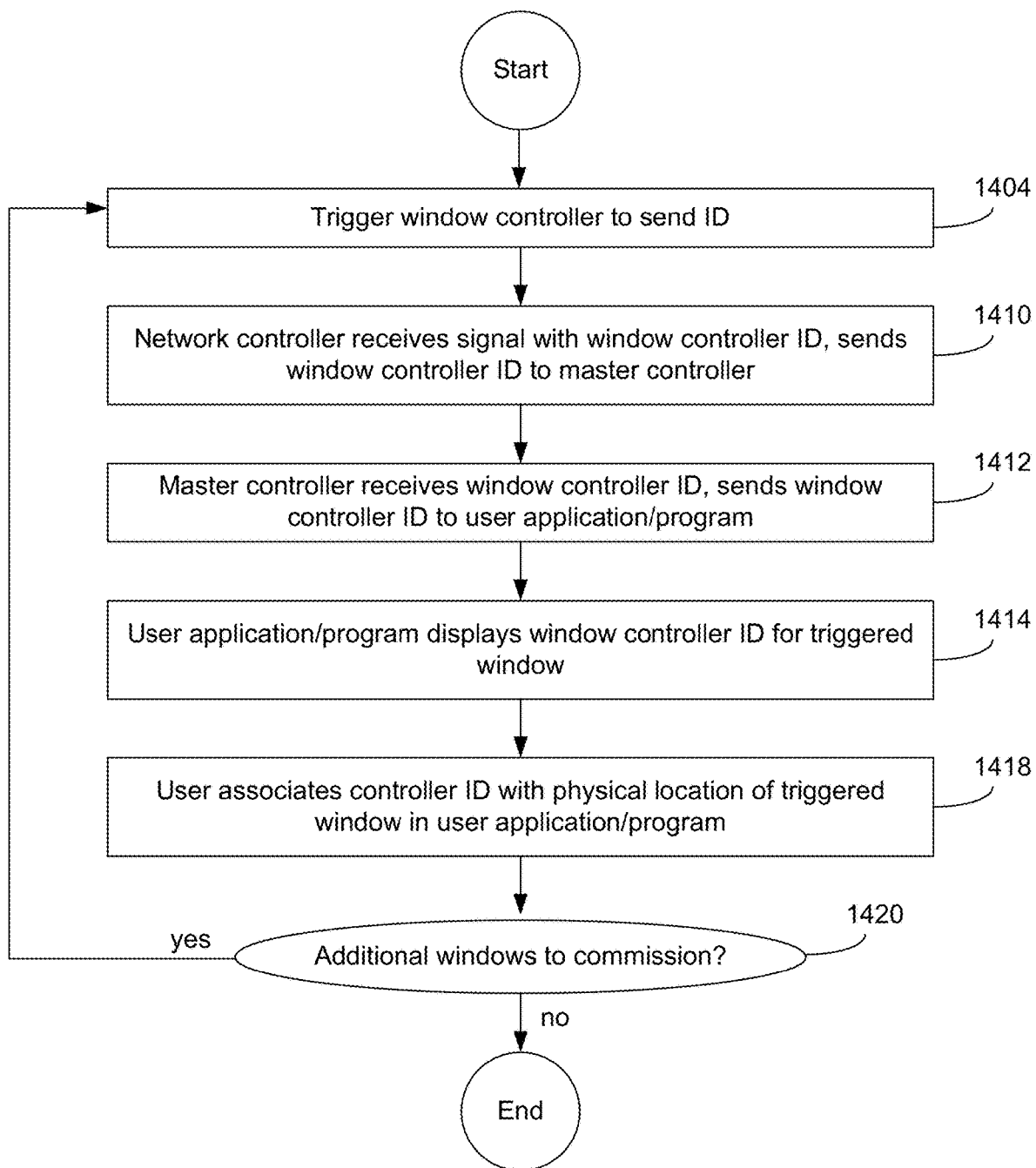

FIG. 14F is a flowchart that presents a method for performing operations 1404 and 1406 from FIG. 14A in more detail, according to one embodiment. In FIG. 14F, the method begins at operation 1404, where a user triggers a window controller (by, e.g., directing an EM transmission toward the IGU's window antenna), thereby causing it to send the window controller ID to its associated network controller. The network controller receives the signal with the window controller ID, and sends the window controller ID to the master controller at operation 1410. Next, at operation 1412, the master controller receives the signal with the window controller ID, and sends the window controller ID to a user application/program/etc. At operation 1414, the user application/program displays the window controller ID for the triggered window. Next, at operation 1418, the user may associate the window ID of the triggered window with the physical location of the window that was triggered. In one example, the user drags the window ID displayed in operation 1414 onto the physical location of the triggered window as represented on the map of windows. With reference to FIG. 14E, for instance, a particular window ID (e.g., CAN ID and LITE ID) may become bold or otherwise noticeable in the user application/program in response to the window controller being triggered. The user can see the bolded window ID, then drag it onto the map at an appropriate location. Conversely, the user may drag the relevant window from the map onto the triggered window ID. Similarly, a user may click on the triggered window ID and click on the relevant window from the map to associate the two. Various methods may be used.

FIG. 14G depicts an example graphical user interface similar to the one shown in FIG. 14E, after the window positioned at East5 has been identified and associated with its relevant window ID/location. As shown in FIG. 14B, the window at East5 has $WC_1$ installed thereon. Therefore, the CAN ID for $WC_1$ (XXXX1) and the LITE ID for $WC_1$ (YYYY1) are displayed below the window at the East5 location. Similarly, as shown in the bottom portion of FIG. 14G, the list of window controller IDs now includes a LOC ID for $WC_1$. The triggering and location/ID association steps can be repeated until all of the windows are identified and associated with their positions within the building. The fact that $WC_1$ was triggered first was chosen merely for the sake of clarity in the figures. The window controllers can be triggered in any order.

Returning to FIG. 14F, at operation 1420 it is determined whether there are any additional windows to commission. If not, the method is complete. If there are additional windows to commission, the method repeats on a different window starting at operation 1404.

Conventional antennas sometimes require adjusting or tuning based on changing environmental conditions which include seasonal variations in foliage, new buildings in a city or residential environment, weather patterns, etc. Such adjustments modify antenna radiation patterns to account for changing conditions. Additionally, when multiple antennas radiate to the same region, null regions can occur. Careful tuning of the antennas is required to get rid of nulls.

With conventional antennas, adjustments are made by physically changing the position and/or orientation of installed antennas. Window antennas as described herein allow adjusting or tuning the emitted radiation pattern through commands from a window controller or control system providing appropriate instructions for selecting and powering windows to address current requirements and environmental conditions. Sometimes, a controller selects which antennas to power and thereby defines a particular pattern or array of active antennas. In another approach, the controller varies the frequency, power, polarization, or other property of the electrical signal powering the transmission antenna.

Such tuning may tie to an electrochromic window commissioning procedure. In some approaches, when an installer sets up its electrochromic windows, it commissions them to set optical switching parameters. When the electrochromic windows include antennas as disclosed, the commissioning can account for the selection and/or powering characteristics for individual antennas in the windows of the building being commissioned. Calibrating and/or tuning the antennas that are part of the windows serves as part of commissioning. In addition, monitoring or periodic commissioning can be performed to account for changing environmental conditions which may have a strong impact on the transmission characteristics of the antennas in a structure. Commissioning and monitoring of buildings containing electrochromic windows is further described in International Patent Application No. PCT/US13/36456, filed Apr. 12, 2013, and U.S. Provisional Patent Application No. 61/974,677, filed Apr. 3, 2014, each of which is incorporated herein by reference in its entirety. These applications describe setting and/or adjusting switchable optical window controller settings such as drive voltages to cause optical switching based on local conditions determined at installation and/or during a later evaluation.

In some cases, a building or multiple buildings with antennas interact with each other and/or with a conventional transmission antenna, where the antennas transmit signal in the same or overlapping frequency bands. In this example, at least one of these multiple buildings transmits radiation from antennas on windows of a building. The other building or buildings may transmit through windows or more conventional cell tower structures.

Non-Window Network Applications

As is apparent from the foregoing description, antennas can be designed, assembled and otherwise configured to have a variety of uses depending on the application of the particular antenna. In some applications, one or more of the antennas described above can be configured for use in a repeater or "signal booster" system. In one example repeater implementation, an IGU 202 includes one or more first antennas and one or more second antennas. The first antennas can be configured to receive a signal from an exterior environment external to a building (or room within a building). For example, the received signal can be a cellular, wireless wide area network (WWAN), wireless local area network (WLAN), or wireless personal area network (WPAN) signal transmitted from a base station, cellular or other broadcast tower, satellite or wireless access point or "hotspot." The second antennas can be configured to transmit a signal into an interior environment internal to the building (or room within a building). For example, the transmitted signal can be a cellular, WLAN, or WPAN signal. In some such implementations, the controller for the antenna (whether within a window tint-state controller or in a separate antenna controller) can include an amplifier circuit or stage as well as one or more passive or active hardware or software filtering components or circuits such as analog filters or digital filters. In some such implementations, the transmitted signal is an amplified version of the received signal. Additionally, the received signal can be filtered and subject to various signal processing techniques and processes prior to amplification such that any noise or other unwanted signal components are not amplified in the transmitted signal (or at least not to the extent that the desired frequency components are amplified in the transmitted signal). It will be appreciated that signals received from an interior environment also can be processed and amplified for transmission to an exterior environment.

In some applications, one or more of the antennas described above can be configured for use in a protocol converter system. In one example converter implementation, an IGU 202 includes one or more first antennas and one or more second antennas. The first antennas can be configured to receive a signal from an exterior environment according to a first wireless protocol, such as a cellular, WWAN, wireless local area network WLAN, or wireless personal area network WPAN signal transmitted from a base station, cellular or other broadcast tower, satellite or wireless access point or hotspot. The second antennas can be configured to transmit a signal into an interior environment internal to the building according to a second wireless protocol. For example, the transmitted signal can be a cellular, WLAN, or WPAN signal. In some such implementations, the controller for the antenna (whether within a window tint-state controller or in a separate antenna controller) can include a converter circuit or stage for converting the received signal from the first wireless protocol to the second wireless protocol before transmission over the second antennas. The controller also can include an amplifier for amplified the converted signal before transmission. For example, a cellular signal can be received from the external environment, converted into a Wi-Fi signal, and then transmitted into the interior environment. It will be appreciated that signals received from an interior environment also can be converted for transmission to an exterior environment.

In some applications, one or more antennas can be configured to received broadcast television signals whether from a broadcast tower or from a satellite, for example. In some such applications, the received television signal can then be rebroadcast into the room in the same or a different protocol for reception by a set-top box or a television itself. Similarly, one or more antennas can be configured to received radio signals whether from a broadcast tower or from a satellite, for example. In some such applications, the received radio signal can then be rebroadcast into the room in the same or a different protocol for reception by a radio, stereo system, computer, television or satellite radio.

In some applications, multiple antennas can serve as broadcaster of cellular, television or other broadcast signals. In one such example, some or all of the antennas within some or all of the windows of a large building can be configured to server as a GSM or DCS cellular broadcast tower for a base station. Such implementations can eliminate the use of traditional broadcast towers.

In some applications, groupings or zones of one or more antennas can serve as WLAN or WPAN base stations, access points or hotspots. For example, a grouping of antennas as described above can function as a femtocell (such as for 4G and 5G cellular) or a picocell. In some such implementations, a controller or controllers for the grouping of antennas can connect to a service provider's network via broadband (such as DSL or cable). A femtocell allows service providers to extend service coverage indoors or at the "cell edge," where access may be limited or unavailable due to infrastructure limitations or attenuation (such as by materials of a building or by other buildings blocking desired signals).

In some applications, one or more of the antennas described above can be utilized for cloaking. For example, one or more antennas within a window or within a multitude of windows of a building can be configured to radiate back a field that cancels reflections from an object such as another structure of the same building, other buildings or other structures external to a building.

In some applications, one or more of the antennas described above can be used in a microphone system. For example, an IGU can include one or more acoustic-to-electric transducers or arrays of such transducers on a surface of a lite. For example, the transducers can be electromagnetic transducers (such as MEMS microphone transducers) that convert acoustic signals into electrical signals that can then be received and processed by the window controller or a separate controller. For example, in a speaker-phone implementation, the transducers can pick up acoustic signals from one or more occupants of an adjoining room and convert the acoustic signals to electrical signals for signal processing by the controller. In some implementations, the unprocessed or processed electrical signals can be wirelessly sent to a device that interfaces with a phone system for transmission to third parties on a conference call, for example. Additionally, in some implementations, electromagnetic transducers can detect acoustic signals from background noise, such as noise from an exterior environment outside of a room (whether outdoors or indoors, for example, in a hallway or adjacent room). The electrical signals from the noise can then be processed by the controller or a separate device to remove frequency components associated with the noise from the frequency components associated with the voices from the occupants within the room. In some other implementations, a user within a building can wear a microphone, such as a wireless headset, that converts audio signals to electrical signals that are then broadcast and subsequently sensed by antennas within nearby windows. Such an implementation would enable the user to participate on a conference call without the use of a phone even as the user moves throughout one or more rooms or hallways of a building. For example, the user also can wear headphones or other audio earpieces that would receive electrical signals transmitted from antennas in various nearby windows and convert these received electrical signals into audio signals representative of the voices of other users on a conference call. Such received electrical signals can be received through the phone system and subsequently received via wired or wireless connection by the controllers and antennas in the various nearby windows.

In some implementations, one or more antennas within one or more windows also can be configured to transmit signals to various speakers within a room. In some implementations, one or more antennas within one or more windows also can be configured to wirelessly power various speakers within a room. In some implementations, one or more antennas within one or more windows also can be configured to wirelessly power various lighting equipment within a room. For example, such implementations can provide an "electrodeless lamp," for example, one or more fluorescent tubes in or in proximity to an IGU or other window structure which produce light when excited by radio frequency emissions transmitted from the antennas.

In some applications, one or more antennas in one or more windows can be configured to transmit and receive radio waves to determine the range, angle, or velocity of objects exterior to and/or interior to the room or building. More specifically, the antennas can transmit radio waves or microwaves that reflect from any object in their path. The same or different antennas within the windows receive and process these reflected waves to determine properties of the object(s). For example, such a radar implementation can be used for mapping exterior or interior environments. This mapping information can be used to better direct antennas to better receive signals of interest or to better focus transmitted signals to a target (such as a typical base station but also to other buildings, which may themselves be configured as base stations using this antenna technology). Such radar implementations also can be advantageous for security applications. For example, such radar implementations can detect the presence, proximity and even movement of an intruder/trespasser. Indeed, multiple antennas in multiple windows arranged around a building can work in concert to track the trespasser's movements around a building.

Radar implementations also can be configured to detect weather. For example, the doppler effect is already used by weather stations to detect, classify and predict weather. Such weather information can be useful as another input to a master controller or network controller to determine tint states as well as to trigger changes in other systems including lighting, HVAC and even alarm systems.

Antennas on or within window also can be used in other identification, personalization, authorization or security applications. For example, antennas within a room can be used to detect signals from RFID tags, bluetooth transmitters, or other transmitters worn or otherwise carried by occupants of a room to determine the identities of the occupants, as well as to determine authorizations, permissions, or security clearances associated with those identities.

CONCLUSION

In one or more aspects, one or more of the functions described may be implemented in hardware, digital electronic circuitry, analog electronic circuitry, computer software, firmware, including the structures disclosed in this specification and their structural equivalents thereof, or in any combination thereof. Certain implementations of the subject matter described in this document also can be implemented as one or more controllers, computer programs, or physical structures, for example, one or more modules of computer program instructions, encoded on a computer storage media for execution by, or to control the operation of window controllers, network controllers, and/or antenna controllers. Any disclosed implementations presented as or for electrochromic windows can be more generally implemented as or for switchable optical devices (including windows, mirrors, etc.)

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this does not necessarily mean that the operations are required to be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A building communications network, comprising:
   an internal communications network disposed in a building;
   a antenna structure disposed on a component of a window in the building, wherein the window comprises one or more lites, each of the one or more lites having regions that are at least partially transparent at optical wavelengths;
   an electrochromic device disposed on one of the lites of the window, wherein the antenna structure utilizes a conductive layer of the electrochromic device to block reception of wireless signals from one or more regions external to the building; and
   an access point coupled to the antenna structure and configured to bring about transmission and reception of signals to and from the internal communications network disposed in the building.

2. The building communications network of claim 1, wherein the electrochromic device and a transceiver coupled to the antenna structure are both controlled by a controller area network (CAN) bus.

3. The building communications network of claim 1, wherein the conductive layer is transparent at optical wavelengths.

4. The building communications network of claim 1, wherein the antenna structure cooperates with the access point to transmit and receive signals operating in accordance with one or more of Bluetooth, WiFi, Zigbee, EnOcean, and Bluetooth microbeacon standards.

5. The building communications network of claim 1, wherein the antenna structure is coupled to a Wi-Fi repeater.

6. The building communications network of claim 1, wherein the antenna structure is coupled to a cellular signal repeater.

7. The building communications network of claim 6, wherein the cellular signal repeater operates in accordance with a revision of the 4G standard or the 5G standard.

8. The building communications network of claim 1, wherein the window comprises two or more lites, and wherein a first lite and a second lite of the window are spaced apart by a spacer from one another to form a sealed interior volume.

9. The building communications network of claim 8, wherein the antenna structure is disposed in or on one of: the spacer, a surface of the first lite, a surface of the second lite, or an internal component disposed within the sealed interior volume of the window.

10. The building communications network of claim 1, wherein antenna control logic configured to control the antenna structure is deployed within an enclosure of a window controller configured to control the window.

11. The building communications network of claim 10, wherein the antenna control logic comprises logic for converting a signal from a first signal type to a second signal type.

12. The building communications network of claim 1, wherein the antenna structure comprises a monopole antenna.

\* \* \* \* \*